(12) United States Patent
Mister et al.

(10) Patent No.: US 9,100,194 B2
(45) Date of Patent: Aug. 4, 2015

(54) METHOD AND APPARATUS FOR PROVIDING AUTHENTICATION BETWEEN A SENDING UNIT AND A RECIPIENT BASED ON CHALLENGE USAGE DATA

(71) Applicant: Entrust, Inc., Dallas, TX (US)

(72) Inventors: Serge Mister, Ottawa (CA); Steve Neville, Orleans (CA); Robert J. Zuccherato, Ajax (CA); Christopher Voice, Ottawa (CA); Michael Morgan, Kanata (CA)

(73) Assignee: Entrust Inc., Dallas, TX (US)

( * ) Notice: Subject to any disclaimer, the term of this patent is extended or adjusted under 35 U.S.C. 154(b) by 0 days.

(21) Appl. No.: 13/685,248

(22) Filed: Nov. 26, 2012

(65) Prior Publication Data

US 2013/0080780 A1  Mar. 28, 2013

Related U.S. Application Data

(60) Division of application No. 11/302,058, filed on Dec. 12, 2005, now Pat. No. 8,966,579, which is a continuation-in-part of application No. 10/967,669, filed on Oct. 18, 2004, now Pat. No. 8,230,486, which (Continued)

(51) Int. Cl.
*H04L 29/06* (2006.01)
*G06F 21/00* (2013.01)

(Continued)

(52) U.S. Cl.
CPC .............. *H04L 9/3271* (2013.01); *G06F 21/36* (2013.01); *G06Q 10/107* (2013.01);

(Continued)

(58) Field of Classification Search
CPC ...................................................... G06F 21/31

USPC ........................................... 713/168; 726/1–4
See application file for complete search history.

(56) References Cited

U.S. PATENT DOCUMENTS 3,719,801 A   3/1973  Drexler
3,827,726 A   8/1974  McVoy et al.
(Continued)

FOREIGN PATENT DOCUMENTS

CA   2193819 C   1/1996
EP   1176489 A1  1/2002
(Continued)

OTHER PUBLICATIONS

Tech FAQ "What is two Factor Authentication?" pp. 1-2. Mar. 13, 2005 (Internet Archive Wayback Machine) http://web.archive.org/web/20110408192123/http://www.tech-faq.com/two-factor-authentication.html.*

(Continued)

*Primary Examiner* — Lisa Lewis
(74) *Attorney, Agent, or Firm* — Faegre Baker Daniels LLP

(57) ABSTRACT

A method, apparatus and/or system generates a challenge for user authentication, having a challenge data element from a stored pool of challenge data elements. The challenge is based on rule data and stored usage data associated with at least some of the challenge data elements in the stored pool of challenge data elements. The generated challenge is sent for use in an authentication of a user to a sender. A method, apparatus and/or system also generates sender authentication and corresponding location information, having a data element from a stored pool of challenge data elements. Selection of the data elements is based on rule data and stored usage data associated with at least some of the data elements in the stored pool of data elements.

33 Claims, 34 Drawing Sheets

Related U.S. Application Data is a continuation-in-part of application No. 10/849,402, filed on May 19, 2004, now Pat. No. 8,060,915, which is a continuation-in-part of application No. 10/748,523, filed on Dec. 30, 2003, now Pat. No. 8,612,757.

(51) Int. Cl.
*H04L 9/32* (2006.01)
*G06F 21/36* (2013.01)
*G06Q 10/10* (2012.01)
*G06Q 20/34* (2012.01)
*G06Q 20/40* (2012.01)
*G07F 7/10* (2006.01)

(52) U.S. Cl.
CPC ......... *G06Q 20/341* (2013.01); *G06Q 20/4014* (2013.01); *G06Q 20/40145* (2013.01); *G07F 7/1008* (2013.01); *G07F 7/1083* (2013.01); *H04L 9/3228* (2013.01); *G06F 2221/2103* (2013.01); *G06F 2221/2129* (2013.01); *H04L 2209/56* (2013.01); *H04L 2209/80* (2013.01)

(56) References Cited

U.S. PATENT DOCUMENTS

| | | |
|---|---|---|
| 4,085,313 A | 4/1978 | Van Ness |
| 4,184,148 A | 1/1980 | Smagala-Romanoff |
| 4,189,353 A | 2/1980 | Harriman |
| 4,445,712 A | 5/1984 | Smagala-Romanoff |
| 4,795,890 A | 1/1989 | Goldman |
| 4,921,278 A | 5/1990 | Shiang et al. |
| 4,936,778 A | 6/1990 | Setchell et al. |
| 5,233,436 A | 8/1993 | Oksman et al. |
| 5,246,375 A | 9/1993 | Goede |
| 5,251,259 A | 10/1993 | Mosley |
| 5,347,580 A | 9/1994 | Molva et al. |
| 5,367,150 A | 11/1994 | Kitta et al. |
| 5,381,539 A | 1/1995 | Yanai et al. |
| 5,491,752 A | 2/1996 | Kaufman et al. |
| 5,537,571 A | 7/1996 | Deville |
| 5,552,845 A | 9/1996 | Nagao et al. |
| 5,710,421 A | 1/1998 | Kokubu |
| 5,712,627 A * | 1/1998 | Watts .................... 340/5.81 |
| 5,839,058 A | 11/1998 | Phillips et al. |
| 6,230,169 B1 | 5/2001 | Nagae |
| 6,246,769 B1 | 6/2001 | Kohut |
| 6,412,690 B1 | 7/2002 | Malki |
| 6,438,550 B1 | 8/2002 | Doyle et al. |
| 6,732,277 B1 | 5/2004 | Vandergeest et al. |
| 6,772,336 B1 | 8/2004 | Dixon, Jr. |
| 6,784,905 B2 | 8/2004 | Brown et al. |
| 6,934,838 B1 | 8/2005 | Boyce et al. |
| 6,950,949 B1 | 9/2005 | Gilchrist |
| 6,970,827 B2 | 11/2005 | Zeltzer et al. |
| 6,975,727 B1 | 12/2005 | Vandergeest |
| 6,980,081 B2 | 12/2005 | Anderson |
| 7,058,603 B1 | 6/2006 | Rhiando |
| 7,100,049 B2 | 8/2006 | Gasparini et al. |
| 2001/0034717 A1 | 10/2001 | Whitworth |
| 2002/0010684 A1 | 1/2002 | Moskowitz |
| 2002/0066042 A1 | 5/2002 | Matsumoto et al. |
| 2002/0078350 A1 | 6/2002 | Sandhu et al. |
| 2002/0081179 A1 | 6/2002 | Vallstrom |
| 2002/0091938 A1 | 7/2002 | Hiltunen et al. |
| 2003/0009670 A1 | 1/2003 | Rhoads |
| 2003/0015866 A1 | 1/2003 | Cioffi et al. |
| 2003/0028786 A1 | 2/2003 | Mustafa |
| 2003/0141373 A1 | 7/2003 | Lasch et al. |
| 2003/0154286 A1 | 8/2003 | Tang et al. |
| 2003/0154406 A1 * | 8/2003 | Honarvar et al. ............ 713/201 |
| 2003/0204743 A1 | 10/2003 | Devadas et al. |
| 2003/0210127 A1 | 11/2003 | Anderson |
| 2003/0233546 A1 | 12/2003 | Blom |
| 2004/0054863 A1 | 3/2004 | Harada et al. |
| 2004/0078571 A1 | 4/2004 | Haverinen |
| 2004/0093372 A1 | 5/2004 | Chen et al. |
| 2004/0122960 A1 | 6/2004 | Hall et al. |
| 2004/0148350 A1* | 7/2004 | Lacy ............................ 709/205 |
| 2004/0187018 A1 | 9/2004 | Owen et al. |
| 2004/0190718 A1 | 9/2004 | Dacosta |
| 2004/0193910 A1 | 9/2004 | Moles |
| 2004/0223619 A1 | 11/2004 | Jablon |
| 2005/0033688 A1 | 2/2005 | Peart et al. |
| 2005/0050328 A1 | 3/2005 | Mizrah |
| 2005/0050330 A1 | 3/2005 | Agam et al. |
| 2005/0097320 A1 | 5/2005 | Golan et al. |
| 2005/0144449 A1 | 6/2005 | Voice |
| 2005/0144450 A1 | 6/2005 | Voice |
| 2005/0144451 A1 | 6/2005 | Voice et al. |
| 2005/0149740 A1 | 7/2005 | Kotzin et al. |
| 2005/0149761 A1 | 7/2005 | Chiviendacz et al. |
| 2005/0177522 A1 | 8/2005 | Williams |
| 2005/0177716 A1 | 8/2005 | Ginter et al. |
| 2005/0268096 A1 | 12/2005 | Kilian-Kehr et al. |
| 2006/0015725 A1 | 1/2006 | Smith et al. |
| 2006/0156385 A1 | 7/2006 | Chiviendacz et al. |
| 2006/0218393 A1 | 9/2006 | Hernandez et al. |
| 2007/0005967 A1 | 1/2007 | Mister et al. |
| 2007/0015490 A1 | 1/2007 | Munje et al. |
| 2008/0109899 A1 | 5/2008 | Rijnswou |
| 2008/0301371 A1 | 12/2008 | Peled et al. |

FOREIGN PATENT DOCUMENTS

| | | |
|---|---|---|
| FR | 2654238 | 5/1991 |
| JP | 9305541 A | 11/1997 |
| WO | 9924267 | 5/1999 |
| WO | 0208974 | 1/2002 |
| WO | 02/17556 | 2/2002 |

OTHER PUBLICATIONS

Engineering Statistics Handbook, "Histogram", Jun. 2004, pp. 1-3. http://www.itl.nist.gov/div898/handbook/eda/section3/histogra.htm.*

Microsoft, "Account Lockout Best Practices Whitepaper", May 20, 2004, pp. 1-52.*

PFBlog "Why Do Credit Cards Expire?" Feb. 7, 2005, p. 1. www.pfblog.com/archives/1560_why_do_credit_cards_expire.shtml.*

"RSA SecurID for Microsoft Windows", RSA Security, Inc.; Brochure No. SIDMS DS0504; dated 2004.

EP Office Action; EP Application No. 04802268.5; dated Dec. 30, 2010.

Supplementary EP Search Report; EP Application No. 04802268.5; dated Aug. 4, 2010.

Chinese Office Action; Chinese Application No. 200510121789.7; dated Jun. 29, 2011.

Australian Office Action; Australian Application No. 2004319571; dated Mar. 13, 2009.

Chinese Office Action; Chinese Application No. 200480043373.1; dated Mar. 27, 2009.

Australian Office Action; Australian Application No. 2005297350; dated Jun. 1, 2009.

Supplementary EP Search Report; EP Application No. 05706404.0; dated Nov. 5, 2007.

Chinese Office Action; Chinese Application No. 200510121789.7; dated Sep. 25, 2009.

English Translation of WO 91/06904; published May 16, 1991; corresponding to FR2654238 (Lefevre).

Chinese Office Action; Chinese Application No. 200510121789.7; dated Nov. 25, 2011.

Canadian Intellectual Property Office International Search Report for International Application No. PCT/CA2005/000067 dated Jul. 18, 2005.

SearchSecurity "Two Factor Authentication", Jun. 19, 2004, http://searchsecurity.techtarget.com/sDefinition/0,,sid14_gci992919,000.html#.

(56) References Cited

OTHER PUBLICATIONS

Canadian Patent Office International Search Report for International Application No. PCT/CA2006/001562 dated Dec. 15, 2006.
Canadian Patent Office International Search Report for International Application No. PCT/CA2006/002017 dated Mar. 30, 2007.
The Anti-Phishing Working Group; Proposed Solutions to Address the Threat of Email Spoofing Scams; Dec. 2003; pp. 1-10.
America's Growth Capital; Authenticated Email Primer; Tumbleweed Jumps Into the Fray; Apr. 8, 2004; pp. 1-13.
The Dryad Numeral Cipherauthentication System; from https://hosta.atsc.eustis.army.mil; printed May 11, 2004; pp. 1-12.
PassMark; What are PassMarks?; from www.passmarksecurity.com; printed Apr. 21, 2005; p. 1.
European Patent Office International Search Report for International Application No. PCT/IB2004/002234 dated Jan. 24, 2005.
European Patent Office Written Opinion for International Application No. PCT/IB2004/002234 dated Jan. 24, 2005.
Canadian Patent Office International Search Report for International Application No. PCT/CA2004/002091 dated Mar. 21, 2005.

* cited by examiner

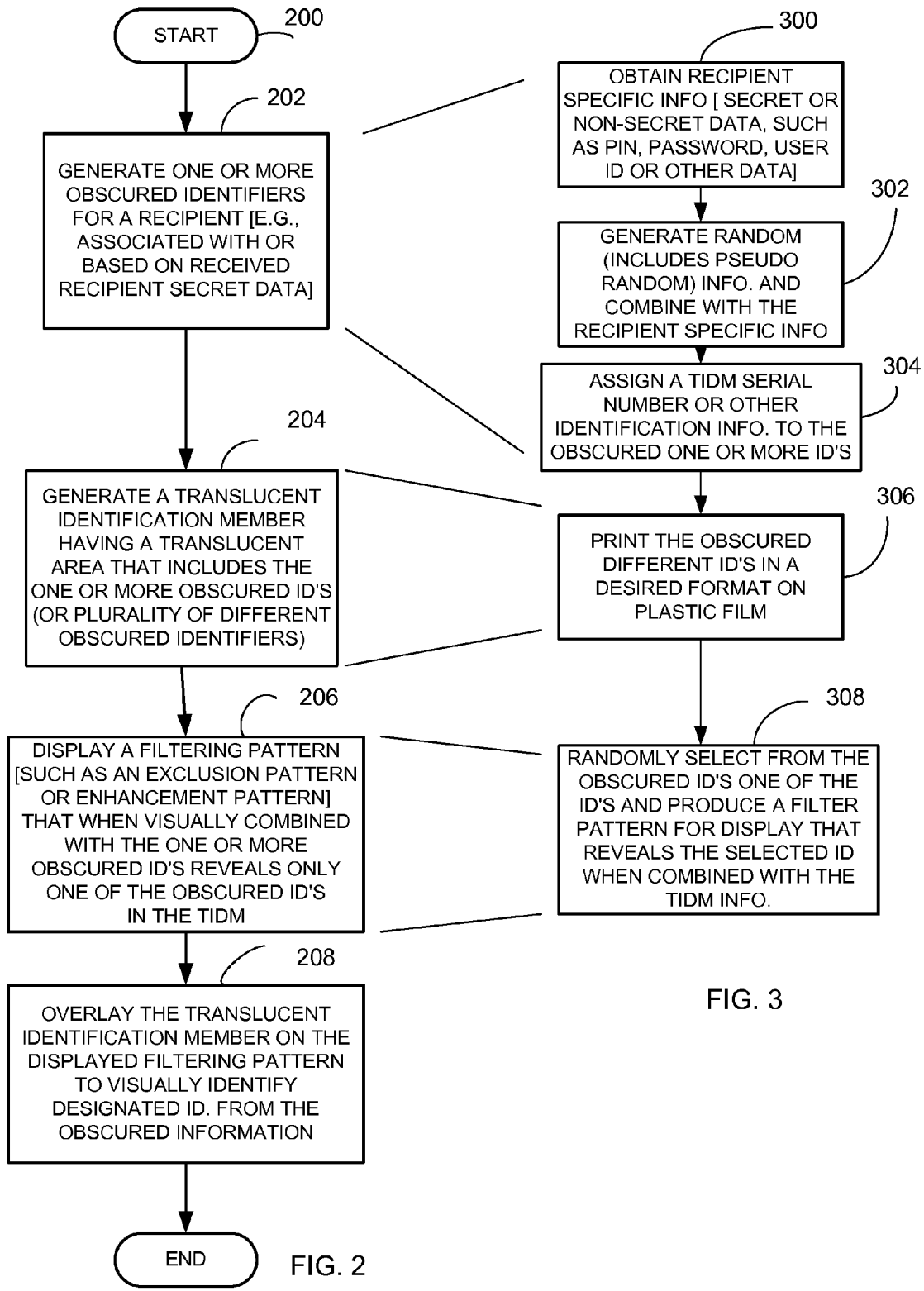

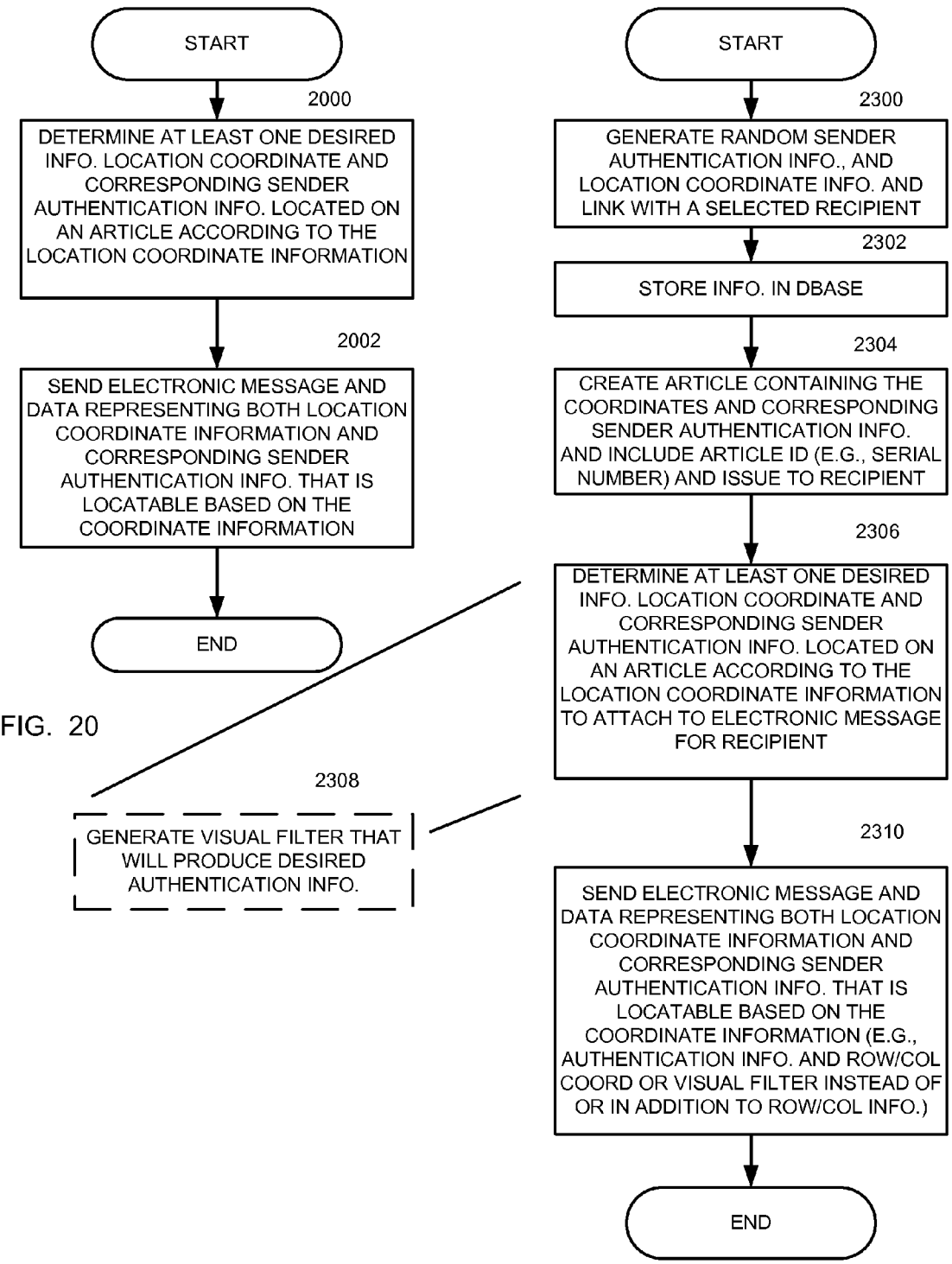

METHOD AND APPARATUS FOR PROVIDING AUTHENTICATION BETWEEN A SENDING UNIT AND A RECIPIENT BASED ON CHALLENGE USAGE DATA

RELATED CO-PENDING APPLICATIONS

This application is a divisional of U.S. patent application entitled METHOD AND APPARATUS FOR PROVIDING AUTHENTICATION BETWEEN A SENDING UNIT AND A RECIPIENT BASED ON CHALLENGE USAGE DATA, having Ser. No. 11/302,058, filed on Dec. 12, 2005, having as inventors Serge Mister et al. and owned by instant Assignee, which is a continuation-in-part of U.S. patent application entitled METHOD AND APPARATUS FOR PROVIDING MUTUAL AUTHENTICATION BETWEEN A SENDING UNIT AND A RECIPIENT, having Ser. No. 10/967,669 (now U.S. Pat. No. 8,230,486), filed on Oct. 18, 2004, having as inventor Chris Voice and owned by instant Assignee, which is a continuation-in-part of U.S. patent application entitled METHOD AND APPARATUS FOR PROVIDING ELECTRONIC MESSAGE AUTHENTICATION, having Ser. No. 10/849,402 (now U.S. Pat. No. 8,060,915), filed on May 19, 2004, having as inventors Voice et al. and owned by instant Assignee, which is a continuation in part of U.S. patent application entitled METHOD AND APPARATUS FOR SECURELY PROVIDING IDENTIFICATION INFORMATION USING TRANSLUCENT IDENTIFICATION MEMBER, having Ser. No. 10/748,523, filed on Dec. 30, 2003, having as inventors Chiviendacz et al. and owned by instant Assignee.

FIELD OF THE DISCLOSURE

The disclosure relates generally to method and apparatus for providing authentication between a user and a target resource or information sending entity, and more particularly to methods and apparatus that employ soft tokens or hard tokens for providing mutual authentication between a user and a target resource.

BACKGROUND OF THE DISCLOSURE

Mutual authentication systems and methods are known that attempt to authenticate a user or recipient of information that is being provided by a content service provider or other target resource that is, for example, accessible through an on-line communication link such as through the Internet, an intranet, or any other suitable wireless or non-wireless network. Such methods and apparatus attempt to thwart malicious exploits by hackers and others that attempt to steal a user's identity. For example, a malicious entity may send an email using the address of a legitimate bank and direct the recipient to a "counterfeit website". The recipient, believing that it is a legitimate site, may be tricked into providing information such as an account number and password that can be used by the malicious entity to access the recipient's online account. The problem may be particularly acute in the consumer world where conventional methods of online mutual authentication may be very complex, typically requiring expensive hardware deployment and complex user interactions that make such mutual authentication techniques impractical. As such, it would be desirable to provide a system and method that allows the confirmation of users or recipients that are accessing an intended target organization, (i.e. sending entity) in a relatively inexpensive but secure manner.

Two factor authentication techniques are known that, for example, use a first authentication factor to authenticate an end user's identity and a second factor that is used for authentication to supplement the user name and password typically used in the first factor authentication. The concept of a second factor is that a user can authenticate using something that they know (e.g. their password) and something that they have (e.g. the second factor which may be, for example, a hardware token). Typically the second factor mechanisms are hardware based and are physically distributed to the end user. For example, time synchronous tokens are known and are sometimes referred to as multi-factor authentication techniques. Several known techniques are described further below.

Also, various methods for performing authentication of a target organization in connection with Internet applications are known that include, for example, secure socket layer server authentication which provides certification from a trusted third party based on the identity of the organization hosting a given web application. However, this can require the user to perform the manual step of double clicking on an on-screen icon and reading through information. The requirement of manual action often precludes it from being performed consistently and, thus, undermines the effectiveness of the method. In addition, client security plug-in applications are also known that involve an end user downloading and installing client side software which provides a visual indication of when the user is communicating with the legitimate site. However, it can be burdensome for end users to download and install software or to go through several manual steps to confirm the identity of the target organization.

In addition, both user and target organization authentication methods can be impractical when extending to other channels of communication such as interactive voice response systems or communication through mobile devices, such as cellular phones, personal digital assistants, Internet appliances, or other mobile devices, as they can rely on a user display and entry methods unique to web based applications.

Ensuring that a sent email message or other electronic message has been sent by a sender that can be trusted, also referred to as being authentic, helps ensure against theft of important information by unscrupulous parties and can help limit spam and phishing. Phishing is a form of Internet fraud that usually involves the mass sending of emails that appear to be from a legitimate organization such as a bank or other financial institution or other organization. These emails often direct the recipient to a fraudulent website or form where he or she is tricked into divulging personal or financial information. An alternative phishing attack may not ask for such information but, upon entering the URL, it may execute a download of a keystroke-logging program that lets the phisher harvest information from the recipient's machine. The information can then be used for identity theft and fraud.

Phishing attacks can be costly and can drain a company's resources since, for example a large number of attacks can be run against target companies in large volumes and billions of phishing messages can pass through filtering systems that can slow down email delivery, use up valuable processing times of servers and can ultimately result in the loss of important financial data to unscrupulous parties.

Several solutions are known that attempt to address this problem. Because phishing attacks often begin with large volumes of email sent from a forged sending address, efforts to reduce spam email may be somewhat effective in reducing the number of phishing attacks. For example, in one method referred to as Sender Policy Framework, an originator of a message or originator domain publishes in a directory or other suitable form legitimate sending computer addresses which are verified by receiving message transfer agents. The message transfer agent may verify a received message via a DNS server (domain name server). However, this technique can require widespread adoption of SPF-enabled message transfer agents which can potentially be costly to implement and deploy.

Another technique referred to as Coordinated Spam Reduction Initiative again requires originators in an originator domain to publish legitimate sending computer addresses which are verified by receiving message transfer agents in a relatively similar manner as described above.

Another technique requires domains to digitally sign email which is verified by the receiving message transfer agent via DNS servers. Again, this can require the widespread adoption of modified versions of message transfer agents.

Another technique uses the S/MIME protocol wherein sending individuals or domains digitally sign emails that are verified by receiving incoming message transfer agents or user email clients. This can require special email client features or recipient message transfer agents that are not currently supported in web based email clients.

Another technique employs secret images that are shared between a sender and a recipient. As understood, a personalized image is sent by a user to an authentication server. The server stores the recipient sent image. The authentication server may then send the personalized image to the recipient with an email and the user seeing the image recognizes that it is the one he or she sent. Also, during logon to a site, the server may include the image in the logon page so that a user trusts the login page when the user sees their personalized image (see e.g., www.passmarksecurity.com). Among other drawbacks, this system appears to use the same image for multiple logins until the shared image is changed and may require the recipient to choose and send the image to a sending server.

In addition, other systems are known which attempt to provide, instead of sender authentication, recipient authentication. For example, U.S. Pat. No. 5,712,627 discloses, among other things, an issued identification card that has indicium at one of the addressable positions on an assigned card. The card may have rows and columns with different numbers, characters or symbols that are addressable by the rows and columns. To determine whether a person seeking access to data is authorized to obtain requested access, the identification card is distributed to authorized users. A requesting person seeking access provides the indicia at one or more addressable positions on the card as specified by a security system. To notify the person which indicium to enter and send back, the system selects coordinate indicia known to be present on a particular card. The recipient must then send back the indicia located at the address sent by the security system. If the indicia matches that assigned to the person seeking access then access is granted. However, such systems do not resolve the problem with respect to phishing since the system provides authentication of a receiver and not a sender and requests that a person seeking access identify themselves to the system and the system requires entry and sending by the user of information located on the security card.

Other authentication systems are also known that have been employed, for example, in the military, numeral cipher/authentication systems have been used that employ cards that are held by a sender and recipient. A transmission is authenticated for example by using a challenge and reply authentication scheme. A sender of an electronic transmission for example may use the card and randomly select a row and column and transmit the row and column identifiers as a challenge. For a reply, row and column identifiers are used to look up an alphabetical letter which is then communicated back. As such, the sender can be assured that the receiver is in possession of a card. However, the authentication of the sender to the receiver is typically done by repeating the same challenge and reply in reverse, and both sender and receiver must be in possession of the same authentication card to achieve mutual authentification.

Another technique also uses a card that includes rows and columns of information on both the sender and receiver side, however, this transmission authentication scheme is used to authenticate transmissions. For example during transmission authentication, columns of transmission authentication diagraphs are located on the back of a cipher table and used to authenticate a sender. Column assignments are made by a designated representative such as a commander of a unit. The column assignments are known to both the sender and receiver apriori. Transmission authentication diagraphs are used only once. The first unused authenticator in the assigned column is used and a line is drawn through that authenticator to preclude its reuse. Such schemes do not utilize a random selection of information on the card and do not utilize the sending of coordinate information since the column information is known apriori. As such, only the authentication information is apparently communicated. If the sender sends authentication information and it is valid as determined by the recipient, the recipient crosses the authentication information off the card. The next time authentication is required, the next authentication information in the same column is then used. As such, a sequential and non-random approach is used. However, if the authentication card of a recipient is lost or obtained by an unscrupulous party, they would know how to act as a sender since they know which authentication information is next in the column since no random selection is utilized and since the card has markings thereon. In this system no coordinate information is sent since the column of information used to authenticate a sender is made known apriori to the sender and receiver. In addition, if the receiver does not receive the sender's transmission, the synchronization between the sender and receiver would be lost which may cause subsequent authentication attempts to fail.

Also, information security and user identification security are becoming increasingly important as technology becomes more sophisticated. For example, multi-factor authentication schemes are used in an attempt to thwart hackers or to thwart other inappropriate uses of information and user identities. For example, a two factor authentication scheme may use information known to a recipient or user such as a password or personal identification number (PIN) as well as some type of physical token such as a banking card, credit card, password token or other physical token which a user must be in physical possession of in order to initiate and complete an on-line transaction. Another level of authentication may include biometric authentication that may include the scanning of a fingerprint, eye or other biometric to again verify that the user attempting to gain access to a process, device, application or other right is in fact the appropriate user.

Transaction cards are known that may include for example smart cards, magnetic strip-based cards, and other transaction cards that facilitate banking transactions, credit card transactions, or any other suitable transactions. As known in the art, a user personal identification number (PIN) is usually required in addition to the possession of a banking card to obtain cash from a cash-dispensing machine or to otherwise carry out an online transaction. One known multi-factor authentication technique employs the use of a hardware token such as a battery operated smart card that displays a periodically changing and seemingly random number on a portion of the smart card. When a user wishes to execute a transaction with the smart card, for example, the user enters the seemingly random number that changes often. The receiving transaction server compares the received code entered by the user as displayed on the smart card with a corresponding number generated by a code source generator. If the code entered by the user matches the number generated by the code source generator, the transaction is approved and the user is granted a particular right such as accessing a bank account, purchasing goods, obtaining information, gaining access to a website or other software application, or any other suitable right as desired. However, such hardware tokens can be quite expensive and are battery powered thereby requiring changing of the battery and the potential of an electronic malfunction due to moisture problems or any other problems related to electronic circuitry.

Other smart cards that do not employ such screens typically require a card reader that reads, for example, a magnetic strip. This can be a restriction where a user wishes to perform an online transaction but is not sitting at a terminal that contains or has access to a magnetic strip reader.

In an apparently unrelated field, translucent cards are known such as plastic cards that contain a semi-transparent picture or pattern that when visually evaluated does not appear to connote any particular information. However, when the translucent card is held over a display with a corresponding background filter pattern, the combination of the pattern on the card with the background pattern on the display screen combine to present a visually recognizable message or word such as the word "sorry" or "you're a winner". These are static messages which are not unique to any user and typically include only a single message. Such plastic cards may be used for example to see if a holder has won a prize. The card for example may be mailed in the mail to members of a population. Those recipients then go to a web page identified on the translucent card or otherwise indicated in the mailing information to see if they have won a prize. However, such plastic cards do not provide multi-factor authentication, are not user specific, do not include multiple messages and typically include static messages.

Currently, second factor authentication involving an article may contain a collection of randomly generated symbols, as described above. As also described above, a sender of a transmission may use an article and randomly select a row and column and transmit the row and column identifiers (data challenge elements) as a challenge. For a reply, row and column identifiers are used to look up corresponding sender authentication, which allows the person with the article to authenticate to the sender. However, a potential threat exists if an attacker can see both the challenge data elements (such as grid coordinates) and the reply (user's responses to the challenge). As the attacker sees more user authentications, he or she learns more about the contents of the article, thereby increasing the attacker's ability to successfully impersonate the user.

Correspondingly, in the case of sender authentication, a similar potential threat exists. In this case, a sender would transmit to a user sender authentication information such as article location information and the corresponding sender authentication information that is locatable on the article at that article location information. For example, in one embodiment a sender could send row and column identifiers and the numbers or alphanumeric characters to be found at those locations. By providing this information, the sender demonstrates to the user that the sender is a legitimate sender because it knows information that should only be known by the sender and the user. However, an attacker intercepting the sender's transmission could learn information about the contents of the card. This information could be use to increase the attacker's ability to impersonate the sender and/or the user. Accordingly, careful selection of sender authentication transmissions and user challenges is important to attempt to address this risk.

Currently, one known technique used to generate a challenge is random generation. The challenge data elements are chosen uniformly at random, meaning that all possible challenge data elements have an equal chance of being chosen. Despite the strong security of such systems, for each successful, and in some cases unsuccessful, authentication operation an attacker has observed, the probability of a successful impersonation increases. The impersonator/attacker must be patient enough to get a randomly generated challenge that corresponds to challenge/reply sets he or she has observed. The probability of successful impersonation decreases exponentially with the number of grid coordinates (challenge data elements) not known to the attacker that appear in the present challenge. Therefore, a need exists to provide a mechanism for generating challenges that decrease the probability that an attacker has seen all of the challenge data elements and corresponding sender authentication information, thereby increasing the effective security of the article (e.g. card) over its useful life.

Accordingly, a need exists for a method and apparatus that overcomes one or more of the above problems.

DETAILED DESCRIPTION OF THE DRAWINGS

FIG. 2 is flow chart illustrating one example of a method for securely providing identification information in accordance with one embodiment of the disclosure;

FIG. 3 is a diagram illustrating a further break down of the method shown in FIG. 2;

Figure 6:
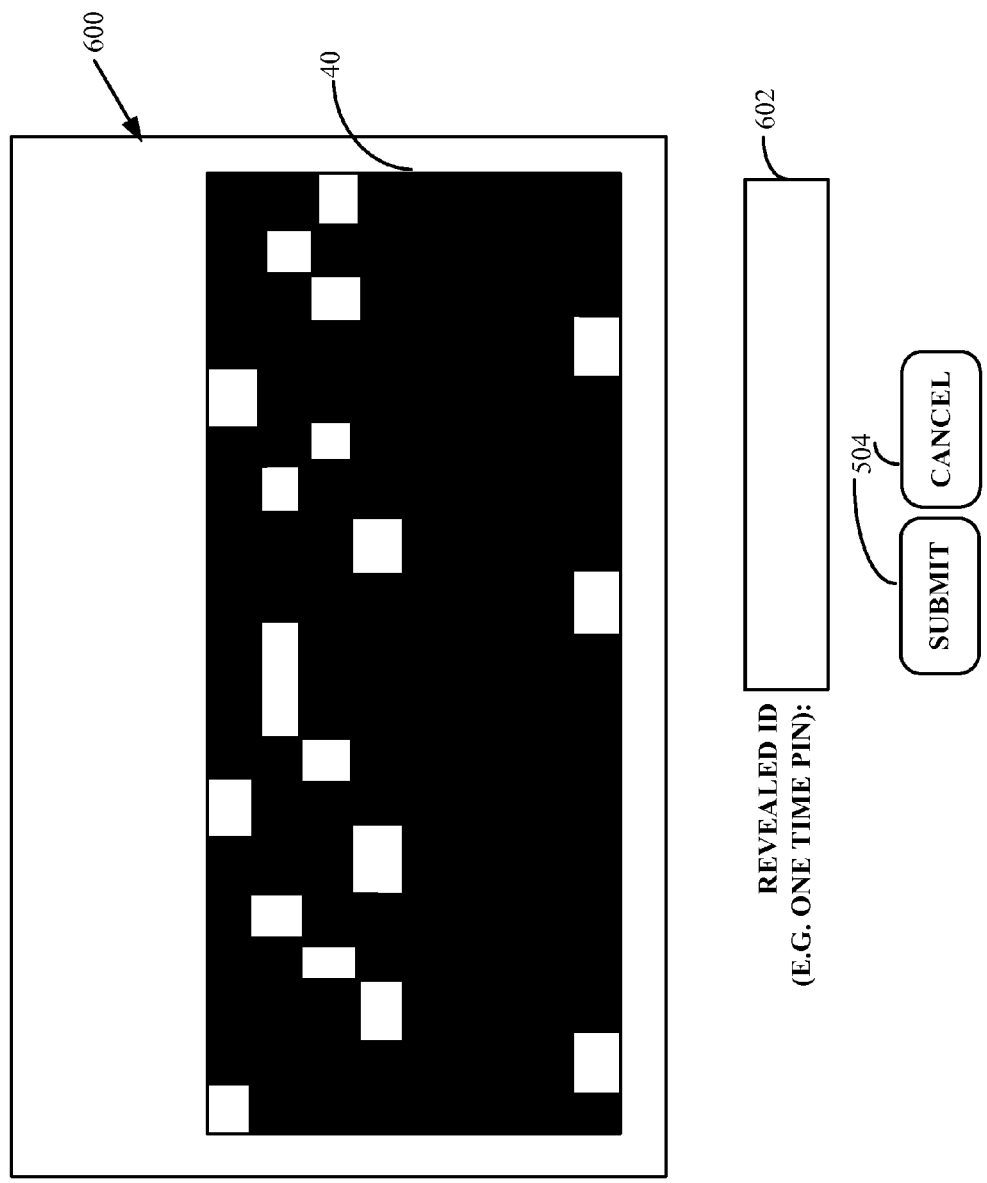
Figure 7:
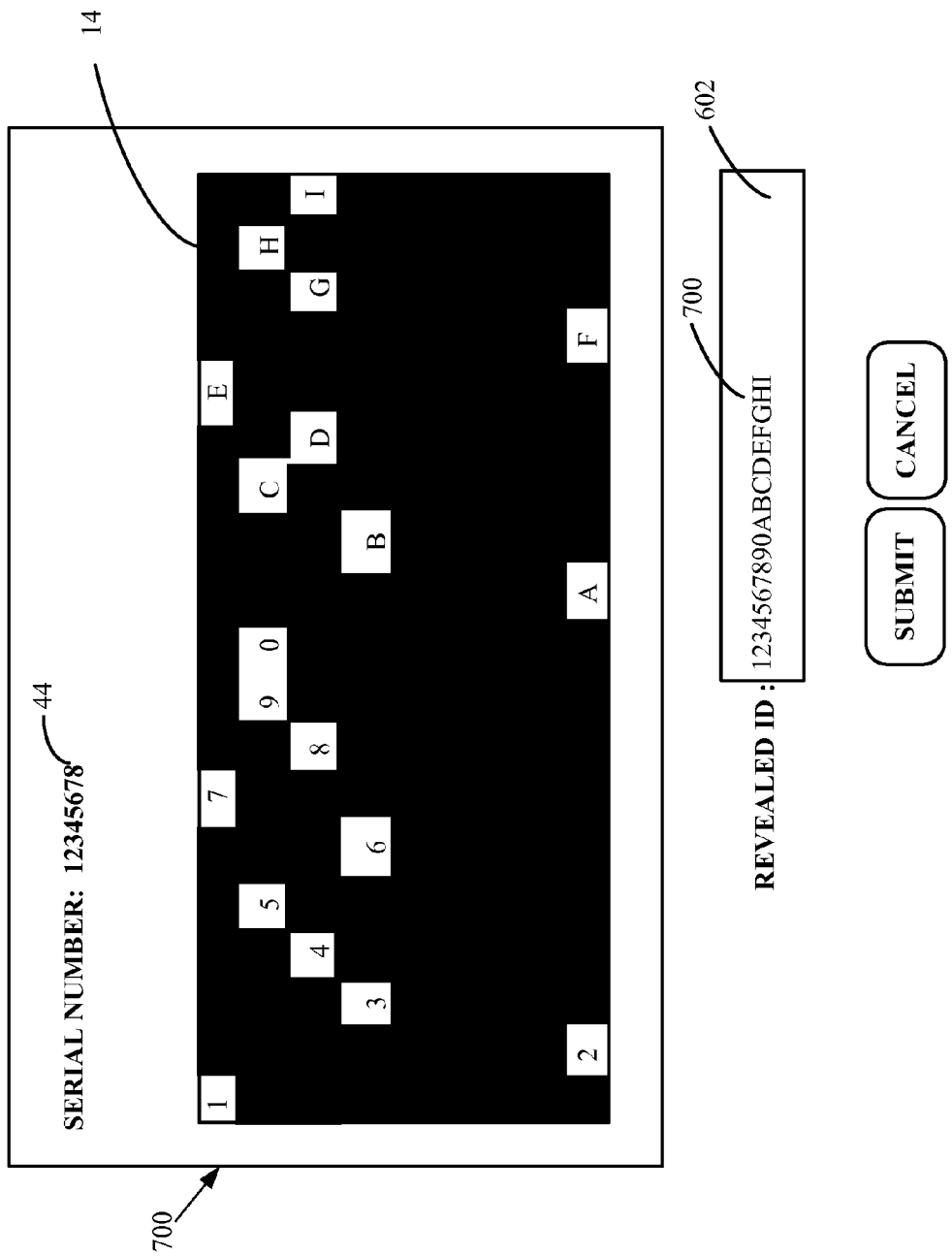
Figure 8:
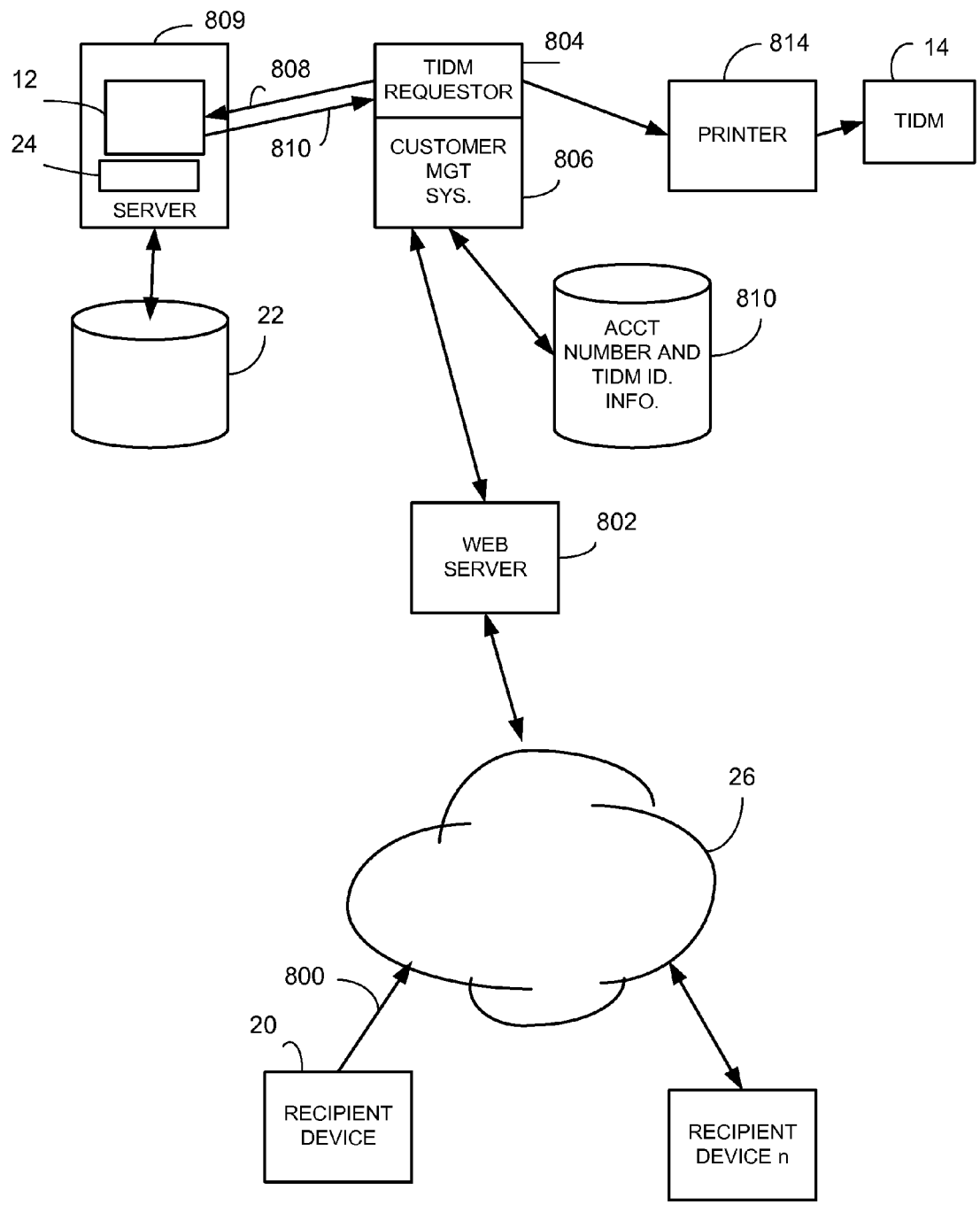
Figure 9:
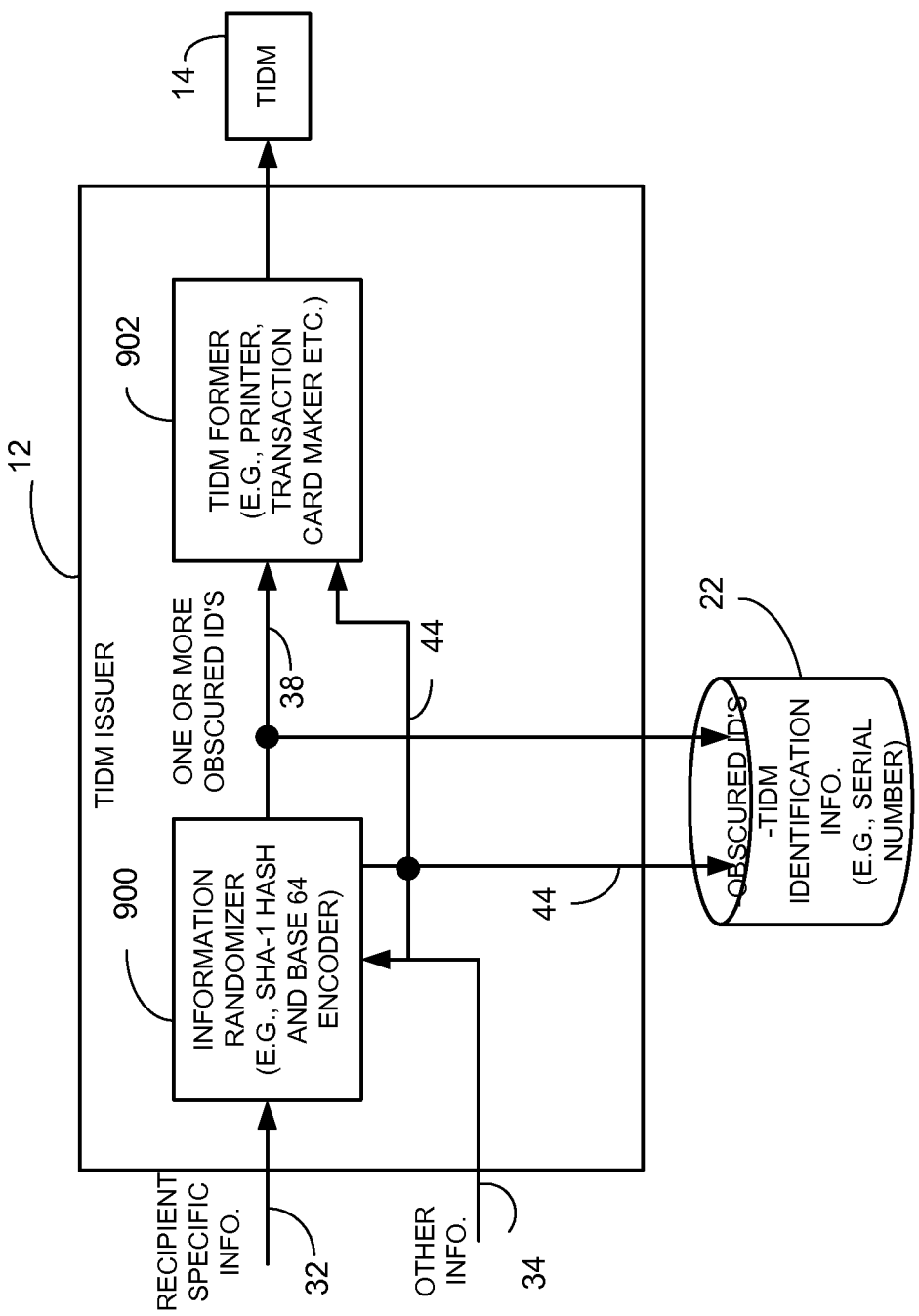
Figure 10:
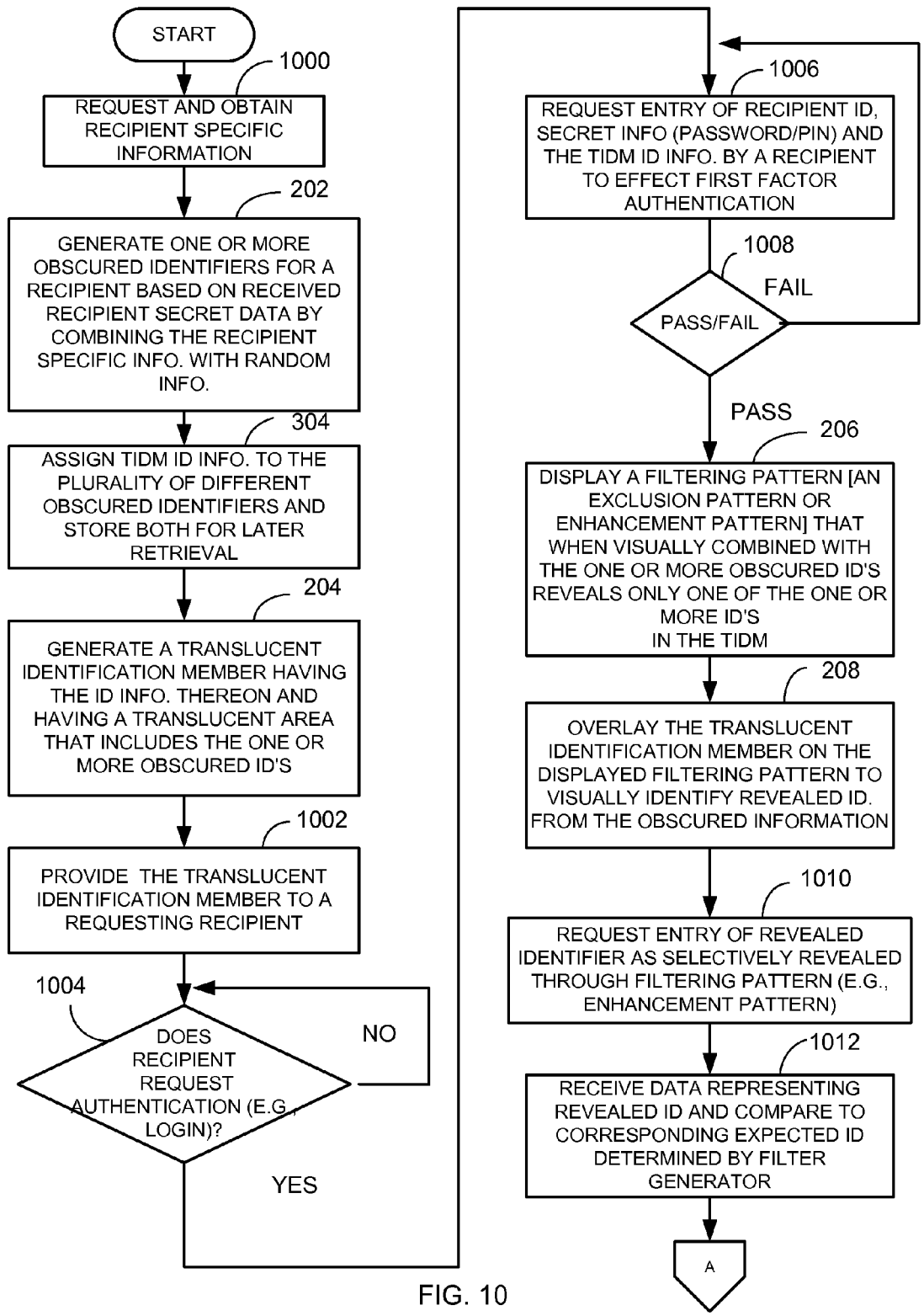
Figure 11:
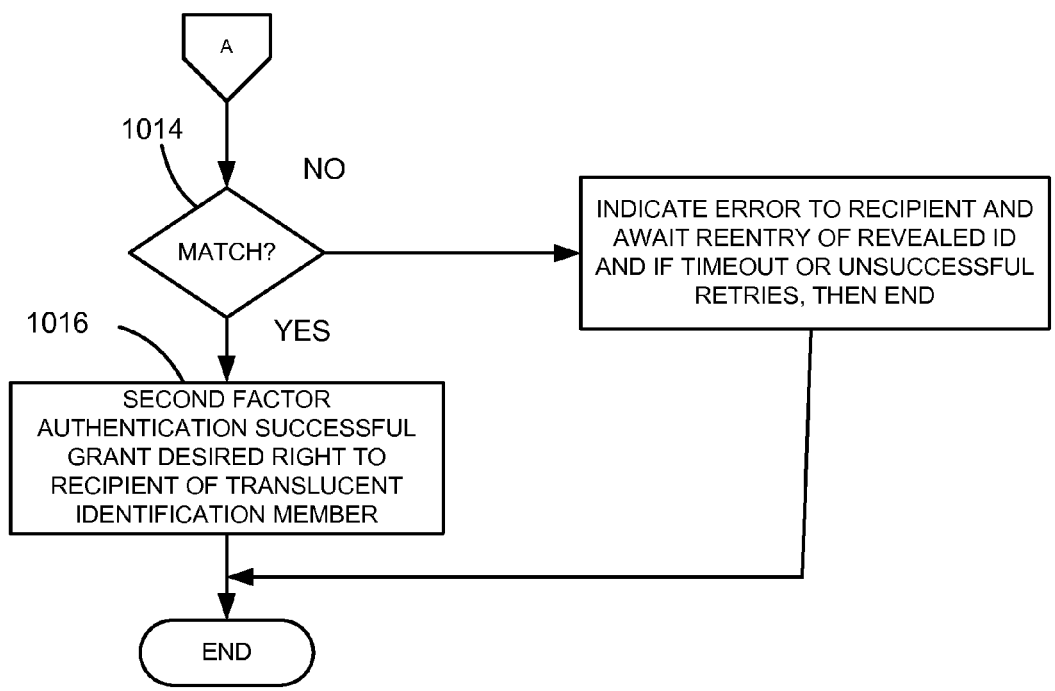
Figure 12:
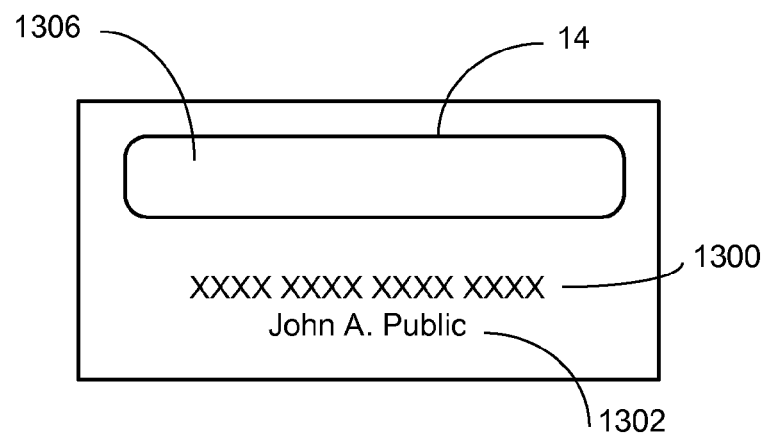
Figure 13:
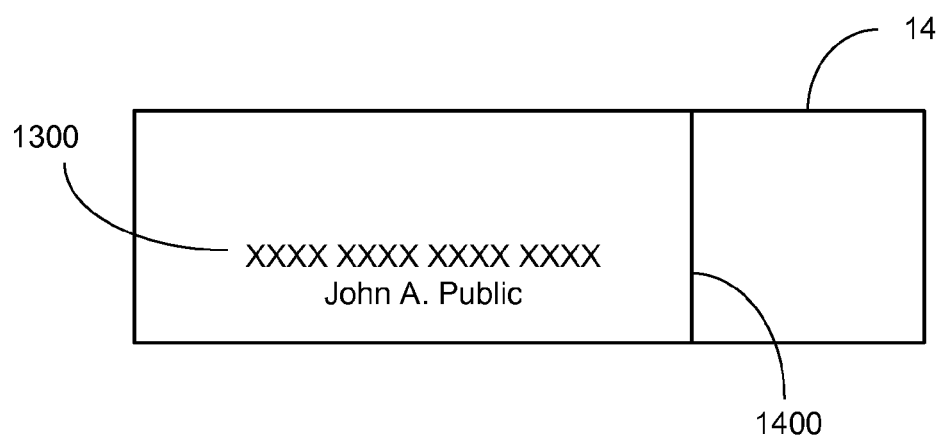
Figure 14:
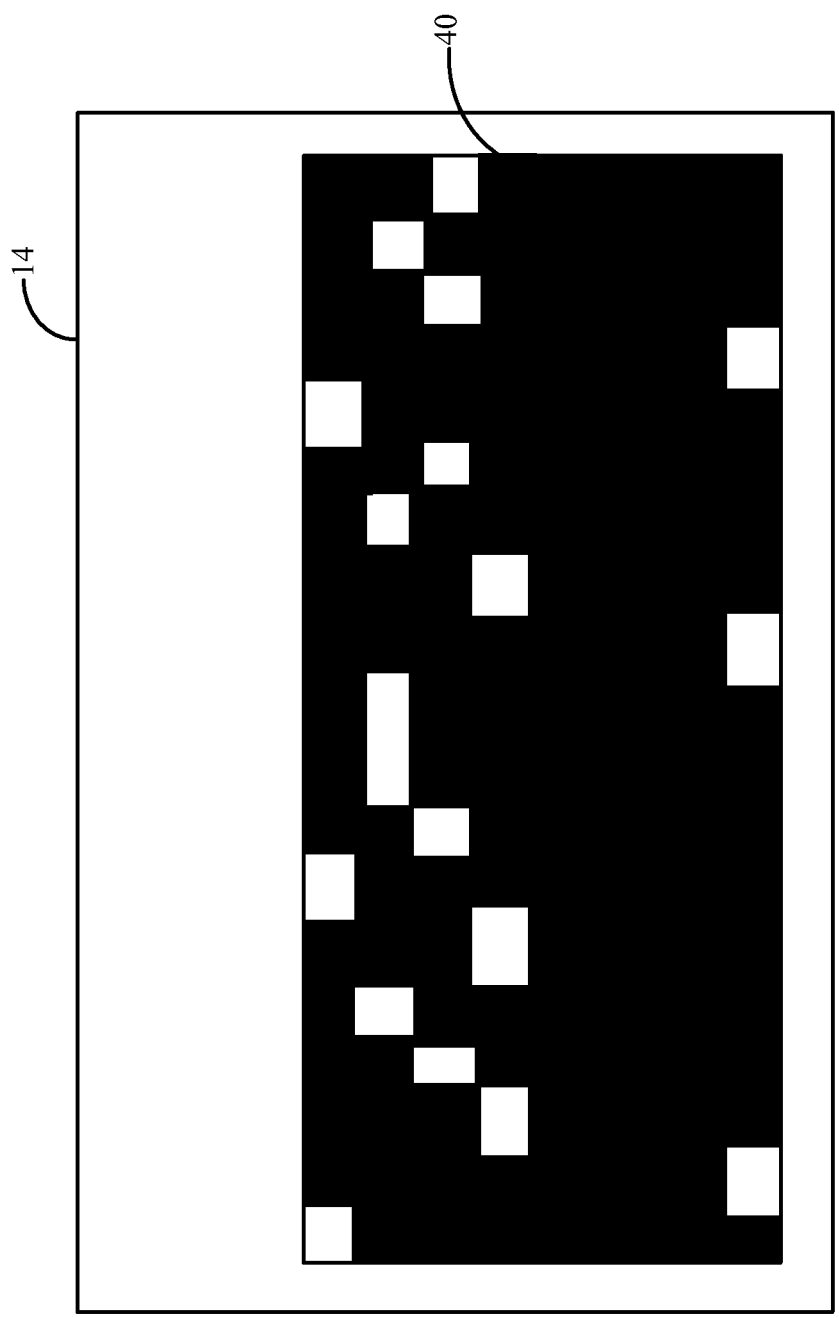
Figure 15:
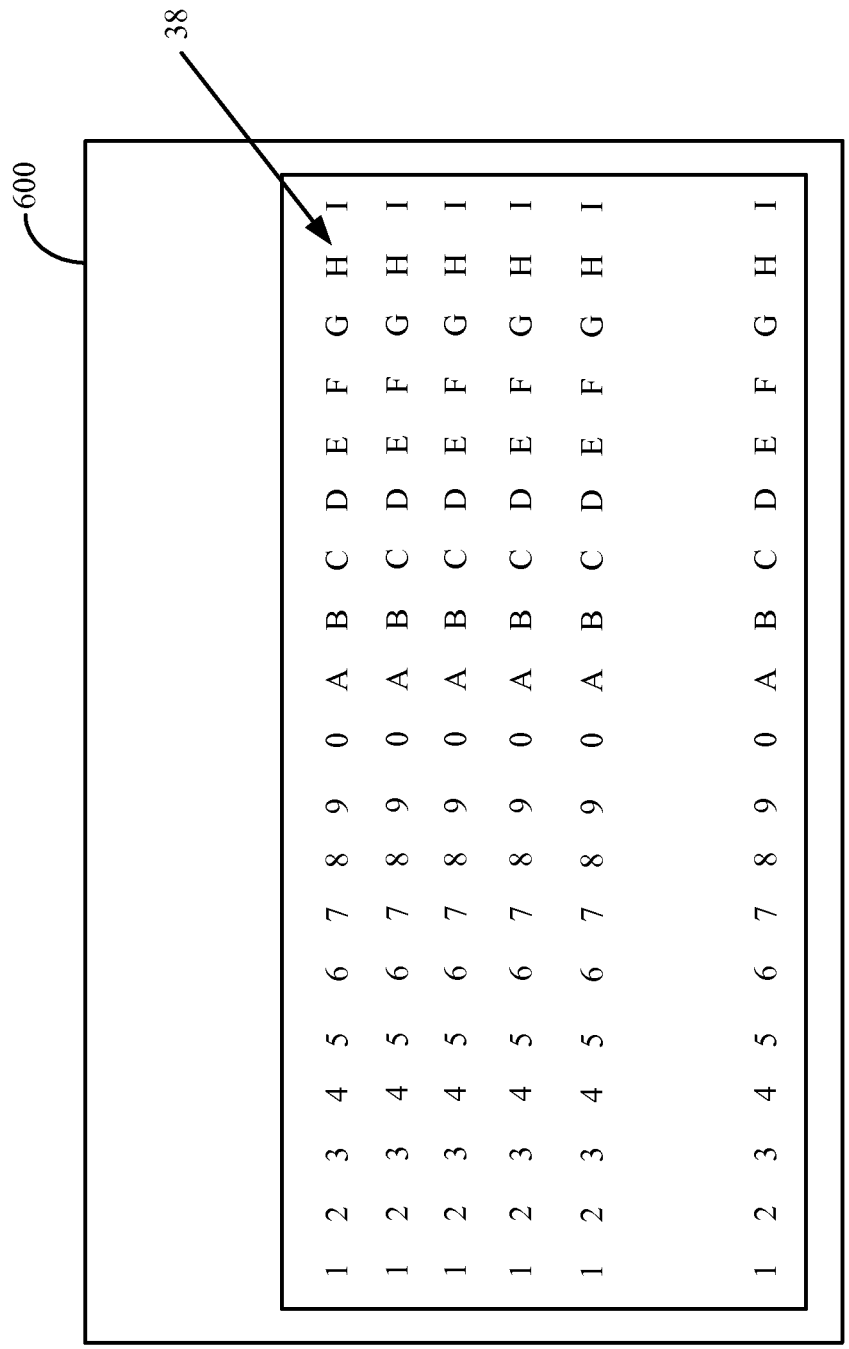
Figure 16:
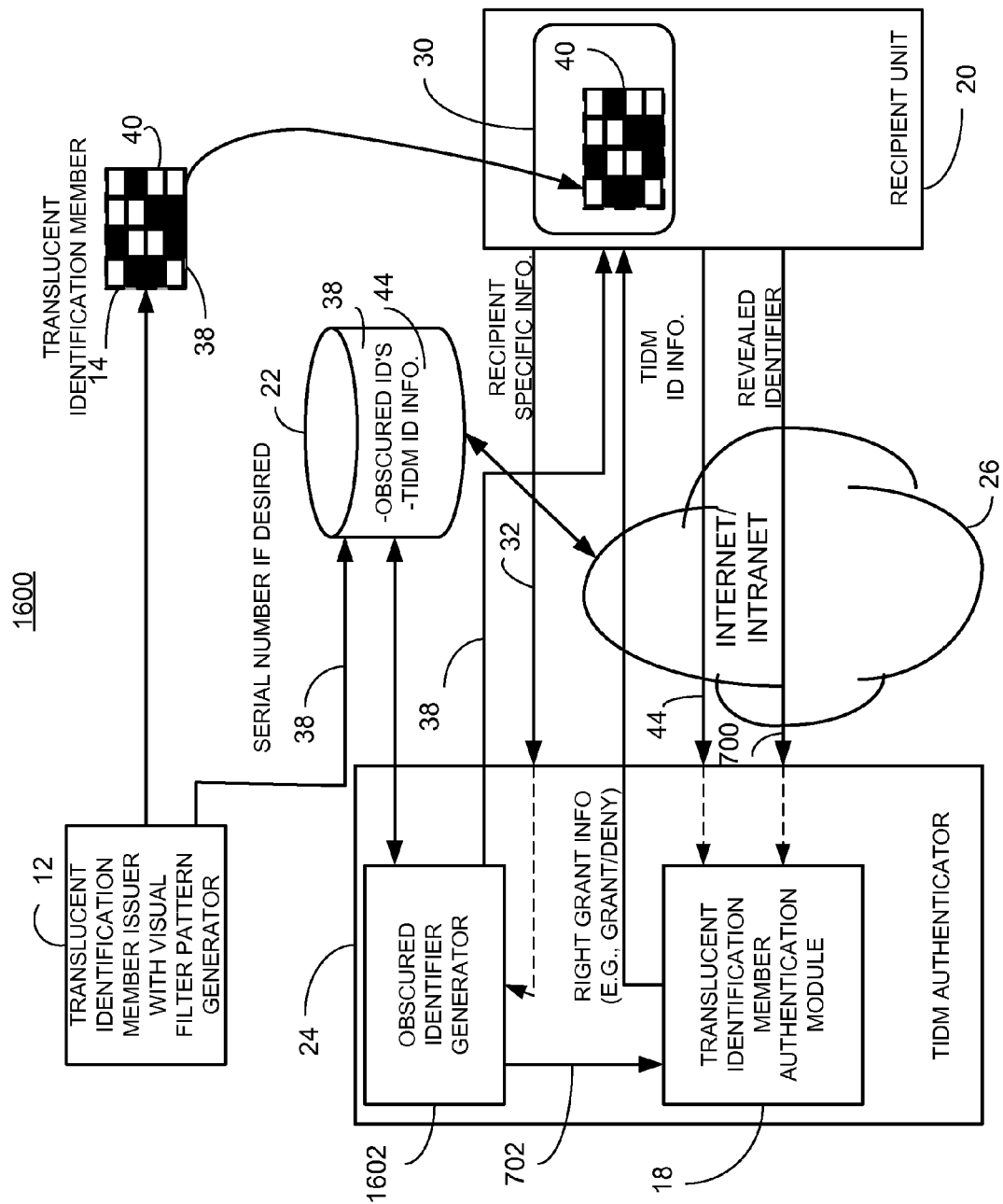
Figure 17:
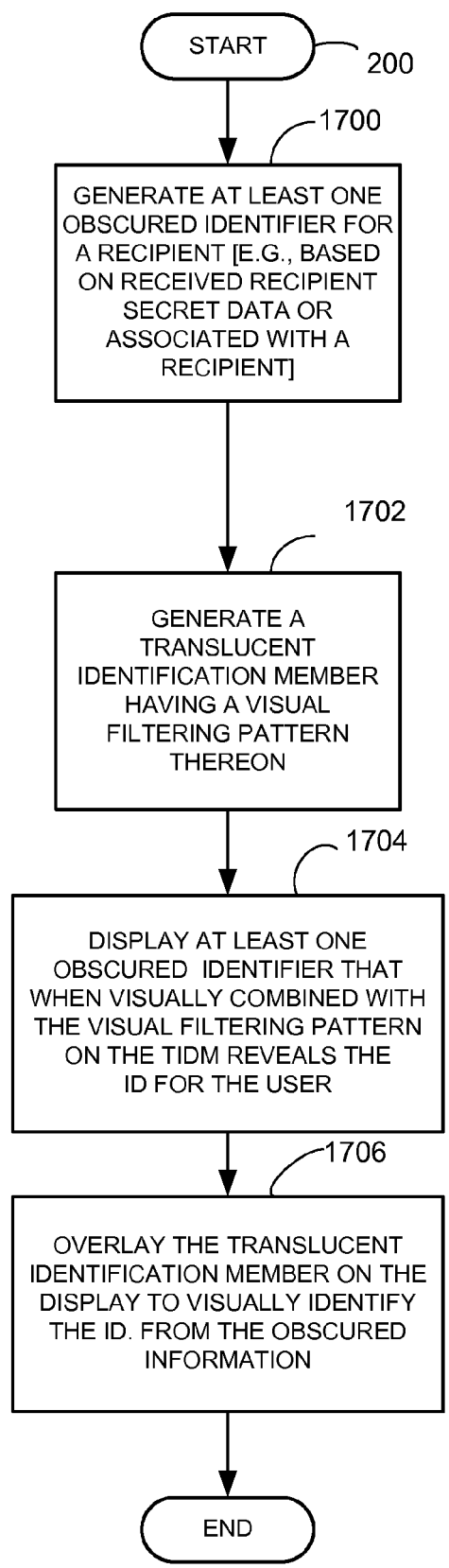
Figure 18:
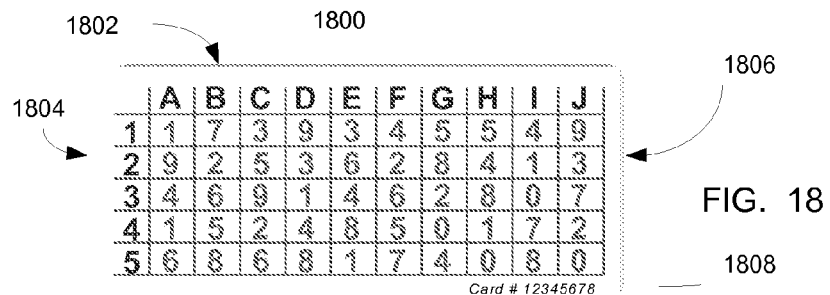
Figure 19:
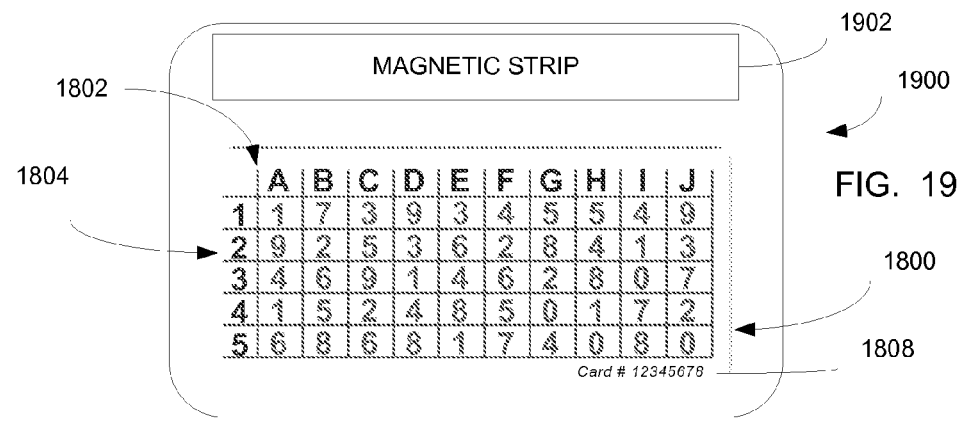
Figure 21:
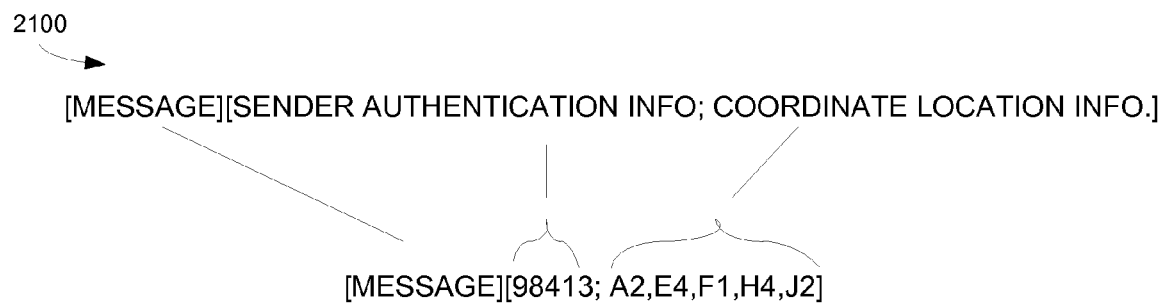
Figure 22:
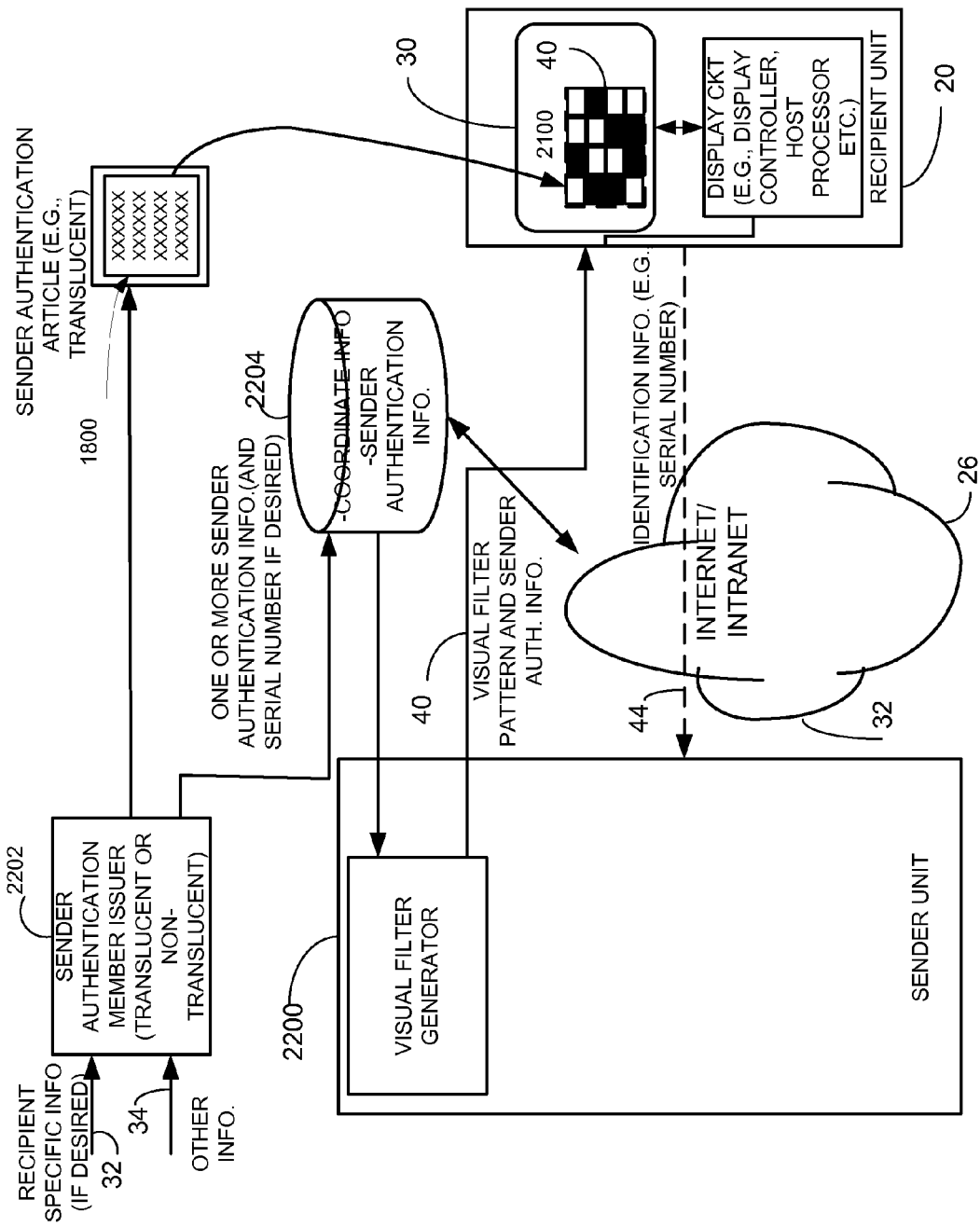

FIG. 6 diagrammatically illustrates one example of a displayed visual filtering pattern in accordance with one embodiment of the disclosure;

FIG. 7 graphically illustrates one example of a visually identified designated identifier from one or more obscured identifiers that are located on a translucent identification member in accordance with one embodiment of the disclosure;

FIG. 8 is a diagram of a system for securely providing identification information in accordance with one embodiment of the disclosure;

FIG. 9 is a block diagram illustrating in more detail one example of a translucent identification member issuer in accordance with one embodiment of the disclosure;

FIGS. 10 and 11 illustrate a flowchart showing one example of a method for securely providing identification information in accordance with one embodiment of the disclosure;

FIG. 12 illustrates one example of a transaction card including a portion containing a translucent identification member in accordance with one embodiment of the disclosure;

FIG. 13 illustrates another example of a transaction card that contains a translucent identification member in accordance with one embodiment of the disclosure;

FIG. 14 is a diagram illustrating one example of a secure identification information member in accordance with another embodiment of the disclosure;

FIG. 15 diagrammatically illustrates one example of displayed obscured identifier information in accordance with one embodiment to the disclosure;

FIG. 16 is a block diagram illustrating another example of a system for securely providing identification information in accordance with one embodiment to the disclosure;

FIG. 17 is a flow chart illustrating one example of a method for securely providing identification information in accordance with one embodiment to the disclosure;

FIG. 18 is an illustration representing one example of an article, such as a card, that may be used in a method for providing electronic message authentication according to one embodiment of the disclosure;

FIG. 19 illustrates one example of a transaction card that includes sender authentication information and location coordinate information for use in providing electronic message authentication in accordance with one embodiment of the disclosure;

FIG. 20 is a flow chart illustrating one example of a method for providing electronic message authentication in accordance with one embodiment of the disclosure;

FIG. 21 is a graphic illustration showing one example of a message with appended sender authentication information and location coordinate information in accordance with one embodiment of the disclosure;

FIG. 22 is a block diagram illustrating one example of a system for providing electronic message authentication in accordance with one embodiment of the disclosure;

FIG. 23 is a flowchart illustrating one example of a method for providing electronic message authentication in accordance with one embodiment of the disclosure.

Figure 24:
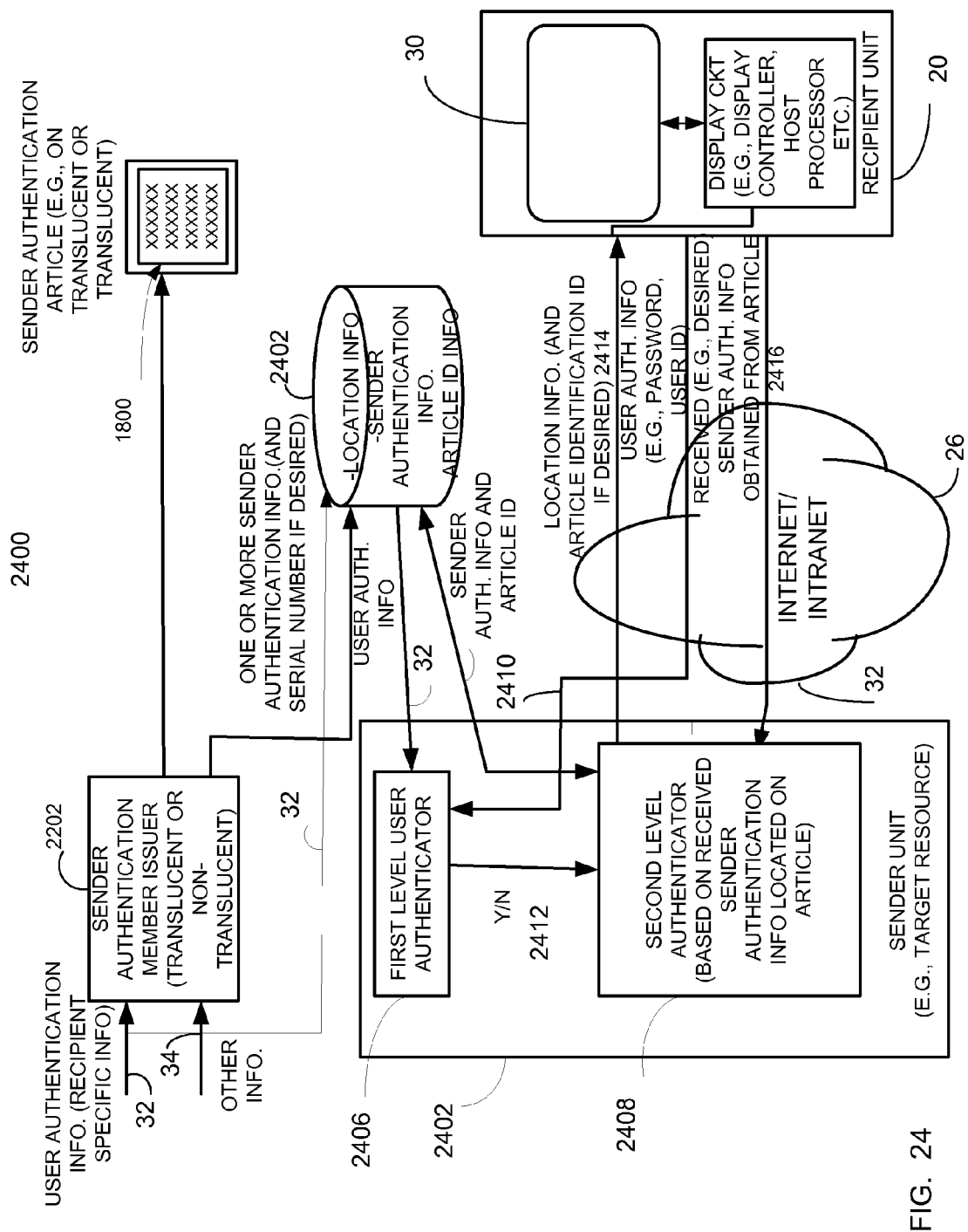
Figure 25:
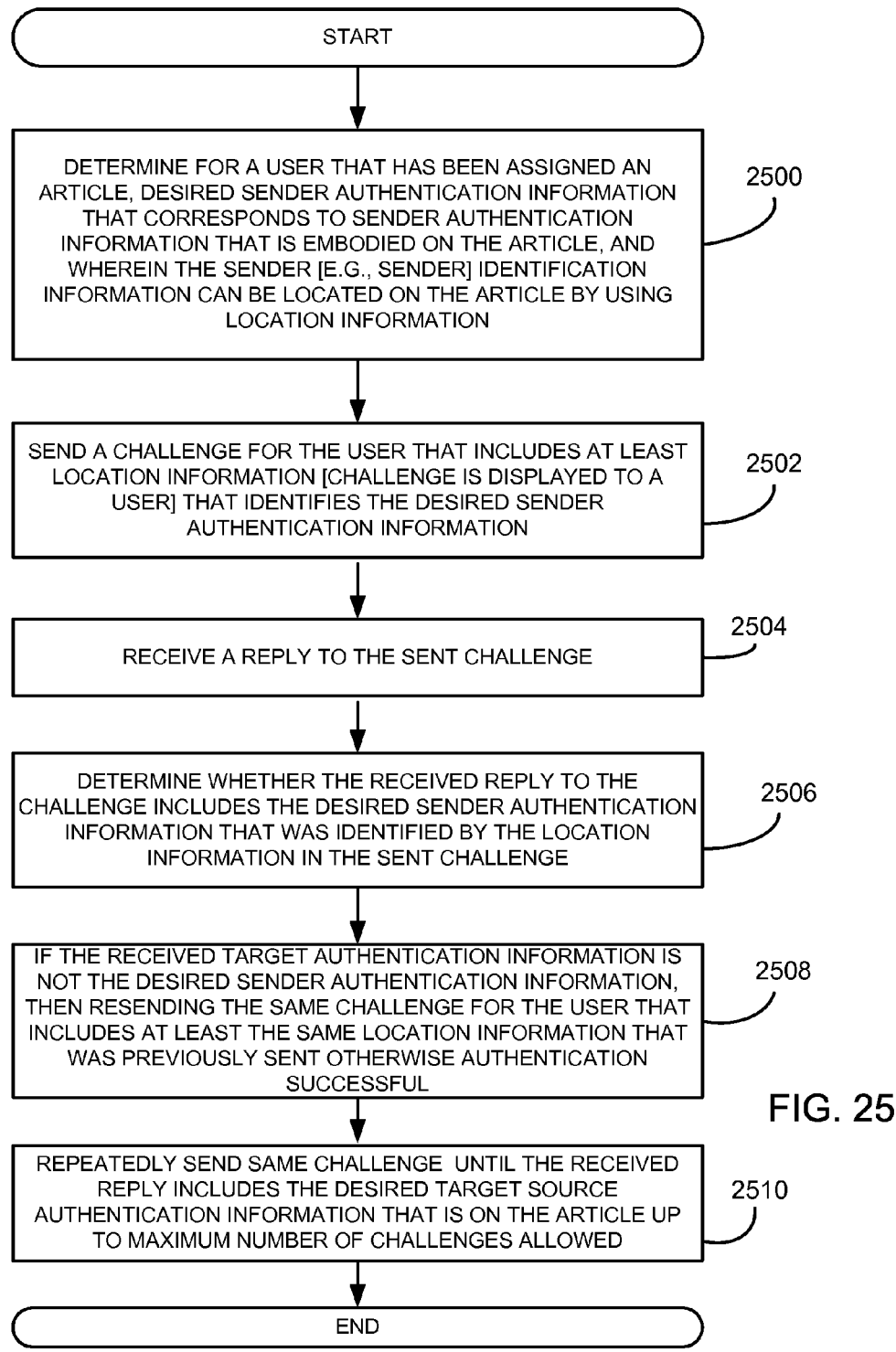
Figure 26:
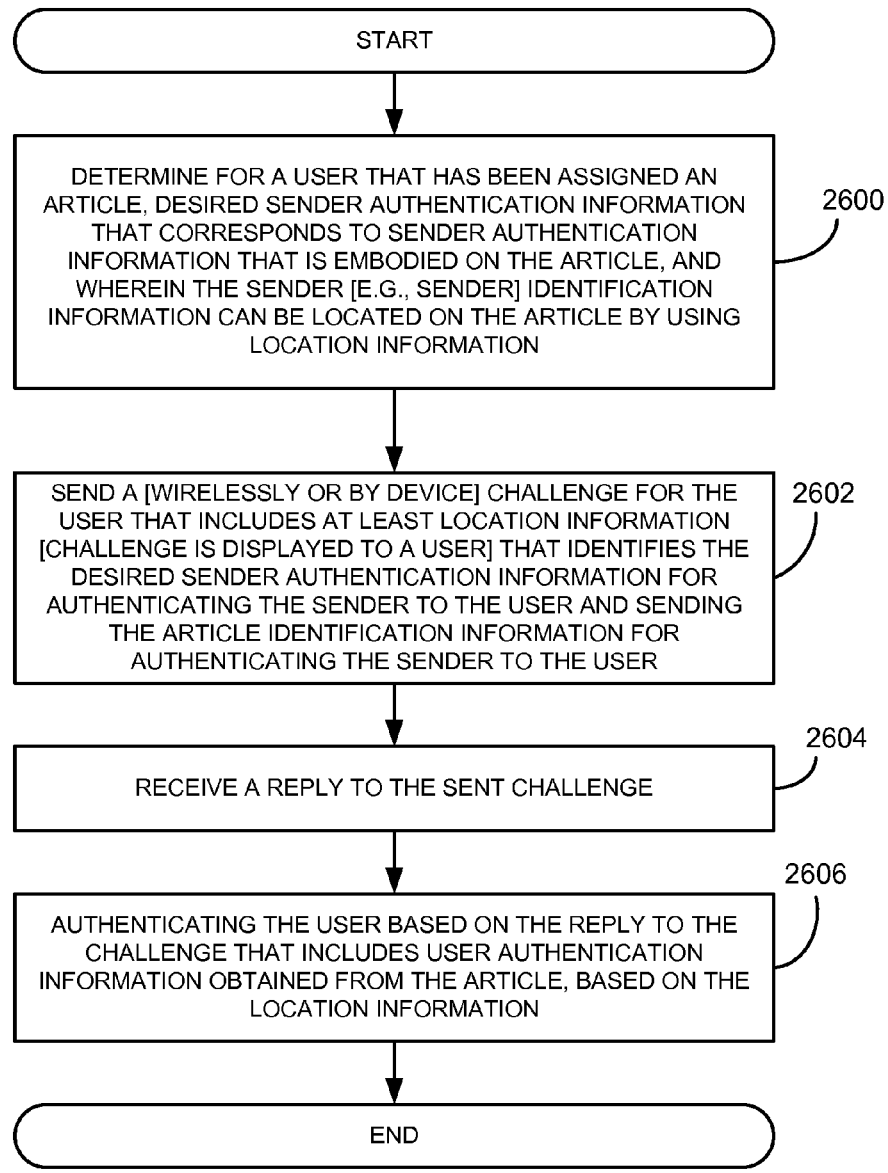
Figure 27:
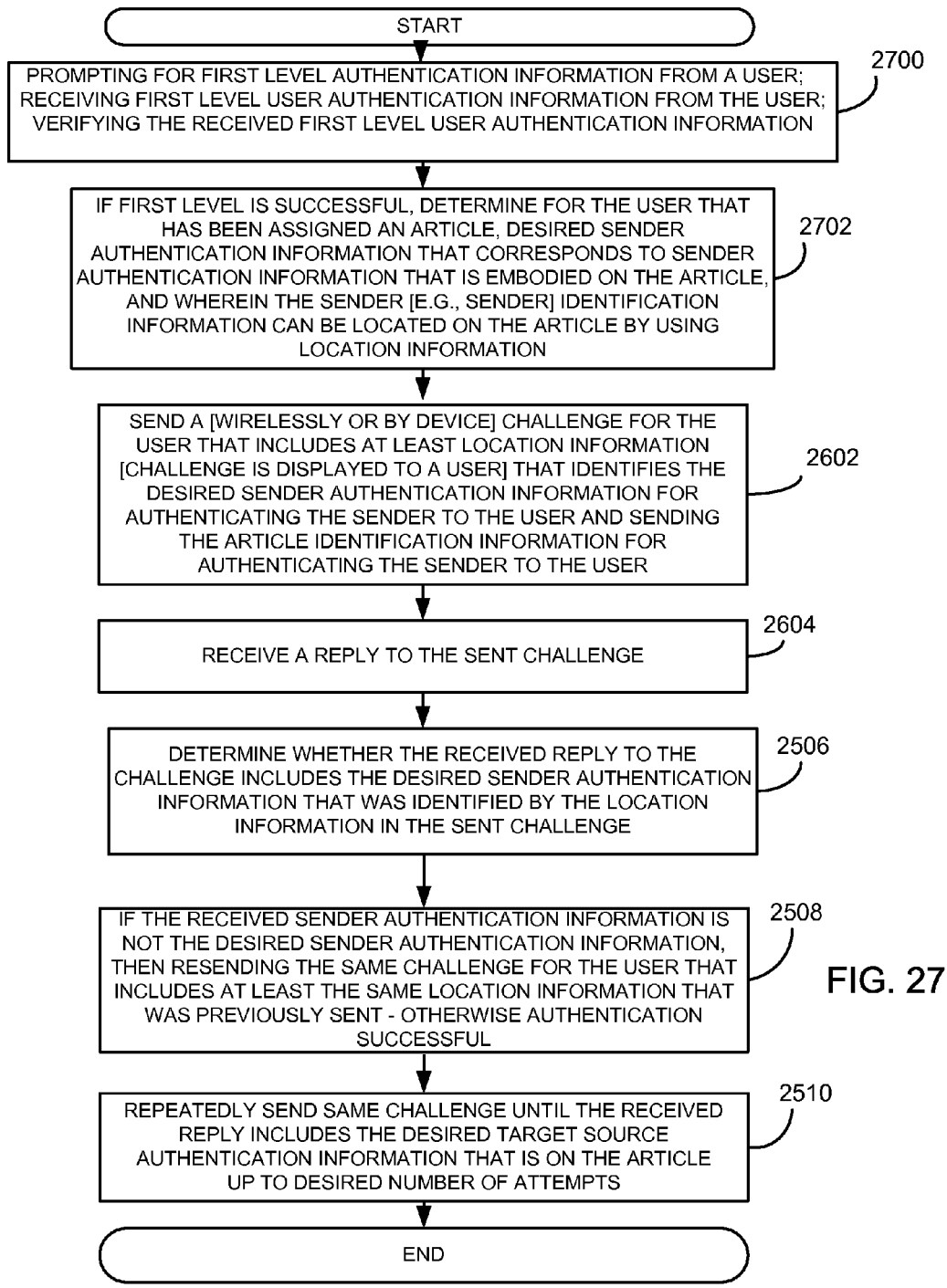
Figure 28:
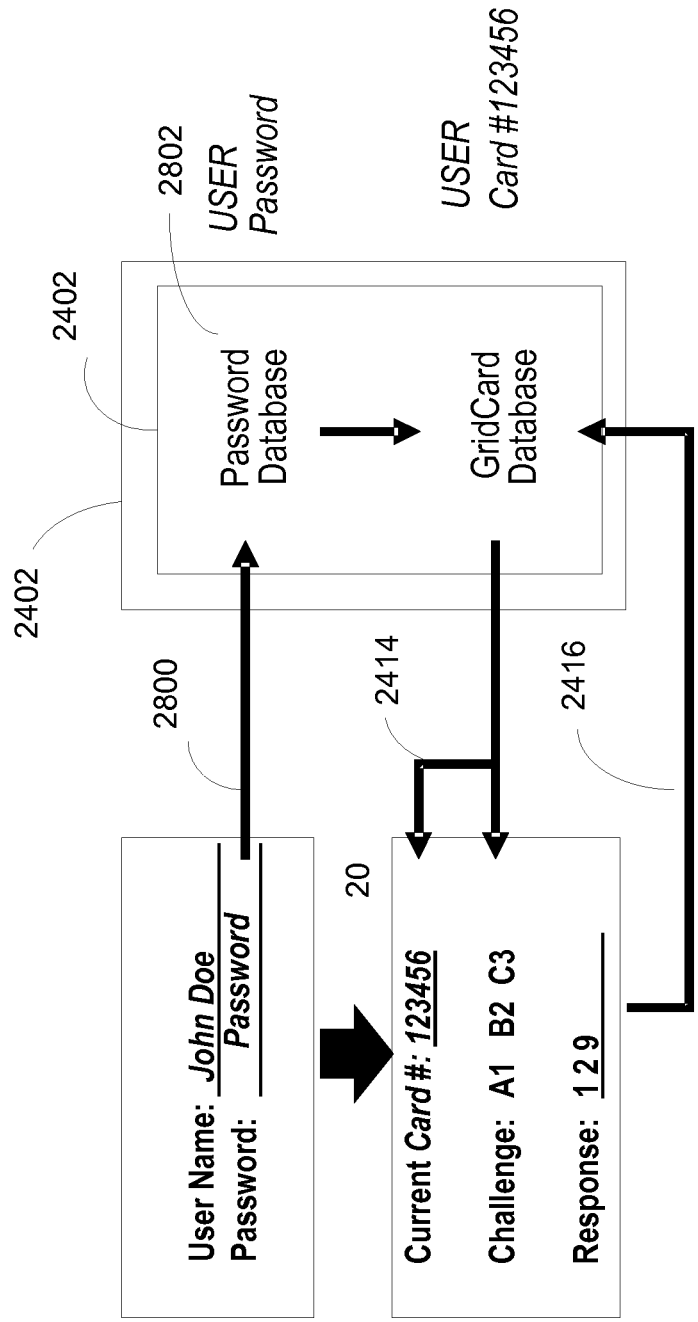
Figure 29:
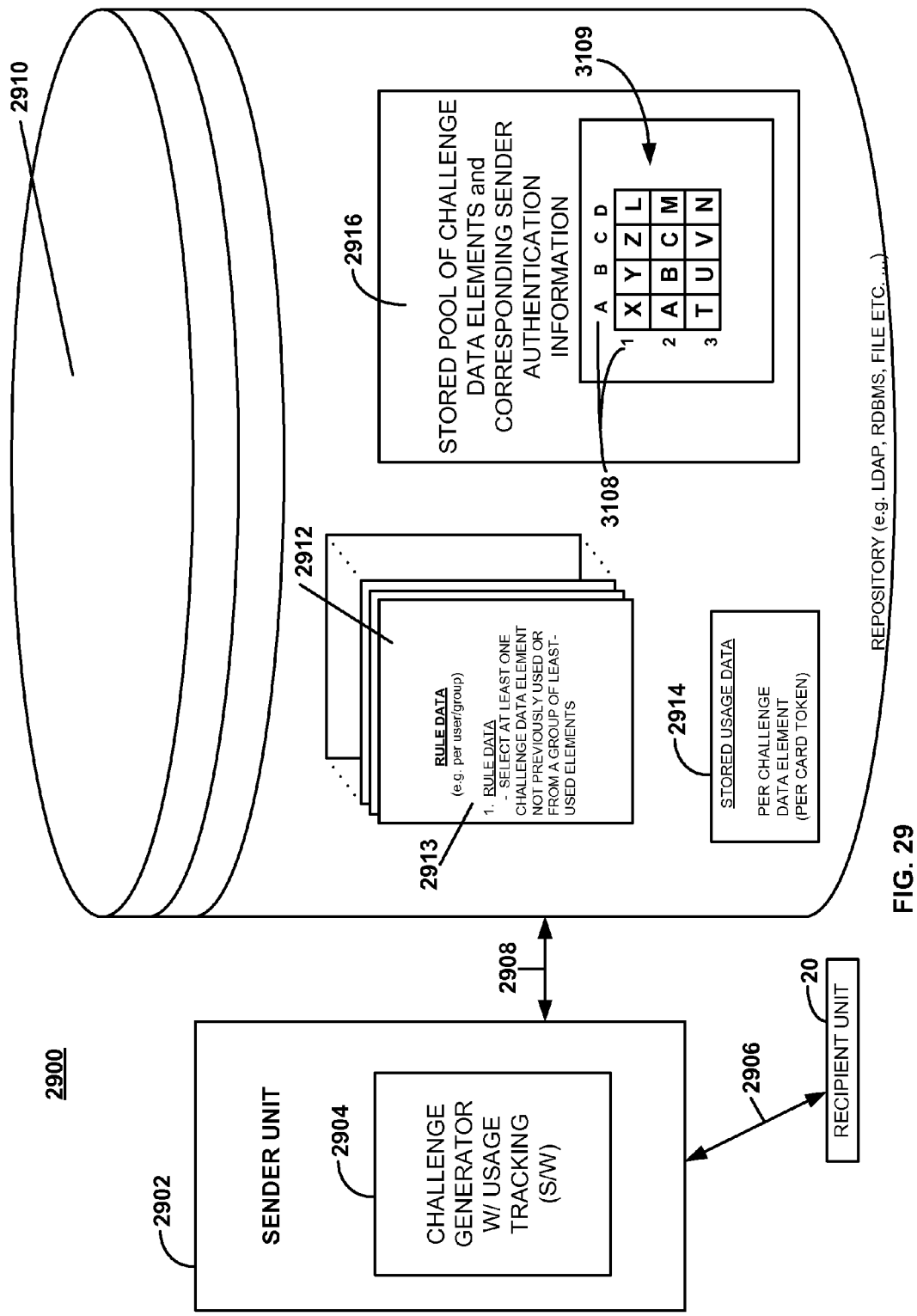
Figure 30:
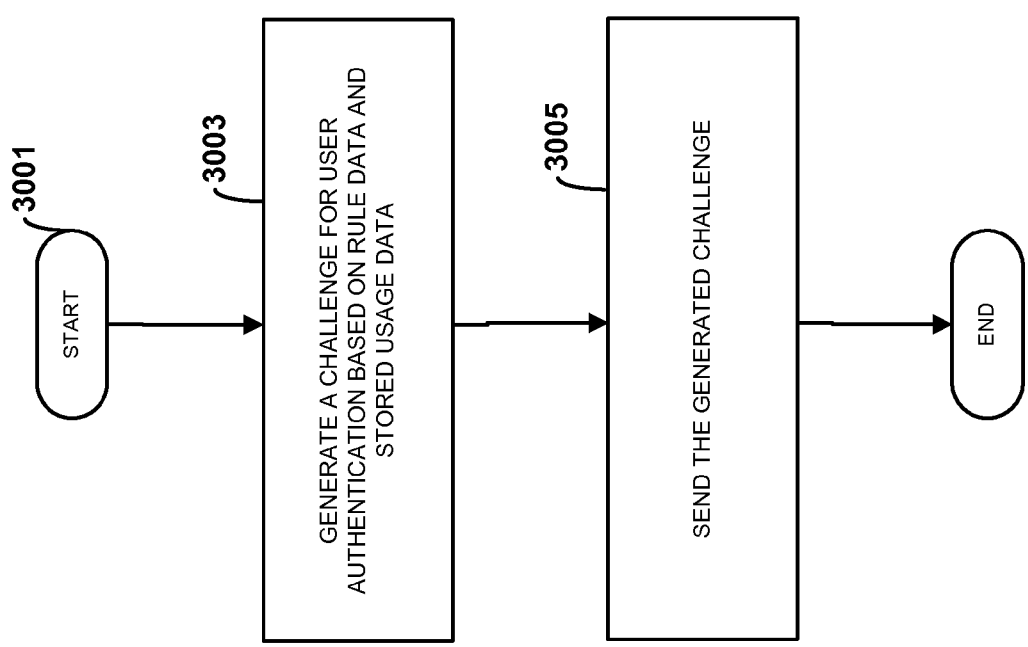
Figure 31:
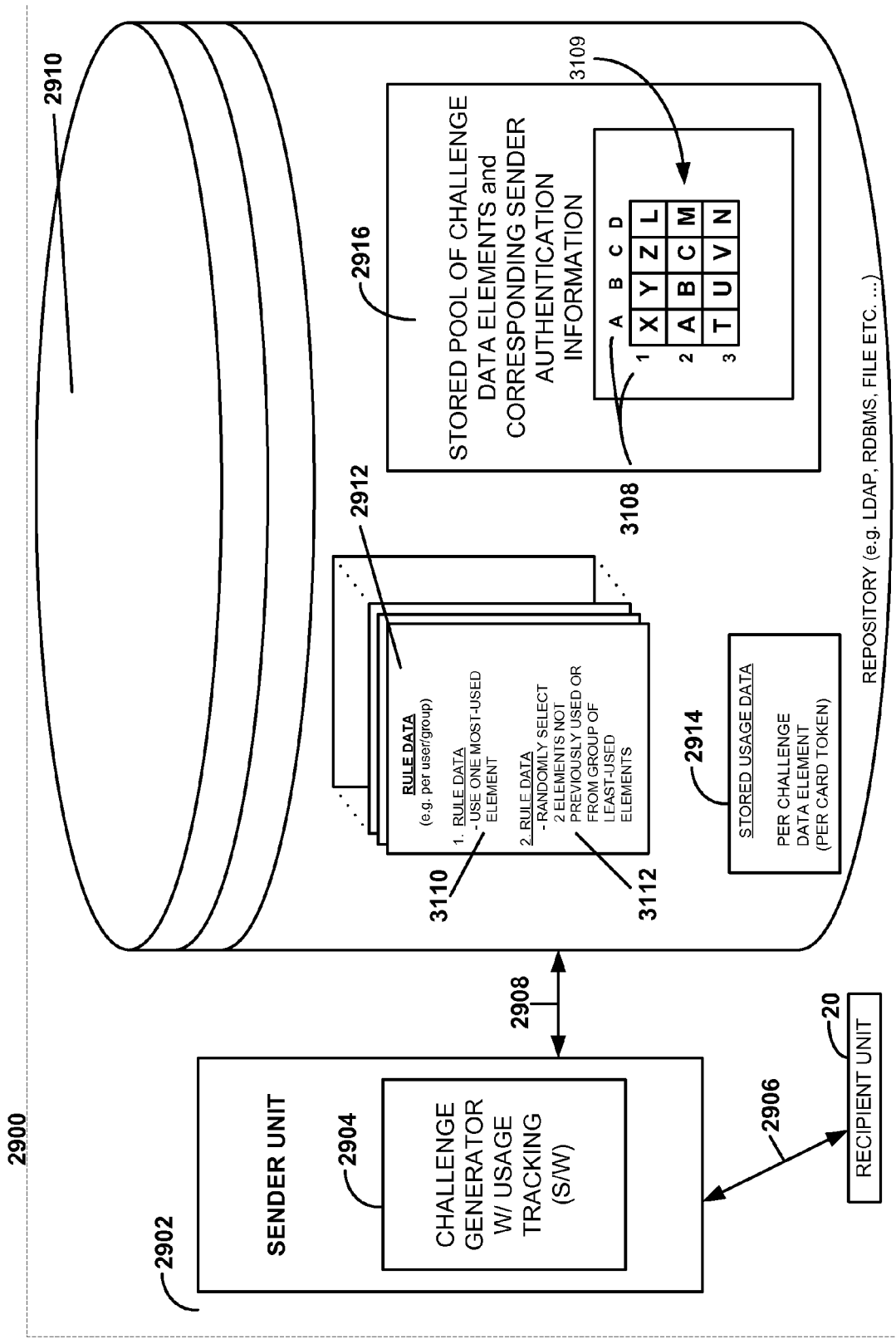
Figure 32:
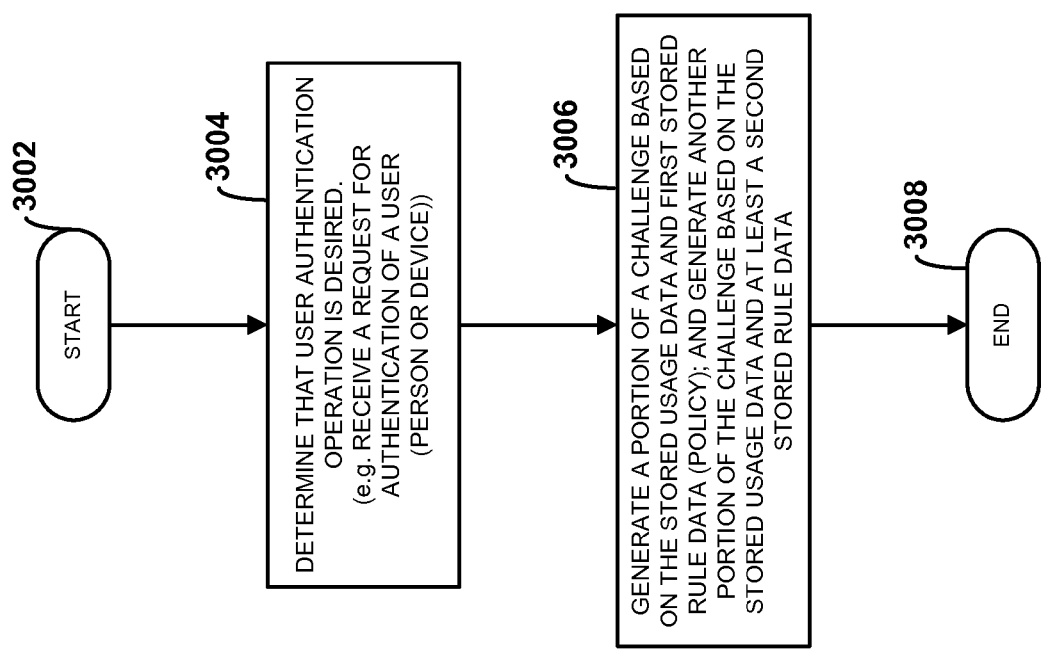
Figure 33:
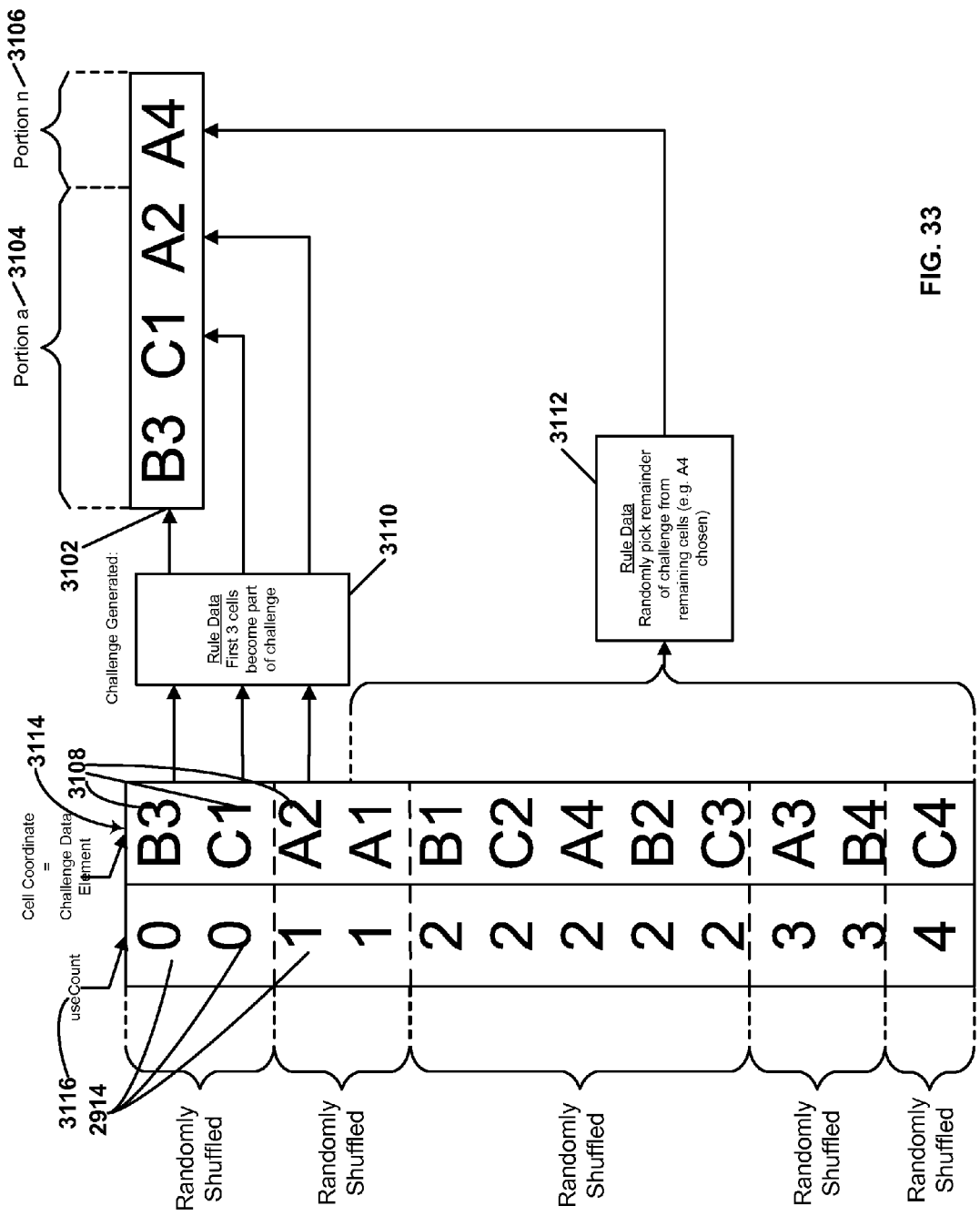
Figure 34:
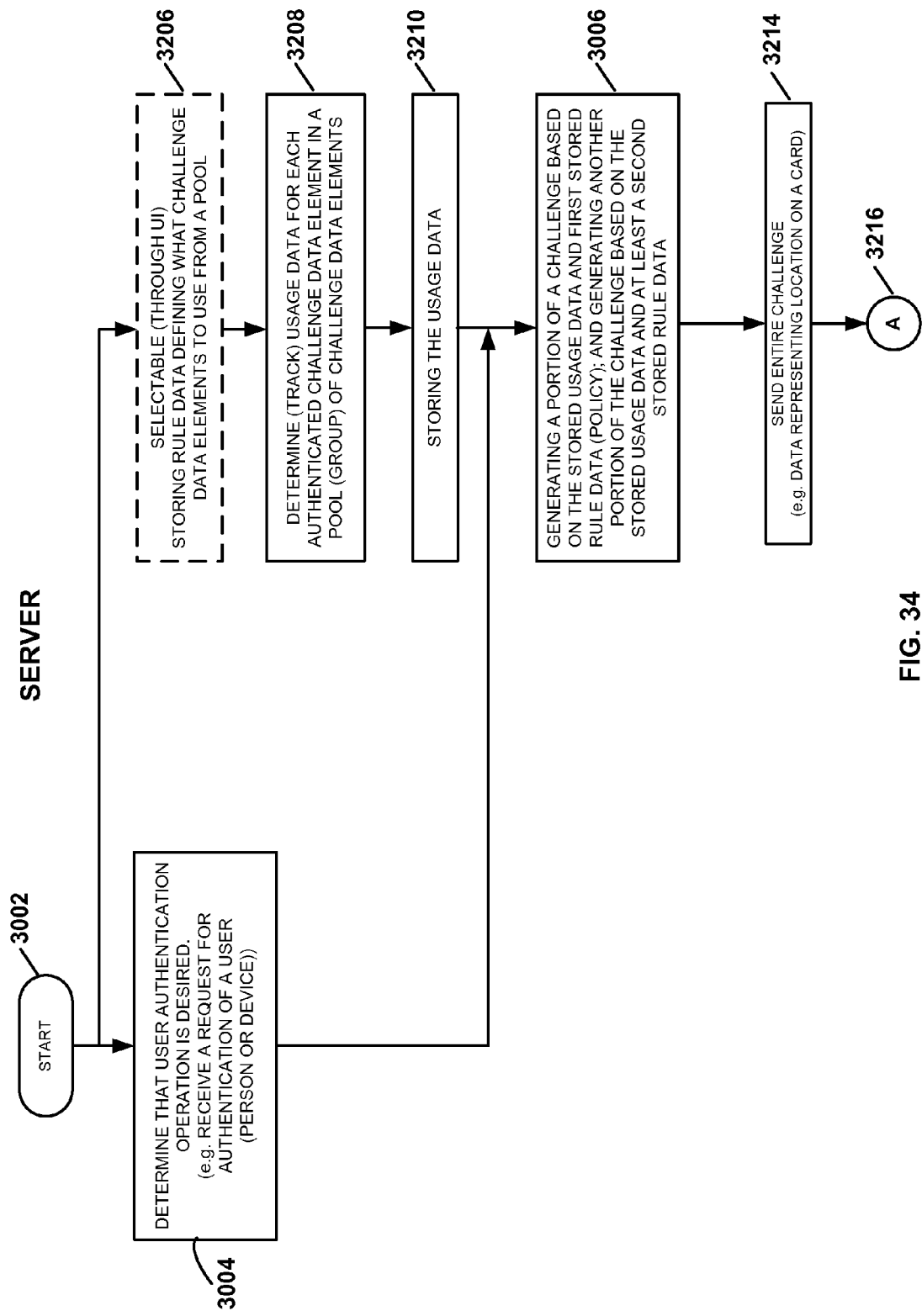
Figure 35:
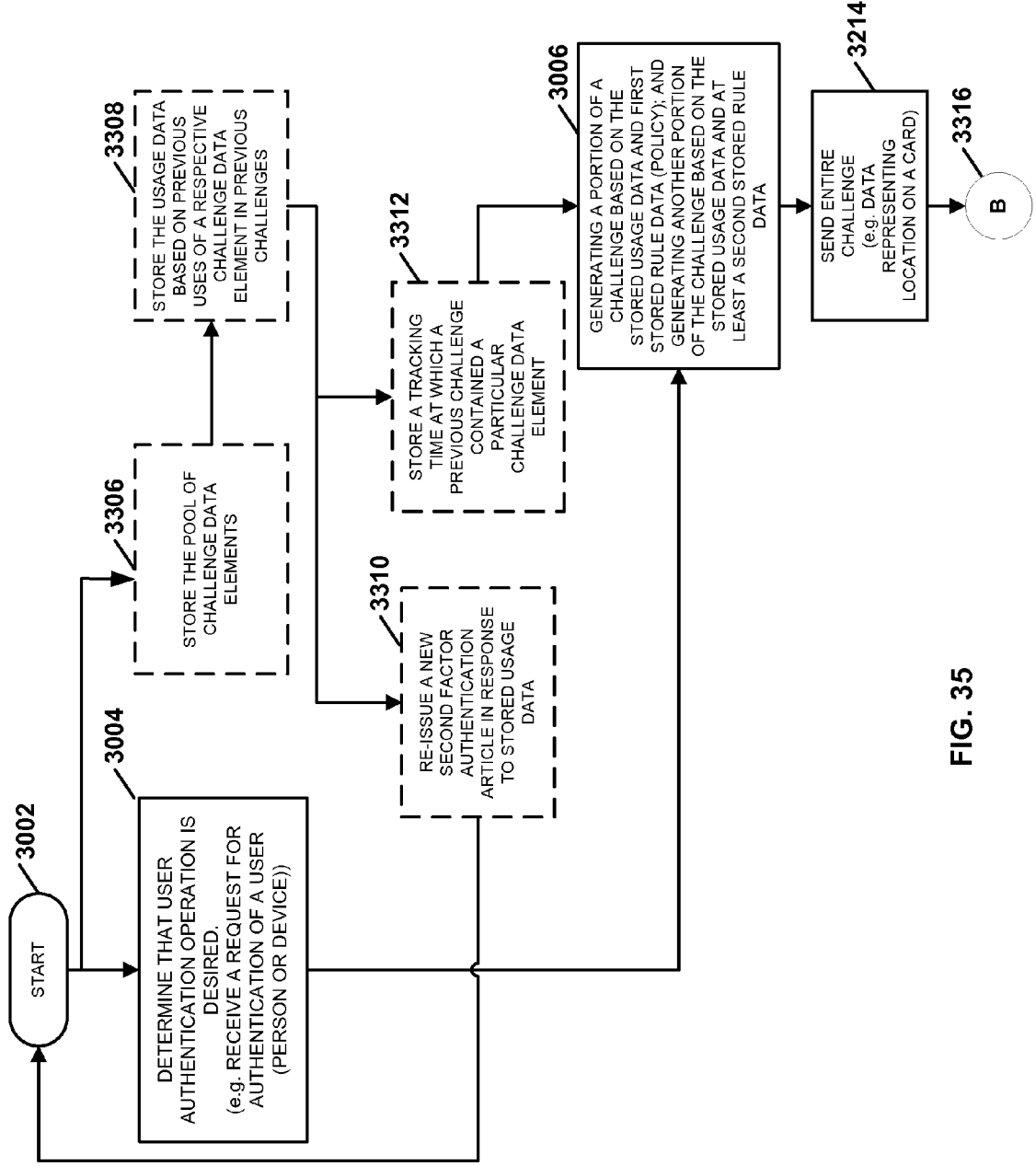
Figure 36:
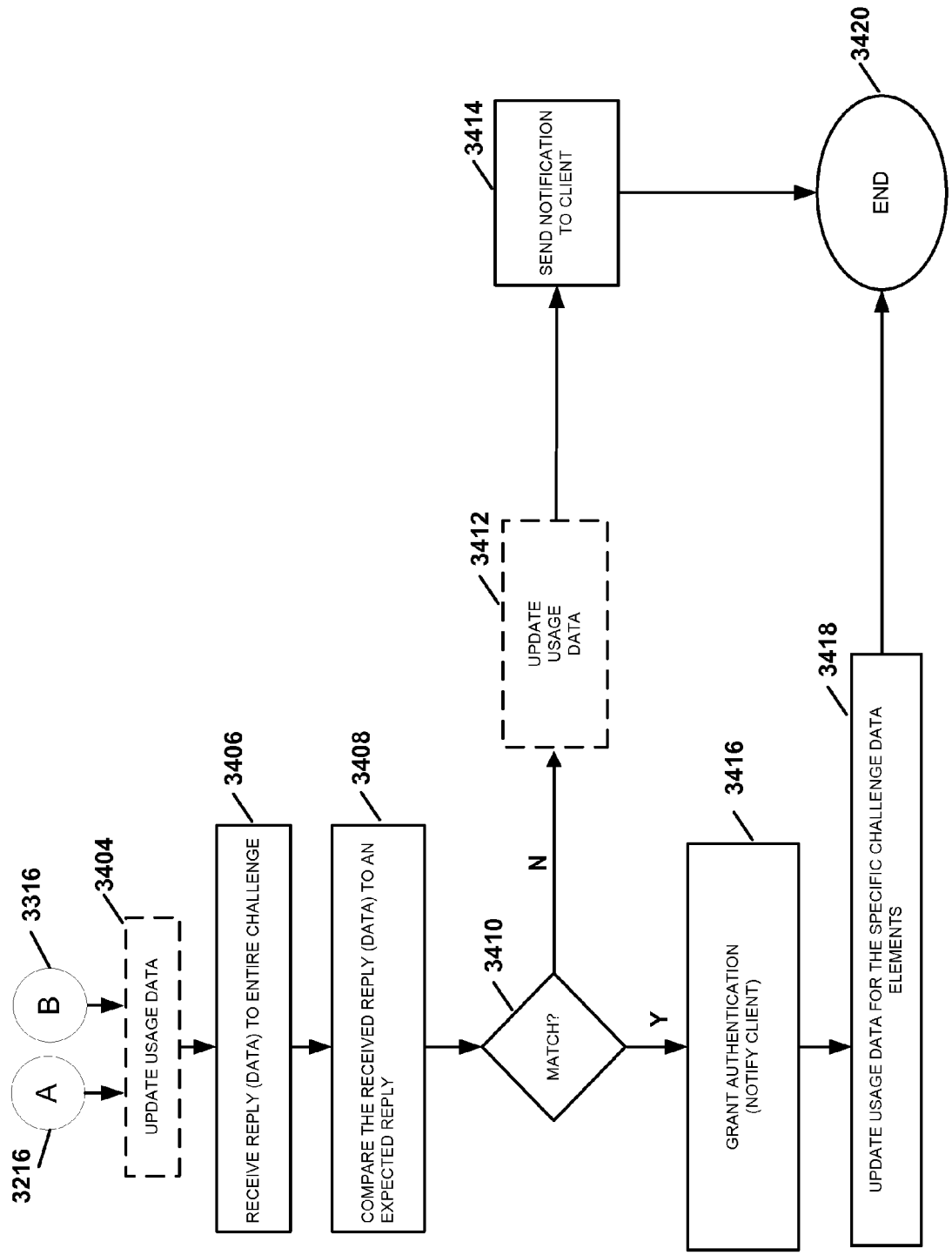
Figure 37:
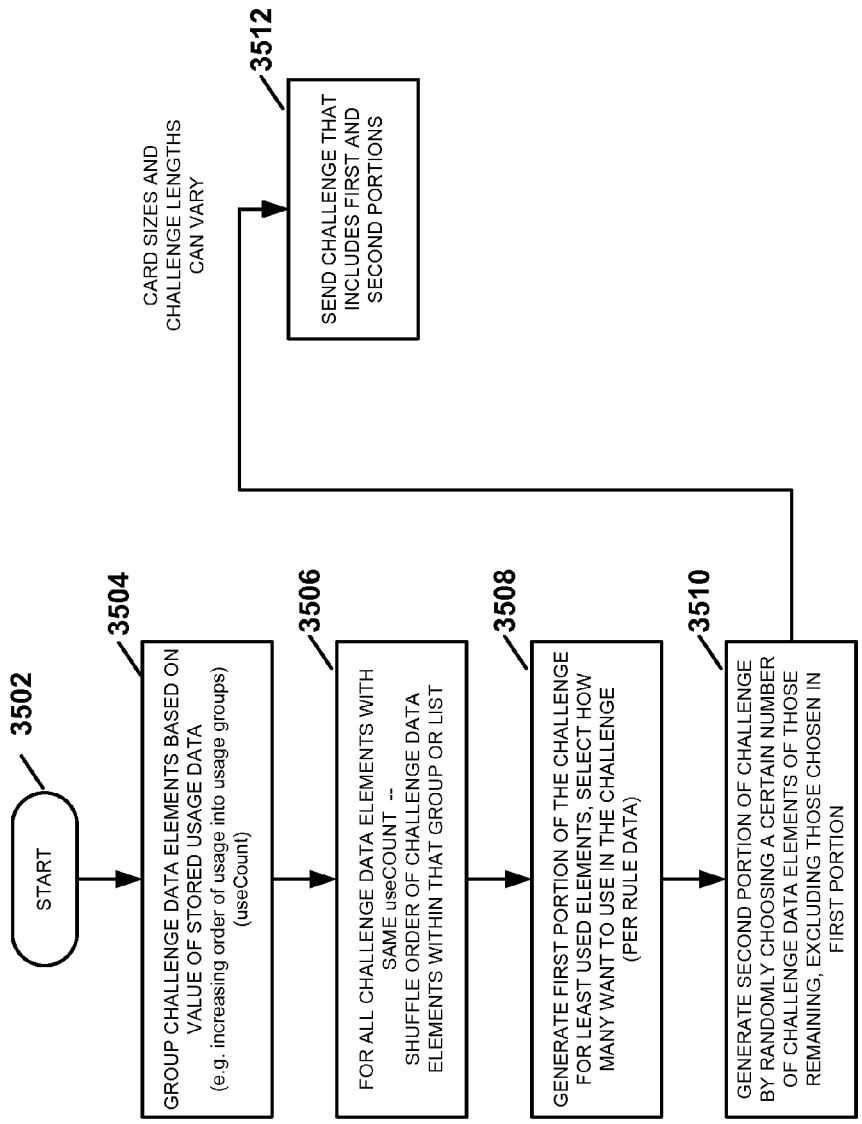
Figure 38:
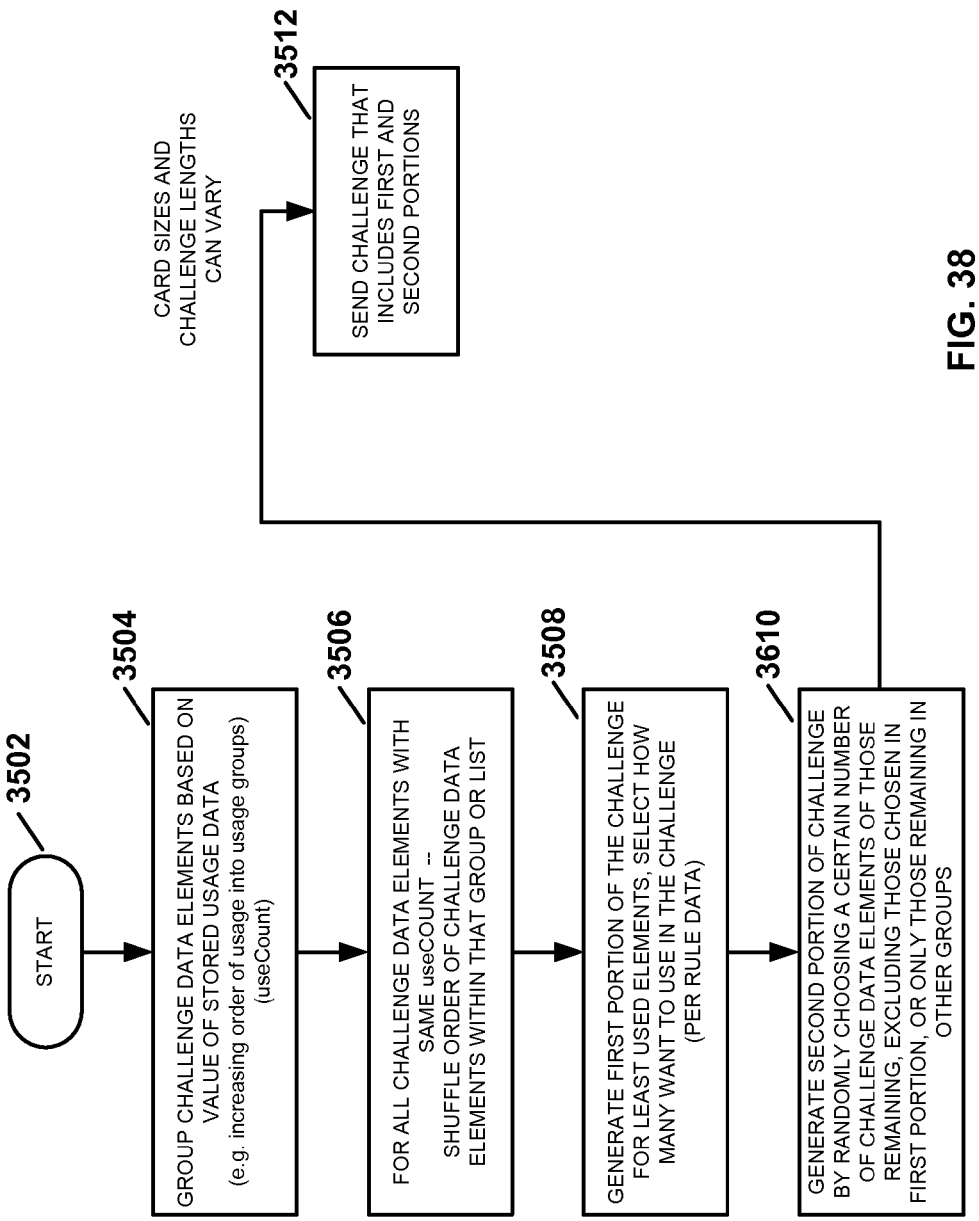
Figure 39:
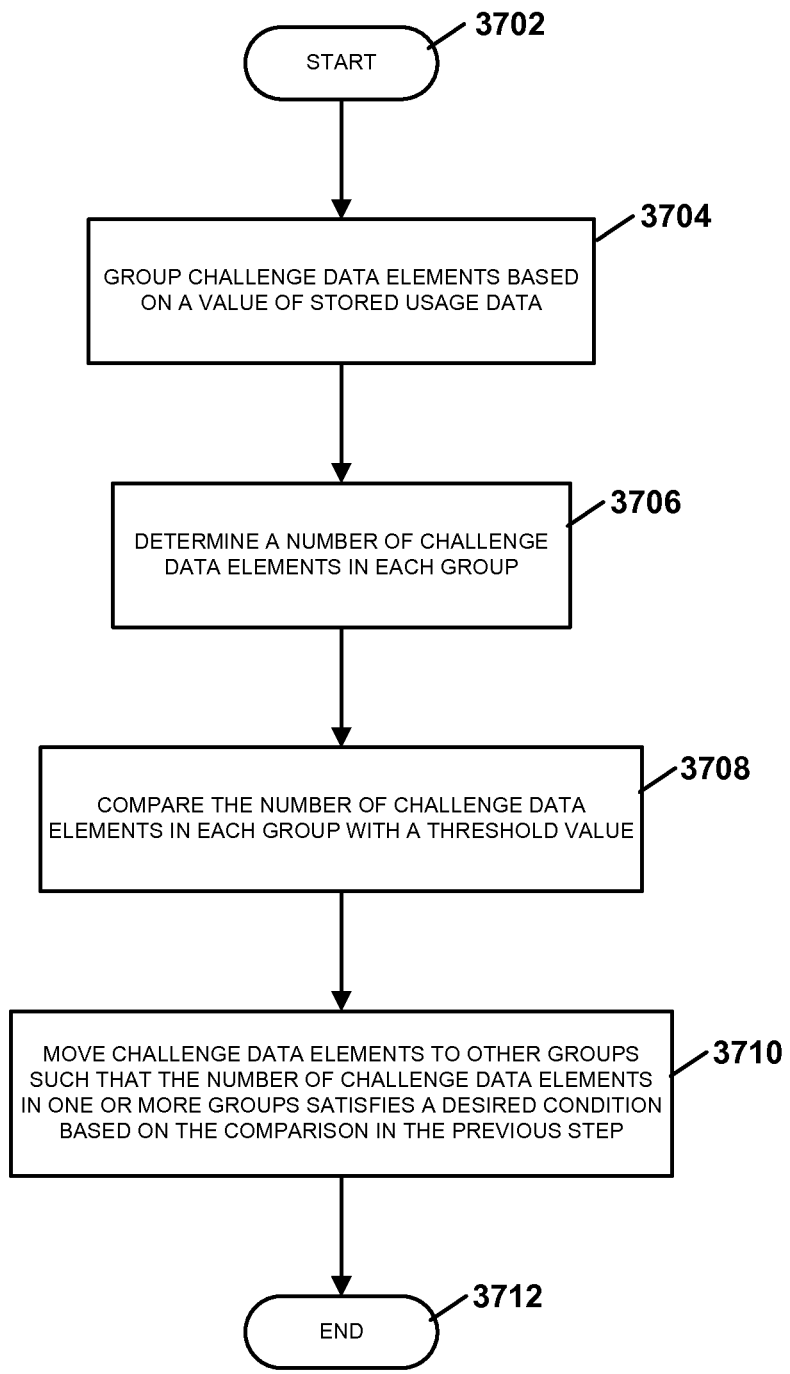

FIG. 24 is a block diagram illustrating one example of a system for providing mutual authentication between a user and a target resource in accordance with one embodiment of the disclosure;

FIG. 25 is a flowchart illustrating one example of a method for providing mutual authentication between a user and a target resource in accordance with one embodiment of the disclosure;

FIG. 26 is a flowchart illustrating an example of another embodiment of a method for providing mutual authentication between a user and a target resource in accordance with one embodiment of the disclosure;

FIG. 27 is a flowchart illustrating another example of a method for providing mutual authentication between a user and a target resource in accordance with one embodiment of the disclosure;

FIG. 28 is a block diagram illustrating one example of a device for providing mutual authentication between a user and a target resource in the form of a diagrammatical representation, in accordance with one embodiment of the disclosure; and FIG. 29 is a block diagram showing one example of a system for providing authentication of a user to a sender in accordance with one embodiment of the disclosure;

FIG. 30 is a flow chart illustrating one example of a method for providing authentication of a user to a sender in accordance with one embodiment of the disclosure;

FIG. 31 is a block diagram showing one example of a system for providing authentication of a user to a sender in accordance with one embodiment of the disclosure;

FIG. 32 is a flow chart illustrating one example of a method for providing authentication of a user to a sender in accordance with another embodiment of the disclosure;

FIG. 33 is a diagram illustrating one example of usage data and corresponding challenge data elements to produce a challenge in accordance with one embodiment of the disclosure;

FIG. 34 is a flow chart illustrating one example of a method for providing authentication of a user to a sender in accordance with one embodiment of the disclosure;

FIG. 35 is a flow chart illustrating one example of a method for providing authentication of a user to a sender in accordance with one embodiment of the disclosure;

FIG. 36 is a flow chart illustrating one example of a method for providing authentication of a user to a sender in accordance with one embodiment of the disclosure;

FIG. 37 is a flow chart illustrating one example of a method for providing authentication of a user to a sender in accordance with one embodiment of the disclosure;

FIG. 38 is a flow chart illustrating one example of a method for providing authentication of a user to a sender in accordance with one embodiment of the disclosure; and FIG. 39 is a flow chart illustrating one example of a method for providing authentication of a user to a sender in accordance with one embodiment of the disclosure.

DETAILED DESCRIPTION OF A PREFERRED EMBODIMENT OF THE DISCLOSURE

Briefly, a method, apparatus and/or system generates a challenge for user authentication, having a challenge data element from a stored pool of challenge data elements. The challenge is based on rule data and stored usage data associated with at least some of the challenge data elements in the stored pool of challenge data elements. The generated challenge is sent for use in an authentication of a user to a sender. Among other advantages, methods, devices and system are disclosed that provide a way to implement security policy features to secure authentication of both an end user (e.g., using a recipient device) and a sending unit or target organization that can remove security concerns that could potentially result from a system randomly generating a challenge/reply set.

In another embodiment, a method for providing authentication of a user to a sender includes generating a challenge for user authentication wherein the challenge includes at least a first portion and a second portion. The first portion of the challenge is generated based on stored usage data corresponding to the challenge data elements and first rule data. A second portion of the challenge is generated based stored usage data, corresponding to at least another challenge data element, and second (i.e., different) rule data.

In another embodiment, a method is disclosed for providing mutual authentication between a user and a sending unit, (i.e. target resource) in one embodiment, that includes determining, for a user that has been assigned an article, such as a card or other suitable article that has indicia thereon, desired sender authentication information that corresponds to actual sender authentication information that is embodied on the article. The sender authentication information can be located on the article by using the location information provided by the sending unit in a challenge. The method includes determining for the user, corresponding article identification information, such as a serial number that has been assigned to the article, or a shared secret, and sending a challenge for the user wherein the challenge includes at least location information, to allow the user to identify desired sender authentication information located on the article, and sending the article identification information. The user then receives the location information and article identification information and uses the article identification information as authenticating information that indicates that the sender that has sent the information is trustworthy since the article that is in the possession of the user also includes the article identification information thereon. The user then uses the location information that has been sent to the user device, to determine for example the corresponding desired sender authentication information that is located on the article, such as by column and row information sent by the target resource and sends a reply to the challenge back to the target resource (i.e. sending unit). The sender then authenticates the user based on the reply to the challenge. The reply includes user authentication information obtained from the article namely the desired sender authentication information. If the received sender authentication information sent by the user device (and obtained from the article), based on the location information, matches the desired sender authentication information, the target resource grants suitable access to the user (i.e. the user device). As such, article identification information is sent along with location information by a sender after, for example, a first level of authentication has been determined to be successful. The first level of authentication may include, for example, the user sending a password and user ID to the target resource in an initial stage of a logon procedure, as known in the art, whereafter the sending of the location information and article identifier information is subsequently sent based on a successful first factor authentication process.

In another example, a method for providing mutual authentication does not require the sending of the article identification information to the user, but instead only requires the sending of the location information to allow the user to identify the corresponding authentication information on the article and send a reply back to the target resource for verification. However, in this embodiment, if the reply does not include the expected target resource authentication information as expected by the sending unit, the method includes repeating the same challenge for the user that includes the same location information that was previously sent. This process is repeated over, for example, each successive session, until the user sends the appropriate target source authentication information that was derived from the article based on the location information sent in the challenge.

In addition, suitable devices are also disclosed that carry out the above methods. Also, a combination of the two methods is employed to effect a type of enhanced mutual authentication process.

Also disclosed is a method for providing electronic message authentication that employs an article (also referred to as a member or token), such as a card, sticker, or any other suitable article, that includes sender authentication information and location information, such as row and column headings. In one example, each recipient of interest is issued an article that embodies sender authentication information that is identifiable by corresponding location information such as column and row identifiers. When the sender of an electronic message wants to send a message to a recipient of interest, the sender sends the electronic message and both location information and corresponding desired sender authentication information located at the location identified by the location information. This includes data representing the location and authentication information (such as an index to, a reference to, the location information or authentication information itself, or any suitable representation thereof). The recipient may then, in one embodiment, look on their article (e.g. card) at the corresponding location and see if the sent desired sender authentication information matches the sender authentication information located on the article (also referred to as expected sender authentication information). If a match occurs, then the recipient trusts the sender of the message. The recipient need not send back any information to the sender. As such, a simple card or other article may be used to authenticate a sender of a message to thwart phishing, or other sender authentication problems. Other examples will be recognized by those of ordinary skill in the art.

In addition, a system for providing electronic message authentication is also disclosed that carries out the above methodology, and a transaction card is also disclosed that includes the location information and sender authentication information thereon in the form of a sticker or as part of the transaction card itself. In yet another embodiment, the article may be a translucent article to allow light to pass therethrough so that a visual filtering pattern and sender authentication information may be sent by a sender along with the message. A user may hold up the article to a display screen and overlay it on the visual filtering pattern sent by the sender. If the resulting sender authentication information matches the results sent in the message, the recipient may trust the sender of the message.

In another embodiment, an apparatus and method for securely providing identification information generates one or more obscured user (e.g., recipient) identifiers for a recipient, such as a plurality of identifiers that are generated based on user secret data such as a password, personal identification number or other secret or non-secret information or identifiers that are not based on user secret data, such as the identifier being randomly generated and then associated with the user. In this case, no user-related information is used, but the identifier can still identify the user. In another embodiment, a single obscured identifier may be used.

In one embodiment, the method and apparatus generates a translucent identification member (TIDM), such as a portion of, or an entire, plastic card, sheet, film, or other suitable member that has a translucent area that includes the one or more obscured identifiers. As used herein, translucent area can also include a transparent area. For example, the translucent identification member may be made from transparent or clear sheets, including smoked plastic or other suitable coloring with the obscured identifiers (including non-character information) printed in ink or otherwise placed thereon or therein. The one or more obscured identifiers may be for example one-time authentication identifiers that are unique to a recipient of the translucent identification member. As such, the translucent identification member or card contains what appears to visually be a random pattern of information.

A corresponding visual filtering pattern is also generated for display on a display device when the user desires to use the translucent identification member. For example, the visual filtering pattern also appears to be random from a visual point of view but when visually combined with the one or more obscured identifiers on the translucent identification member, a designated one of the one or more obscured identifiers is visually revealed. In one embodiment, a user may overlay the translucent identification member over a designated portion of a display device or in the designated portion of a display that displays the visual filtering pattern. A combination of the visual filtering pattern with the pattern of different obscured identifiers on the translucent identification member combine to form a visually revealed single identifier or message from the one or more identifiers. Hence, for example in one embodiment, a seemingly random pattern is generated on a screen which helps ensure only a single identifier is exposed visually to a user that is viewing the translucent identification member which is overlayed on the visual filtering pattern that is being displayed on the display.

Accordingly, if desired, a security officer that has access, for example, to a translucent identification member issuer may use a package of blank cellophane cards that may be used to make the translucent identification members on a local printer. The translucent identification members may be printed having translucent color pattern that serves as the one or more obscured identifiers, or have other suitable indicia that appears to be semi-random or obscured to a user. Use of color or color background may also be used to defeat photocopying attacks. It will be recognized that portions of or all functions of the translucent identification member issuer may be provided through a distribution of providers and networks or through a web based service. For example, a recipient may access a TIDM issuance service through a web connection and locally print the TIDM or receive the TIDM through the mail. Also, identifiers can be provided by one party and sent to another party for printing or manufacturing. Other distribution of operations may also be employed as desired.

Once a visually revealed identifier is presented to a user, a user enters the visually revealed identifier through a user interface where it is compared to an expected identifier. If the entered identifier matches the expected identifier, proper authentication is indicated and a recipient may be granted access to a device, application, or process or other desired right (or submitted data is accepted—e.g. such as a vote). In addition, a list of revoked translucent identification members may also be maintained to prevent compromise due to theft or loss of translucent identification members. The list may be stored in any suitable location and updated by a service provider, translucent identification member issuer or any suitable entity. Since the translucent identification members do not require electronics to generate random numbers, the cost of such translucent identification members may be quite low and their reliability may also be relatively high since they are not susceptible to moisture or other damage typically associated with smart cards.

In an alternative embodiment, a smart card or other transaction card or non-transaction card (e.g., voting card or other suitable card) may include a translucent identification member if desired. Hence a transaction card is disclosed and includes for example a portion containing card identification information (such as a transaction card number, which may be impressed thereon such as through raised printing or electronically or through any other suitable storage mechanism such as magnetic strip or any other suitable mechanism), as well as a portion containing a translucent identification member that has a translucent area that includes one or more obscured identifiers. As such transaction cards such as credit cards, banking cards or any other transaction cards may include a window that contains the translucent identification member or may have a transaction identification number or other identification information affixed to a conventional transaction card to enhance security.

In another embodiment, the role of the translucent identification member and the recipient unit are reversed. For example, in this embodiment, the translucent identification member contains the visual filtering pattern and the display screen displays at least one obscured identifier that may be for example data representing user authentication data that is unique to a user, or other data if desired. The combination of overlaying the translucent identification member (visual filter) over the display that displays an obscured identifier, reveals (un-obscures) the at least one obscured identifier on the screen. The visual filtering pattern on the member stays the same since it is printed on the member, and the displayed obscured identifier is changed during each session or at other suitable intervals.

Accordingly, one or more of the following advantages may result. Since the translucent identification members can be printed by an organization security officer, no manufacturing costs need to be incurred and they can be generated locally for a recipient. Since there need not be electronics, there is no battery to be replaced and no damage from exposure to moisture need occur. No network or radio connectivity is required such as typically required by devices employing magnetic strips. The translucent identification member may be made of plastic or any other suitable material and in any suitable thickness. They are durable and easy to replace in the event of a compromise since they may be produced locally to an organization. Also investment in a substantial network infrastructure to continually generate master codes that are matched with dynamically changing codes on a screen and a smart card can be avoided.

Figure 1:
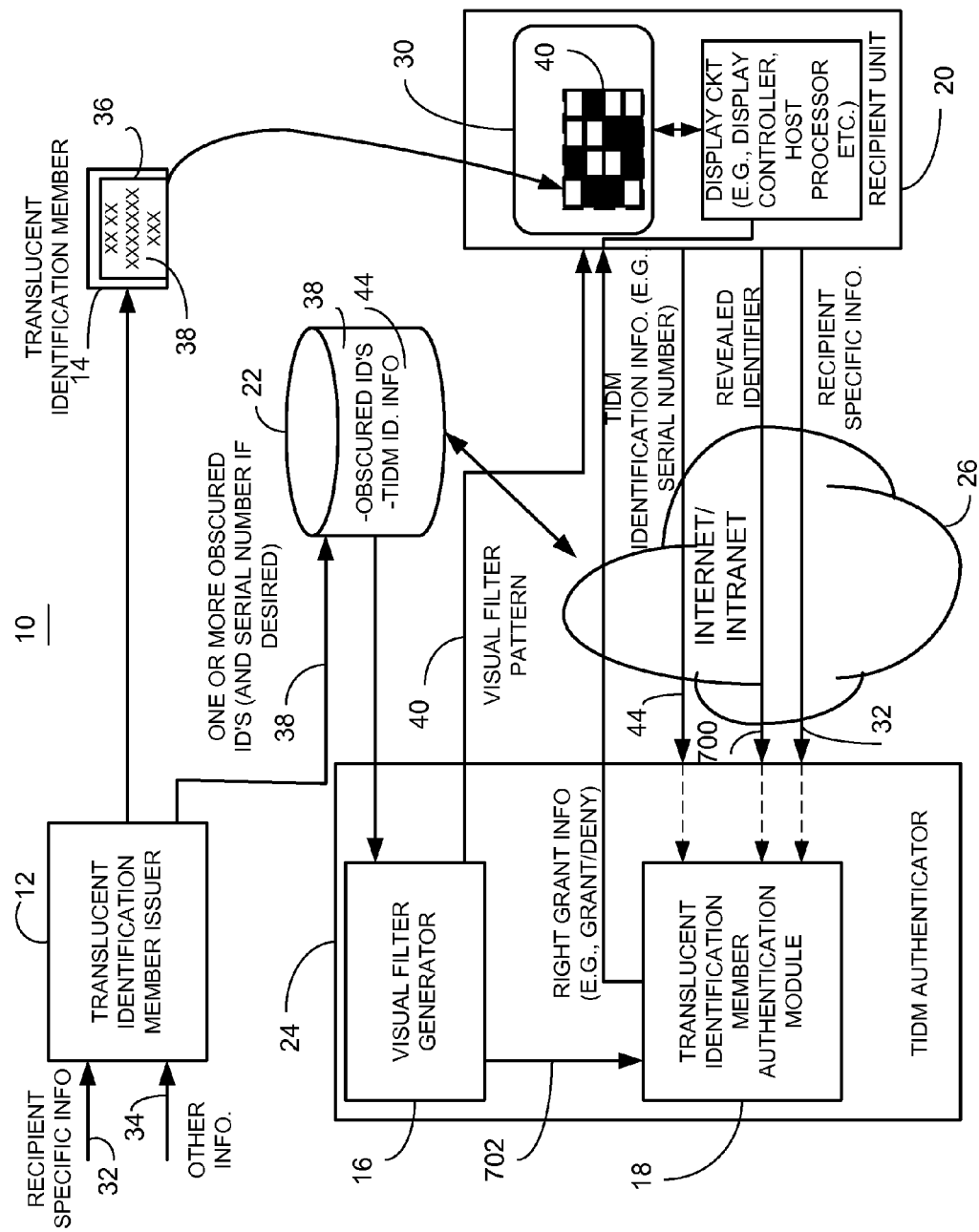
FIG. 1 is a block diagram illustrating one example of a system for securely providing identification information in accordance with one embodiment of the disclosure.

In one embodiment, the displayed visual filtering pattern selectively illuminates a portion of a translucent identification member to visually reveal one of the one or more obscured identifiers. The visual filtering pattern can be changed with each authentication session. The one or more obscured identifiers are printed indicia on a semitransparent (or transparent) card and is preferably unique within a particular domain of users. The one or more obscured identifiers are visually obscured through many suitable techniques such as color shading, ordering of the characters, a combination thereof or any other suitable visual obfuscation technique. FIG. 1 illustrates one example of a system 10 for securely providing identification information that includes a translucent identification member issuer 12 operative to generate a secure identification member such as translucent identification member 14, a visual filter generator 16, a translucent identification member authentication module 18, a recipient unit 20 and memory 22. In this example, the visual filter generator 16 and translucent identification member authentication module 18 are included as part of a translucent identification member authenticator 24 that may be implemented as one or more software modules executing on a computing unit such as a personal computer, work station, server, hand held device, or any other suitable device or multiple networked devices. The translucent identification member authenticator 24 is operatively coupled, in this example, to a web server which in turn is operatively coupled to a network such as the Internet 26 to facilitate web based communication between a recipient unit 20 and a translucent identification member authenticator 24. As such multiple circuits are formed by the software and processing device(s). Also, as used herein, circuits also refers to any suitable electronic logic in any suitable form including but not limited to hardware (microprocessors, discrete logic, state machines, digital signal processor etc.), software, firmware or any suitable combination thereof.

The translucent identification member issuer 12, the visual filter generator 16, and the translucent identification member authentication module 18 may be implemented in any suitable manner and is preferably, but not limited to, software modules executing on one or more computing devices that contain one or more processing devices that execute instructions that are stored in memory.

In this example, the translucent identification member issuer 12 will be described as a local server that generates the translucent identification member 14 using a printer or other suitable mechanism to generate a translucent identification member 14. The translucent identification member includes a translucent area that includes one or more obscured identifiers thereon. However, it will be recognized that the translucent identification member issuer 12 may be included as part of the translucent identification member authenticator 24, or may be located on any other suitable device including a web server and it will be recognized that any of the software programs described herein may be suitably located on any suitable device or devices as well.

The memory 22 may be any suitable local or distributed memory and may be located on a web server or locally if desired. The memory may be RAM, ROM or any suitable memory technology. The recipient unit 20 may be any suitable device such as a laptop computer, desktop computer, hand held device or any other suitable device that includes a display 30 and user interface, and may include one or more processing devices that execute instructions stored in any suitable memory. The recipient device includes the requisite circuitry to provide one or more user interfaces such as graphic user interfaces through web browsers or other applications or operating systems and may include speech recognition interfaces or any suitable user input interfaces. As such the units include a display circuit operative to display a visual filtering pattern defined such that when the visual filtering pattern is visually combined with one or more obscured identifiers located on a translucent identification member, a designated one of the one or more identifiers is visually revealed; and an input interface operative to receive data representing the visually revealed identifier. In one example, a user interface is used to request entry of a serial number associated with the translucent identification member; and request entry of the revealed identifier to determine whether to grant a desired right for the recipient.

Also if desired, a receiver unit can receive the filter or obscured identifiers for display on a display screen and send the response back through a completely different device (or through a completely different channel) such as a cell phone, by SMS message, email message or other suitable channel and/or device.

Referring also to FIGS. 2 and 3, a method for securely providing identification information will be described. As shown in block 200, a recipient sends a request into the translucent identification member issuer 12 through the Internet or through any other suitable mechanism to request issuance of a translucent identification member 14. This may be done for example by a recipient registering with an online financial institution with user-supplied data such as a password or other secret information. This is shown as recipient specific information 32 that is received by the translucent identification member issuer 12.

As shown in block 202, the method includes generating one or more obscured identifiers for a recipient, which may be based on, for example, the recipient specific information 32 and/or other information 34. The other information 34 may be a translucent identification member serial number or other suitable information if desired. This may be done for example by the translucent identification member issuer 12, or any other suitable entity. As shown in block 204, the method includes generating the translucent identification member 14 that has a translucent area 36 that includes one or more obscured identifiers 38. The one or more obscured identifiers 38 are generated by the translucent identification member issuer 12 in this example and stored in memory 22 in a database form. The one or more obscured identifiers are stored in memory 22 so that they may be subsequently accessed when it becomes necessary to create appropriate visual patterns 40 to reveal the desired revealed identifier 700 or when checking the returned revealed identifier 700.

Figure 4:
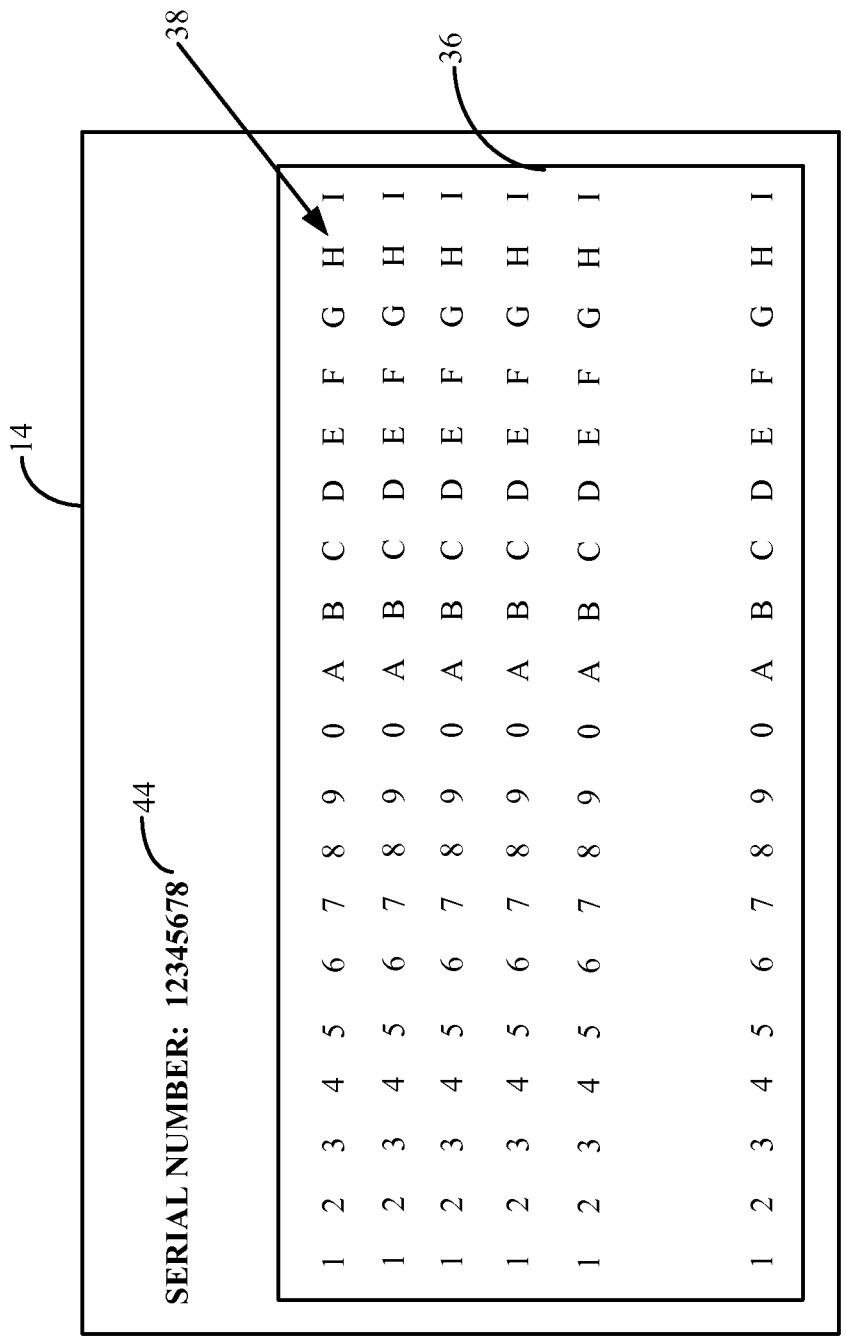
FIG. 4 is a diagram illustrating one example of a secure identification information member in accordance with one embodiment of the disclosure.

For example, the translucent identification member issuer 12 may control a printer to print a cellophane card as a translucent identification member 14 that has printed thereon one or more obscured identifiers. One example of a translucent identification member is shown in FIG. 4. The translucent identification member 14 can be made of any suitable material such as plastic or any other suitable material that provides some level of transparency so that a combination of the one or more obscured identifiers when overlayed on a display that emits light, allows the light energy (or lack of light energy) from the display to combine with the one or more obscured identifiers to visually designate one of the one or more identifiers on a translucent identification member. The one or more identifiers on a translucent identification member may also be a plurality of different obscured identifiers.

The translucent identification member 14 may be a card, sheet, film or other member that may include if desired any suitable adhesive or connecting structure to be applied over a window of a transaction card, or any other suitable material. The translucent identification member may also be connected to a transaction card, such as, for example, by using a suitable connecting structure to join the translucent identification member to an end or side of a transaction card. The one or more obscured identifiers 38 that are printed on the translucent identification member 38, as noted above, may be characters (e.g., ASCII), symbols, print patterns, colored versions thereof or any other suitable indicia. The one or more obscured identifiers 38 appear to be visually obscured and hence seemingly random when viewed by a recipient. In other embodiments it may be desirable to print patterns of ink that do not connote characters but instead visually conceal a message or other information so that when overlayed on top of a display the pattern generated by the display in combination with the printed image, allows the viewer to visually decipher a revealed identifier.

The translucent area 36 includes an information pattern that represents one or more identifiers that may be unique identification information that may be used for one or more authentication sessions or other purposes. The information pattern represented by one or more obscured identifiers is preferably unique to a given domain of users to reduce the likelihood of the same user obtaining a same translucent identification member with the same obscured identifiers. The translucent area 36 is configured (e.g. sized) to overlay at least a portion of the display screen 30 on the recipient unit 20. In one embodiment, each of the one or more obscured identifiers may serve as one-time authentication identifiers for the recipient of the translucent identification member. It is noted, as used herein, identification information includes any information used to directly or indirectly authenticate a user (e.g., TIDM recipient) or other process of interest, or to get access to a desired right associated with a process or device, or any other suitable information that is intended to be kept secret except at the time a transaction is to be effected.

To make the TIDM, the method may include receiving a request from a user for one or more obscured user identifiers and recording a link between the user and the identification information associated with the one or more obscured user identifiers. The method may include providing the one or more obscured user identifiers to the user wherein the one or more obscured user identifiers are on a translucent identification member that is sent to the user, the one or more obscured user identifiers are sent to a third party to be placed on a translucent identification member for the user, the one or more obscured user identifiers are sent to the user for placement on a translucent identification member, and the one or more obscured user identifiers are selected from a pre-existing pool of obscured user identifiers. The request from the user may include user specific information and the user specific information may be used to create the one or more obscured identifiers or may be combined with other information to produce the one or more obscured user identifiers.

As shown in block 206, once the translucent identification member 14 has been generated and provided to a recipient, the visual filtering generator 16, or other suitable mechanism generates a visual filtering pattern for display on the display 30 of the recipient device. When the visual filtering pattern 40 is displayed by the recipient device, the visual filtering pattern visually combines with the one or more obscured identifiers located on the translucent identification member 14, to designate one of the one or more identifiers. In other words, the visual filtering pattern filters out undesired identifiers to reveal a selected one of the one or more identifiers.

As shown in block 208, the method may include overlaying, such as by a recipient, or a device, the translucent identification member 14 on the displayed filtering pattern 40 to visually identify a designated one of the obscured identifiers on the translucent identification member 14. The visually identified identifier is then entered by the recipient to facilitate a transaction or gain access to a specific desired right associated with any process or device of interest.

As shown again in FIG. 3, the steps of FIG. 2 are presented in more detail. As shown in block 300, generating one or more obscured identifiers for a recipient may be done for example by the translucent identification member issuer 12 or any other suitable entity by obtaining recipient specific information, such as secret or non-secret data or non-user related information. This process may also be accomplished by using non user-related and non user-supplied material, in which case, the generated one or more obscured identifiers are subsequently associated with a user. When recipient specific information is used, this may be a personal identification number, password, user name, account number or other data provided by the recipient through the recipient unit 20 or from any other suitable source. This is indicated as recipient specific information 32. As shown in block 302 the recipient specific information 32 is suitably combined, such as through a suitable mathematical function or algorithm, to produce the one or more obscured identifiers 38. The other information 34 may be, for example, output generated from a random number generator, the actual translucent identification member serial number 44 (or other TIDM identification information) that may be printed on the translucent identification member 14 or stored by the translucent identification member issuer 12, or any other suitable information. As shown in block 204, a translucent identification member serial number, or any other suitable information for identifying the translucent identification member, is assigned to the obscured one or more identifiers 38. It will be recognized that upon an initial request or generation of a translucent identification member that the translucent identification member issuer 12 may select a translucent identification member serial number and associate therewith the recipient specific information 32. This information may be combined to generate the one or more obscured identifiers 38. The translucent identification member serial number 44 may be stored in memory 22 for later use by the translucent identification member authenticator 24 (authenticating a recipient using the translucent identification member 14). The order of the steps as described herein with respect to any method may be suitably reordered based on a desired result.

As shown in block 306, generating the translucent identification member 14 may include printing the obscured different identifiers in a desired format on a plastic film, sheet or card to produce the translucent identification member 14. As shown in block 308, displaying the filtering pattern 40 on a display may include randomly selecting, from the obscured identifiers, a selected identifier to produce a visual filtering pattern 40 on display 30 that reveals the selected one of the obscured identifiers as the identifier to be revealed when the translucent identification member 14 is overlayed on the visual filtering pattern 40.

As shown in FIGS. 4 through 7, and to further illustrate an example, as shown in FIG. 4, the translucent identification member 14 has printed thereon the translucent identification member serial number 44 or other identification information and the one or more obscured identifiers 38 printed in the translucent area 36. As noted above this may be printed on cellophane material or other material readily accommodated by conventional printers, if desired, to reduce fabrication costs. However any suitable material or manufacturing process may be used. Once the recipient is in possession of the translucent identification member 14, multi-factor authentication is provided using the translucent identification member 14.

The filter may be generated in any suitable way. For example, a selected obscured identifier may be chosen from the stored one or more obscured identifiers whose position on the TIDM is defined. The visual filter pattern generator 16 produces a filtering pattern based on a predefined layout of the TIDM to insure that the filter blocks the proper character locations. Any other suitable technique may also be used.

Figure 5:
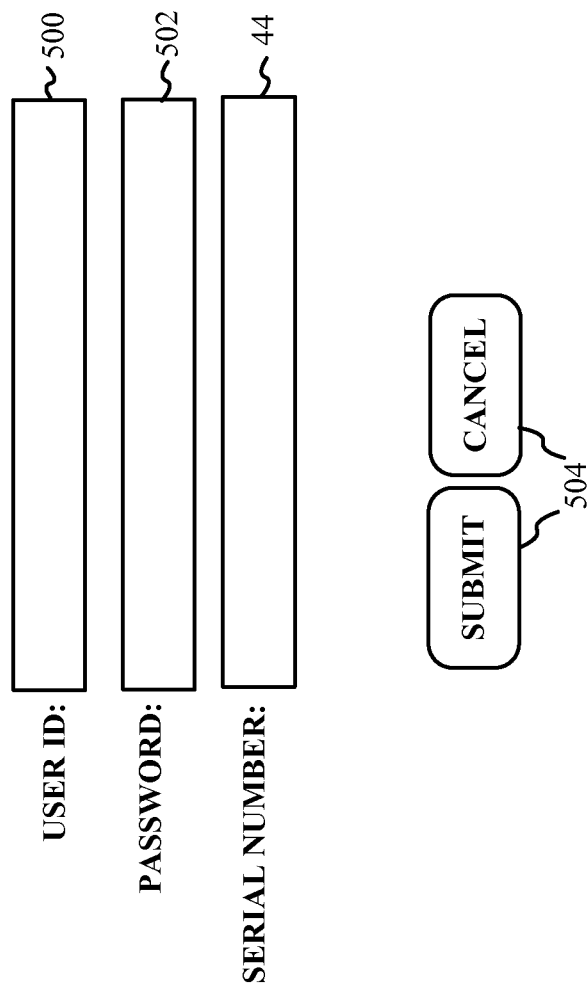
FIG. 5 is a diagram graphically illustrating one example of a login screen to facilitate authentication of a user or for securely providing identification information in accordance with one embodiment of the disclosure.

As shown in FIG. 5, the recipient device 20 may display, through a web browser or other suitable user interface, an input screen, based on a received HTML page if a web browser is being used, containing fields that receive user input such as a user identifier field 500, a password field 502 and the translucent identification member serial number field 44. The user submits the entered information through suitable interface buttons 504. This information is then sent to the web server via the Internet and if desired forwarded to the translucent identification member authenticator 24. As shown in this example the information entered in user ID field 500 or the password field 502 may be considered recipient specific information 32 that was previously entered when the translucent identification member issuer 12 initially generated the translucent identification member 14.

FIG. 6 illustrates one example of a graphic user interface (generated based on a received HTML page) displayed on display 30 to facilitate securely providing identification information using the translucent identification member 14. The graphic user interface may be generated for example through a web browser and suitable host processor on the recipient unit or any other suitable processor, and indicates an overlay area 600 that may be the same size or a different size than a visual filtering pattern 40 that is presented on the display 30. Hence in response to the login screen shown in FIG. 5, the translucent identification member authenticator 24 submits a response containing the visual filtering pattern 40 and the response interface screen shown in FIG. 6. The recipient unit 20 displays the visual filtering pattern 40 and a revealed identifier field 602 to allow entry of the one revealed ID from the one or more obscured identifiers.

FIG. 7 graphically illustrates the condition where the translucent identification member 14 is overlayed on top of the visual filtering pattern 40 to reveal one of the one or more obscured identifiers. The user positions the translucent identification member 14 and hence the one or more printed obscured identifiers 38 over the visual filtering pattern 40 and the combination of the visual filtering pattern 40 and the printed different obscured identifiers 38 reveals in this example a revealed identifier 700 which is then entered by the recipient in the revealed identifier field 602. The user then submits the revealed identifier 700 to the translucent identification member authenticator 24 to authenticate the user for the particular transaction or for access to a particular right. Accordingly, the translucent identification member authenticator 24 receives data representing the revealed identifier 700 in response to a user or other entity overlaying the translucent identification member 14 on the display 30. The translucent identification member authentication module 18 compares the received revealed identifier 700 with a corresponding expected identifier 702 (see FIG. 1) to determine whether proper authentication of the recipient is appropriate. The translucent identification member authentication module 18 obtains the corresponding expected identifier 702 from the memory 22 or may generate the expected identifier on the fly knowing the visual filter pattern and accessing the obscured identifiers 38, or may obtain the expected identifier 702 in any other suitable manner.

Referring to FIGS. 8 and 9 the issuance of a translucent identification member 14 will be described in more detail by way of an exemplary embodiment. In order to obtain a translucent identification member 14, a recipient registers with an online bank or other institution using recipient specific information 32 such as an account number or other information as indicated by registration request 800. This request is then passed through to a web server 802. The web server 802 then communicates with a bank server 804 which includes for example a customer management system and translucent identification member requester 806 which may be a suitable software application executing on a processing device if desired or any other suitable structure. The bank server 804 then generates a translucent identification member issuance request 808 to the translucent identification member issuer 12 which may be included in or separate from a suitable server 810. The translucent identification member issuance request 808 includes the recipient specific information 32 entered by the user. In response, the translucent identification member issuer 12 provides the obscured identifiers 38 in a response message 810 and generates and records a translucent identification member serial number 44 in the memory 22 along with the associated obscured identifiers 38 that will appear on the translucent ID member 14 for the requesting recipient. In this example, the bank server 804 links the recipient's account with the translucent identification member serial number 44 and then stores the linked information in a database 810 for later use. The bank server 804 then generates the translucent identification member 14 by, for example, formatting the obscured identifiers 38 for printing and sending the information to a printer 814 or other device which then prints out or manufactures the translucent identification member 14. Hence the translucent identification member serial number 44 is assigned by the translucent identification member issuer 12 and is associated (e.g., linked) with the one or more obscured identifiers 38 and with the user in memory 22 in a database.

The translucent identification member issuer 12 may include an information randomizer 900 and a translucent identification member formatter 902. The information randomizer 900 may use the translucent identification member serial number 44 as other information 34 to be combined with the recipient specific information 32 to generate the one or more obscured identifiers 38. This may be done using a hash algorithm or other suitable encoding technique as desired to generate the one or more obscured identifiers 38. The translucent identification member formatter 902 may be another software application executing on a suitable processing device or devices that formats the information for output to a printer or other manufacturing device.

FIGS. 10 and 11 illustrate another embodiment of the operation of the system after the issuance of the translucent identification member has occurred. As shown in block 1000, the method includes requesting and obtaining recipient specific information 32 such as previously described with reference to FIG. 5. Once the translucent identification member 14 has been printed or manufactured, it is then provided to the recipient by hand or through mail or any other suitable technique as shown in block 1002. As shown in block 1004, a bank server of a bank determines if a recipient has requested authentication, such as to a logon request. If a request has been received, a web page may be sent requesting entry of the recipient information 32 including the password and the translucent identification member serial number 44 as a first level of a multi-factor authentication process as shown in block 1006. This may be done for example through the screen shown in FIG. 5. As shown in block 206, the bank server determines whether the entered recipient specific information 32 and password and translucent identification member serial number 44 are correct for example by passing along the information to the translucent identification member authenticator 24. If the first authentication level passes, the method includes, as shown in block 1010, displaying the visual filtering pattern 44 that when visually combined with the one or more obscured identifiers 38 on the translucent identification member 14, reveals only one of the one or more obscured identifiers as the appropriate identifier to be entered for the current session or transaction. The bank server may then, through the web server, request entry of the revealed identifier 700 as selectively revealed through the filtering pattern displayed on the display by providing the screen as shown in FIG. 6. This is shown in block 1010. In response to the request, the translucent identification member authenticator 24 receives the revealed one time use identifier 700 and compares the received identifier to a corresponding expected ID determined for example by the visual filter generator or authenticator 24. This is shown in block 1012. Given the "filter", the user's data entry and stored information about that user, the authenticator can validate whether the user entered correct data or not (either on its own or by passing it to a "server"). If the desired identifier is generated before requesting it from the user, the system also generates the right filter to reveal the pre-determined identifier (all before presenting to the user). Alternatively, if the user is provided with a pattern (the filter) and then the system validates the identifier that the user entered with the identifier that would have resulted from that pattern, a desired identifier need not be picked ahead of time and the "filter generator", therefore does not require knowledge of anything else. The data representing the visually revealed identifier (e.g., the data itself, an encrypted form thereof or other suitable data, may also be received using a device other than the device on which the visual filtering pattern is displayed. For example, the identifier may be revealed on a screen of one device and a handheld device or non-handheld device may be used to enter and send the visually revealed identifier to another device or system that checks whether there is a match.

As shown in block 1014 if a match does not exist, the recipient will be sent an error and requested to re-enter the revealed identifier. The system may change to using a different identifier for the re-try. Also, the system may lockout the user after a certain number of failed attempts. However, as shown in block 1016, if a match occurs, second factor authentication is determined to be successful and the user is granted the desired right.

FIG. 12 and FIG. 13 illustrate examples of transaction cards that employ translucent identification members 14 (including the type shown in FIG. 14). The transaction cards may be smart cards or non-smart cards and have the conventional information associated with credit cards, debit cards, or any other suitable transaction cards and in addition include the translucent identification member 14. The translucent identification member 14 appears on a portion of the transaction card. One portion of the transaction card includes account information such as an account number, credit card number, or any other suitable identifier 1300 and if desired, other user identifiers such as a user name 1402. In an example shown in FIG. 12, the transaction card includes an opening 1306 that may be, for example, cut in the plastic transaction card or otherwise provided in the plastic card and a translucent identification member 14 with adhesive may be placed over the opening or may be integrally molded therein or otherwise attached such as but not limited to a connecting structure configured to receive and hold the TIDM in or to the transaction card so that the size of the transaction card is the same size as conventional transaction cards or any other suitable size as desired. If used, the connecting structure may be a snap fit structure, slide in structure, adhesive based connection or any suitable connecting structure as desired.

FIG. 13 illustrates a different example in which the translucent identification member 14 is attached to a side surface or any other surface of a conventional transaction card. The translucent identification member 14 may be foldable along a fold line 1400 or may be of a thickness wherein it is non-foldable and formed as part of the transaction card if desired. Any other suitable mechanisms for suitably attaching the translucent identification member with or to a transaction card is also contemplated.

FIGS. 14 and 15 illustrate an alternative embodiment that basically reverses the role of the translucent identification member and the recipient unit. In this embodiment, the translucent identifier 14 contains the visual filtering or enhancement pattern 40 and the display screen displays at least one obscured identifier that may be for example data representing user authentication data that is unique to a user or non-unique to a user as desired (see FIG. 15). As with the previous embodiment, the combination of overlaying the translucent identification member (visual filter) over the display that displays an obscured identifier, reveals (un-obscures) or enhances the at least one obscured identifier on the screen. The revealed user authentication data may then be entered into a suitable transaction device as the password or other user authentication information. Also, when the translucent area is attached or incorporated in a conventional transaction card, the transaction card includes as shown for example on FIGS. 12 and 13, a first portion containing a transaction card number and a second portion containing a translucent identification number or other identifying information having a translucent area that includes a visual filtering pattern.

FIG. 16 illustrates one example of a system 1600 employing the TIDM 14 of FIG. 14. In this example, the TIDM authenticator 24 includes an obscured identifier generator 1602 similar to the type used to generate the one or more identifiers described with reference to FIG. 1. The obscured identifier generator 1602 generates the obscured identifier(s) after receiving recipient specific information from a user, such as a user name, TIDM serial number, or other suitable information, to insure that the proper obscured identifier is displayed for that user. As part of the registration process, the user may have already provided the same user specific information and the obscured identifier generator 1602 may have already generated the obscured identifier and stored them in memory 22.

The translucent identification member issuer 12, in this example generates a TIDM 14 having a translucent area having a visual filtering pattern 40 thereon configured to visually filter a displayed obscured user identifier(s) 38 and is configured to overlay at least a portion of a display screen. Having a user enter in user specific information to initiate a session may be desirable where the same filtering pattern is printed on translucent identifier members for a plurality of users. It is desirable to know that the holder of the TIDM is a proper user as opposed to a thief that stole the TIDM. The authenticator, or other source, sends the generated obscured identifier to the recipient device. The recipient device displays the at least one visually obscured identifier as user authentication data and receives data representing the revealed user authentication data (such as the revealed ID itself or a representation of it) based on the translucent identification member having a filtering pattern thereon. For example when the translucent identification member having the filtering pattern thereon is held over the display, the filter reveals the user identifier. If desired, a translucent identifier serial number can be assigned to each TIDM even though the same filter pattern may be printed on more than one TIDM. As such, several users may have translucent identification members with the same filter pattern.

The translucent identification member issuer 12 is operative to generate a translucent identification member 14 having a translucent area that includes a visual filtering pattern 40 thereon configured to visually filter a displayed obscured user identifier and configured to overlay at least a portion of a display screen. The obscured identifier generator 1602 generates at least one visually obscured identifier for display on a display, in response to received user information such as user specific information. The translucent identification member authenticator 18, in this example receives data representing the revealed identifier such as through the user entering the information through a user interface after the filtering pattern is overlayed on the display and as previously described, the translucent identification member authenticator compares the received revealed identifier with a corresponding expected identifier (since it was generated by the obscured identifier generator) to determine whether proper authentication of a recipient is appropriate. Alternatively, the translucent identification member authenticator may send the received revealed identifier to a third party that carries out the comparison and sends a message back to the authenticator or recipient unit. Any other suitable division of operations may also be used as desired. The translucent identification member authenticator or third party then sends right-grant information to a recipient unit in response to the received data matching the corresponding expected identifier.

FIG. 17 illustrates one example of a method for securely providing identification information that includes generating at least one obscured identifier for a recipient based on, for example, received recipient secret data or non-secret data or data that is not related to or received from the recipient. This is shown in block 1700. As shown in block 1702, the method includes generating a translucent identification member 14 having a visual filtering pattern 40 thereon. After the TIDM has been made, the method includes receiving user identification information, such as a PIN: or other data as a first factor of authentication for the user. As shown in block 1704, the method includes sending the one or more obscured identifiers to the recipient and displaying at least one visually obscured identifier as second factor user authentication data, that when visually combined with the visual filtering pattern 40 on the translucent identification member, reveals an obscured identifier for a user. As shown in block 1706, the method includes, the user for example, overlaying the translucent identification member on the display to visually identify the obscured identifier through the filter. The method also includes receiving data representing the revealed user authentication data based on the translucent identification member having a filtering pattern thereon. The method also includes receiving user specific information, such as prior to the step of displaying the obscured identifier, to determine the visually obscured identifier to be displayed on the display. For example, the system needs to determine which obscured identifier to display since each user preferably has a different identifier. This may be determined for example by having the user enter user specific information, through a user interface in the recipient unit, such as a password or other secret or non-secret information as desired.

Stated another way, the method includes receiving user identification information as a first factor of authentication for a user and using, such as by the TIDM authenticator, service provider or other suitable entity, such user identification information to identify a translucent identification member in memory containing a particular visual filtering pattern known to have been associated with such user. The method includes generating an expected identifier to be used as a second factor of authentication for the user associated with the received user identification information and generating a pattern of obscured user identifiers containing the expected identifier such that when the pattern of obscured user identifiers is combined with the visual filtering pattern on the identified translucent identification member associated with the user the expected identifier will be revealed. The method includes transmitting the pattern of obscured user identifiers to a display (e.g., a displayed GUI) and requesting entry of a revealed identifier; and receiving data representing the revealed identifier. As noted above, the TIDM authenticator for example, or any suitable number of servers, or devices act as the circuits to carry out the above operations.

The primary functionality of the disclosed apparatus, methods and systems may be provided through application programming interfaces (APIs) that are executed by one or more processing devices that can be readily integrated into current infrastructures. In addition, each translucent identification member in one embodiment is different and has seemingly different random information since the seemingly random information is typically, but not necessarily, generated from information unique to a recipient, such as a password, user name, personal identification number, or any other information. In each embodiment, translucent identification members, and/or visual filters and/or obscured identifiers can be pre-manufactured and subsequently associated with a user. Additionally, the obscured identifiers and/or filtering patterns can be pre-generated and subsequently applied to translucent identification members. Such subsequent application to translucent identification members may be done by the creator of the filtering patterns or obscured identifiers or may be done by the entity providing the service or by a third-party contractor of the service provider. Since the manufacture of translucent identification members can be done with very simple materials such as transparent plastic, it is also possible for the service provider to send the obscured identifiers or visual patterns to users who can then themselves, apply the filtering pattern or obscured identifiers to a translucent identification member.

The same translucent identification member may be used a repeated number of times since there may be a plurality of different obscured identifiers thereon wherein each time authentication is requested a different one of the obscured identifiers is exposed through the visual filtering pattern. Hence the visually revealed identifier on the translucent identification member can change during each authentication session if desired. The translucent identification members described herein may be used for user authentication, activating software applications or for any other suitable purpose. The different obscured identifiers may be characters, images, or any other suitable information.

FIG. 18 illustrates one example of an article 1800 (e.g. a member), such as a translucent or non-translucent film, sticker, card, or any other suitable material or article. It will be recognized that the information shown on the article 1800 is shown as one example only and it will be recognized that any suitable information may be used. In this example, the article 1800 includes location information 1802 and 1804 (shown as row and column indicia) respectively and sender authentication information 1806 in the form of numbers that are addressable or locatable by the coordinate location information (e.g. row and column information). In addition, the article 1800 includes an optional article identifier 1808 such as a serial number generated (e.g. assigned) by the issuer of the article 1800.

Generally speaking, the article 1800 if desired, may be generated as described above with respect to the translucent identification member to generate for example the sender authentication information. However, in addition the location information 1802 and 1804 also needs to be added in one embodiment. In addition, it will be recognized that the translucent identification member 14 may also be used as a sender authentication article and that the obscured identifiers 38 may also serve as sender authentication information.

In addition, in this embodiment there need not be recipient specific information if the system does not require it, as the sender authentication information may be generated either independent from or based on recipient specific information if desired. This may occur when the recipient signs up for the service. In addition, as used herein, location information includes the information, for example, sent with a message or indexed by a message sent by the sender which indicates which sender authentication information on the article 1800 that the recipient is to verify. For example, location information need not be row and column information, but may merely be the terms such as "upper left corner", "lower left corner", "third from the right", or any other suitable information to notify the recipient which sender authentication information on the article is to be used as the authentication information for the given session, transaction or other communication. Alternatively, the sender authentication information can be a pointer to a location that contains the sender authentication information, such as, for example, a universal resource locator (URL) that points to the sender authentication information for the given session, transaction or other communication. Additionally, the location information can be a pointer to a location that contains the actual location information, which in turn indicates where to look on the article for the sender authentication information for the given session, transaction or other communication. In another embodiment, the location information is a visual filtering pattern.

FIG. 19 illustrates a transaction card 1900 that may include, for example, a magnetic strip 1902 or any other suitable information that may provide account information or message sender information. The transaction card 1900 may be for example a banking card, credit card, debit card or any other suitable transaction card as described above and may include transaction card identifier information such as a card number etc., as described above. This transaction card 1900 is different from conventional transaction cards because, among other things, it includes the article 1800 thereon (or member), therein or secured thereto in any suitable manner. As such, variations of the transaction card 1900 are illustrated for example in FIG. 13. In one example, the member 1800, such as a piece of adhesive backed paper or any other suitable member, is secured to a conventional transaction card if desired. It will also be recognized as described above that the member or article may be secured or suitably affixed in any suitable manner including, but not limited to adhesive, or any other suitable mechanism. The member 1800 may also be sent to a recipient as a tear away portion of a financial statement, billing statement etc. Preferably it is sized to fit on a transaction card.

FIG. 20 illustrates one example of a method for providing electronic message authentication that may be carried out by any suitable element. In this example, it may be carried out for example by a server or plurality of servers or other suitable applications executing on one or more processing devices. As shown in block 2000, the method includes, for example, when a sender such as a bank server or other message sender wishes to send a message to a recipient, determines desired location information, such as a row and column that also exists on the particular recipient's article, and corresponding desired sender authentication information to be sent and matched with sender authentication information located on the article and is locatable according to the sent location information. This may be done for example by accessing a database that links a recipient's email address for example, to corresponding database fields that represent for example the content of an article that was issued for that recipient. As shown in block 2002, the method includes sending the electronic message and both desired location information and corresponding desired sender authentication information, to the recipient wherein the desired sender authentication information is locatable on the article based on the sent desired location information. As such, for example, the sender or sending unit may associate (e.g., append, pre-pend, insert or otherwise attach) row and column information and corresponding sender authentication information that should appear at those locations on the article as part of an electronic message to a recipient. The recipient may then locate, based on the received column and row number, the sender authentication information on their article that was issued to them by (or on behalf of) the sender, and confirm that the sent desired sender authentication information matches the same information at the locations indicated by the sent location information sent by the sending unit. If a match occurs, then the recipient trusts the sender of the message. It will be recognized that the sent location information and sender authentication information may be the data itself, an index to, function of, reference to, or any other suitable representation of either or both of the location information and the sender authentication information.

For example, the location coordinate information and corresponding sender authentication information could include electronically transmitted data for display on a display device, such as a visual filtering pattern and sender authentication information. In this embodiment, the article would be a transparent article to allow a user to place the article over an area of a display screen. The sent message would include the visual filtering pattern along with the desired sender authentication information that should appear visually to the user when the user overlays the article on a display screen. If the recipient visually recognizes or sees the sender authentication information that is revealed through the visual filtering pattern on screen with the sent desired sender authentication information and it matches, then the user can trust the sender of the message. As such, visual filtering techniques as previously described with respect to the translucent identification member for recipient authentication may be used in part to authenticate a sender.

Referring also to FIG. 21, a specific example of a message and associated sender authentication information and location information is shown as 2100. In a particular embodiment, also referring to FIG. 18, the message is appended with sender authentication information and in particular numbers "98413" and coordinate information of "A2, E4, F1, H4, J2". As such, the sending unit sends the electronic message along with both desired sender authentication information and desired location information as shown. The user then uses the article 1800 and looks, for example, at coordinate location A2 and sees the number 9, looks at the location coordinate E4 and sees the number 8, looks at the coordinate location F1 and sees the number 4, looks at the coordinate location H4 and sees the number 1, and looks at the coordinate location J2 and sees the number 3. If the user sees the same sender authentication information on the article 1800 as was sent by the sending unit, then the recipient trusts the sender as being an authentic message sender. In this example, the sender authentication information visually represents sender authentication information that is identifiable by location coordinate information in the form of rows and columns. However, it will be recognized that rows and column format need not be used and as such the cells as shown need not be employed. For example, if objects are used as opposed to letters and numbers, the objects may be located in upper left, upper right, middle or any other suitable location of the article and the sender authentication information, which could be the object can be sent such as in the form of a graphic or other suitable object, and the coordinate location information may actually be words that might read "upper left corner". Any other suitable coordinate location information or sender authentication information may also be used.

The article 1800 as noted above may be for example a piece of paper, a plastic card, transparent plastic card, sticker that can be affixed to existing plastic cards or any other suitable article. In this example, each email recipient is provided with the article with its own randomly (or seemingly randomly) generated contents. When sending an email, an originator's message transfer agent or other server component associates with each outbound email either directly or indirectly such as by a link to an HTML page using a URL or other suitable reference, coordinates or other directions for locating one or more of the card's cells or locations. Also appended, pre-pended, inserted, or otherwise attached to the email are the contents at those locations. Upon receipt, the user confirms the lookup results using their individual sender authentication article, such as reading the coordinates listed in the email and looking them up on their own sender authentication article. In the embodiment where a translucent version of the authentication article is used, the authentication article may be placed over a visual filtering pattern provided with the email and the revealed sender authentication information is compared by the recipient to the desired sender authentication information that is provided in the email. If the characters or other information do not match, then the authentication has failed.

FIG. 23 illustrates in more detail a method for providing electronic message authentication wherein the method includes, as shown in block 2300, generating for example, random sender authentication information to be placed on the article and if desired, location information that may also be placed on the article and linking the two with the selected recipient. Random includes pseudo random information or any suitable level of randomization of information. This may be done as described above with respect to the translucent identification member through a suitable interface on one or more server computers or any other suitable device. As shown in block 2302, this information is stored as the authentication information and corresponding location information in a suitable database. As shown in block 2304, the method includes creating an article, such as article 1800 containing the location coordinate information and corresponding sender authentication information and if desired an article identifier 1808 such as serial number for issuance to a specific recipient. This may be done, for example, in basically a similar manner as described above. For example, a card may be printed, a transaction card may be suitably formed, or a sticker may be generated that can be adhered to any suitable article. The article is then sent to the recipient by mail or any other suitable channel.

In an alternative embodiment, instead of using a type of hard token (e.g. article), a soft token may be used wherein the representation (may not be an actual image) of a card for example or representation of an article may be sent electronically for display via a display screen to a user or for other electronic access by such user, either during each session or once and the user may store the electronic sender authentication article in a file and may access it as necessary. As such the electronic representation of the article can be accessed by a software application so as to provide the recipient with the sender authentication information located at the location identified by the sent location information.

As shown in block 2306, the method also includes, for example as described above with respect to FIG. 20, determining, such as by the sender, at least one desired item of location information and corresponding sender authentication information to append, pre-pend, insert, or otherwise attach to the current message. Selection of the location information and authentication information may be done in any suitable manner, such as randomly or in any other suitable fashion as desired. As shown in dashed block 2308, in an alternative embodiment, location information and sender authentication information is effectively communicated in the form of a visual filtering pattern that may, if desired, cover up all row and column headings and instead just allow the sender authentication information to be visually displayed when the article is overlaid. As such, the method may include sending a visual filtering pattern for display to the recipient to allow the recipient to visually determine whether the sender is authentic. The recipient may place at least a portion of the sender authentication information that is on the article, over a visual filtering pattern that is displayed on the display screen, to determine whether the sent sender authentication information with the message matches the sender authentication information made visible by the visual filtering pattern.

In one example the method includes appending at least one desired item of location information and corresponding sender authentication information to an electronic message for a recipient. The sender authentication information visually represents authentication information identifiable by the location coordinate information. As such, the message itself may be appended, pre-pended, inserted, or otherwise attached to the information or may contain a reference to the information such as a website or any other suitable link or any other suitable representation of the sender authentication information and location coordinate information.

As shown in block 2310, the method includes sending the electronic message and data representing both the location coordinate information and the corresponding sender authentication information to a recipient. The recipient may then look at the information on the article and see if it matches that which was sent by the sending unit.

It will also be recognized that determining at least one location coordinate, based on the location information and corresponding sender authentication information may be done, for example, dynamically as opposed to looking up the information stored in the database. For example, the sender (e.g. message sending unit) may simply be programmed with a function to generate sender authentication information to send as opposed to looking up pre-stored information.

Also if desired, the sender authentication information may be information for example, such as the ending balance on a bank statement, any suitable information in a billing statement or account statement that the sender may have previously sent to the recipient that may contain the sender authentication information. The location information may be the date of a particular statement and the sender authentication information may be the current balance on a credit card account. Any other statement may also be used or any other information known to, or provided by, the sending unit that is in the possession of the recipient may be used.

FIG. 22 illustrates one example of a system for providing electronic message authentication that may, if desired, carry out the steps described with reference to FIG. 23. For example, a sending unit 2200, such as any server computer, plurality of servers, mobile devices or any other suitable structure may include a sender authentication article issuer 2202, or a third party may issue the sender authentication article as desired. For example, the sender authentication article issuer 2202 may generate the random sender authentication information and corresponding location coordinate information and link it with a recipient and store the information in the database 2204. The article 1800 may then be mailed, for example, to a recipient, or in the case of a soft token, sent electronically to the recipient. In this illustration (FIG. 22), a translucent article is shown. As such, the recipient 20 includes a display 30 and the message 2100 for example is displayed on the display along with a visual filtering pattern and the sent sender authentication information. The visual filtering pattern is then used to reveal the expected sender authentication information that is then matched by the recipient to that sent in the message 2100. In this embodiment where the sender authentication article is a translucent type, the visual filtering pattern sent by the sender unit embodies location information since the result of the recipient overlaying the sender authentication article on a display screen will result in a visually revealed sender authentication information at particular locations in the article. As such, the visual filtering pattern includes the location information. In addition, it will be recognized that the term information refers to any suitable indicia.

The sending unit 2200 which may be a suitable server in a network, node, or any other suitable device, includes one or more circuits which may be in the form of one or more processing devices that execute software instructions that are stored in memory, or may be implemented using discrete logic, or any suitable combination of hardware, software or firmware to carry out the operations described herein. As such, the sender unit 2200 includes circuits that are operative to carry out the steps as described above.

In another embodiment, the use of the sender authentication article may be combined for example with the systems described above with respect to the translucent identification member such that the translucent identification member includes the location information and sender authentication information thereon. For example the obscured identifiers if desired may also serve as the sender authentication information or in an alternative embodiment the translucent identification member may have a portion that includes the obscured identifiers and another portion that includes the location information and sender authentication information. In any event, use of a single article or member which is translucent as described herein can provide multi-level authentication. For example, for sender authentication, the methods described above with respect to FIGS. 18-22 may be employed to confirm that the sender is authentic. Once a recipient for example is convinced that the sender of an email is authentic, the recipient may then click on a URL sent in the email message and then be presented with a suitable HTML form to enter account information or other confidential information. However, prior to entering this confidential information a second level of authentication may be carried out employing the translucent identification member and obscured identifiers so that the sending unit can authenticate the recipient at this stage of the session or transaction. It will also be recognized that any other suitable ordering of operations or combinations of the authentication schemes may also be employed.

In addition use of the claim terms includes any representation thereof. For example the term sender authentication information includes the data itself, any index to the data, any reference or pointer to the data, or any other representation thereof.

Among other advantages, there need not be any modification to a message transfer agent or email client of a recipient. Also if desired, no recipient computers need to be registered allowing authentication to be performed from any computer if desired. The system may also be applicable to mobile devices where lookup coordinates can be easily displayed on a small display screen. Other authentication purposes may include web authentication, interactive voice response authentication or any authentication scenario. In addition, the system and methods offer a type of inexpensive mechanism such as the authentication cards that can be distributed versus more complex technologies that may require smart cards, tokens or public key infrastructures. Other advantages will be recognized by those of ordinary skill in the art.

FIG. 24 illustrates one example of a system 2400 that provides mutual authentication between a user (e.g. recipient unit) and a sender unit, also referred to as a target resource. As described for example with respect to FIGS. 18-23 and elsewhere, in this example, the article 1800 serves as an authentication card which is assigned to each end user and includes, for example, random and/or unique markings known only by the sender unit (e.g. target resource) and the end user. By providing evidence of that knowledge to the recipient, the sending unit can demonstrate its identity and by the end user causing the recipient unit to return information located in the authentication card, the end user demonstrates his/her identity as the proper end user.

As noted above, the system 2400 may include a sender authentication member issuer 2202 that produces the article 1800 based on, for example, recipient specific information 32 (i.e. user authentication information) which may be, but is not limited to, for example a password and/or user ID. The system 2400 also includes sender unit 2402 which may be a server or any suitable device as previously described and may also include, as noted above, a group of servers or circuits that carry out the operations described herein. The system 2400 also includes a database 2404 similar to the databases previously described which, in this example, also stores the user authentication information 32 to allow a first level user authentication operation to be carried out. In addition, as described above, the database 2404 also stores the sender authentication information that is located on the article as well as the article identifier so that the sender unit 2402 may provide the second level authentication process as described herein.

The sender unit 2402 also includes, for example, memory that contains executable instructions that when executed by one or more processing devices operates as a first level user authenticator 2406 and a second level authenticator 2408. As noted above, it will be recognized however that these operations may be carried by separate servers or other computing units located or accessible through the Internet, an intranet or any suitable network. It will also be recognized that the communications described herein may be communicated wirelessly for example where the recipient unit 20 is a wireless handheld device or other suitable portable wireless device.

Referring also to FIG. 25, a method for providing mutual authentication between a user and a sender unit, such as a target resource, is described. The article as noted above may include a transaction card, a card not having any transaction information, a translucent card, an electronic card (e.g. visually displayed card) that may be, for example, stored in memory on the recipient unit or any other suitable unit and then displayed to a user upon user request or automatically in response to receipt of the challenge, or the article may take any other suitable form. Also, the location information sent in the challenge includes, for example, electronically transmitted data for display in a display device. As noted above, this may take the form of row and column information or any other suitable information that may be electronically transmitted and, for example, displayed on display 30 for the user or audibly presented. It will be assumed that for this embodiment, a user has received the sender authentication article 1800 and in this example it is not a translucent article so that no visual filter need be used in this example. However, it will be recognized that the operations described herein may be suitably carried out for any suitable article including a translucent card or article. This method may be carried out, for example, by the system shown in FIG. 24, or by any suitable system or structure. In this example, article identification information need not be sent to the recipient unit by the sender unit 2402. However, it may be, if desired. In this example, the sender unit 2402 repeatedly checks to see whether a reply to a sent challenge includes sender authentication information that was identified by location information in a sent challenge matches expected (e.g., that desired by the sender) sender authentication information. If not, the challenge is repeatedly sent multiple times during a session, or over multiple sessions until the desired sender authentication information that is received by the sending unit matches the expected authentication information.

Although not shown in FIG. 25, a first level authentication process may be initially carried out. For example, this may include receiving user authentication information 2410 that may include, for example, a user password and user ID, from the recipient unit 20, and hence the user. This is received, for example, by the first level user authenticator 2406. The first level user authenticator 2406 then authenticates the user based on the received user authentication information 2410 by using the user authentication information 32 obtained, for example, from the database 2402. If they match, user authentication is successful. A "yes" indication 2412 is then sent to the second level authenticator 2408 indicating that a second authentication process may be carried out. It is preferable, for example, also that during the first level authentication process, a lock out mechanism is implemented such as one that limits the number of authentication attempts during this first level authentication process preventing a brute force attack.

Upon successful completion of the first step of authentication, the user is prompted to authenticate with article specific information as described below.

As shown in block 2500, the method includes determining, for a user that has been assigned the article 1800, desired sender authentication information that corresponds to sender authentication information that is embodied on the article. This may be done, for example, by the second level authenticator 2408 suitably selecting sender authentication information from the database 2404 that is located on the article 1800 based on the user authentication information 32. As noted above, this indicia on the article is stored by the sender authentication member issuer 2202 in the database 2404. The sender authentication information can be located on the article 1800 by a user by using the location information, such as row and column identifiers, or any other suitable location information as described above.

As shown in block 2502, the method includes sending, such as by the sender unit 2402, a challenge for the user that includes at least location information that identifies the desired sender authentication information that can be located on the article 1800. A challenge may include, for example, one or more coordinate sets that are for example, displayed to a user via display 30. The challenge is preferably particular to each user and must be retrieved, based on the identity or user authentication information from the first level user authentication process. This ensures that the user is presented with the same challenge until successful authentication is complete. The repeating of the same challenge can prevent an attacker from mounting a brute force attack based on knowledge of only a few of the user's card contents which, for example, may have been obtained using various potential attack mechanisms. The randomly generated challenge is then carried out and stored once the user has successfully authenticated through a second level authentication process. The challenge 2414 may be sent in any suitable manner and may take any suitable form including, but not limited to, an SSL communication or non-secure communication if desired. As shown in block 2504, the method includes receiving a reply to the sent challenge. In this example, a reply designated as 2416 is received from the recipient unit 20 and is generated by the recipient unit under control of the user, for example, using the location information sent in the challenge 2414, such as a row and column ID to determine sender authentication information located on the card. The user enters this information through a suitable user interface in response to the challenge. As such, with respect to the embodiment of FIGS. 24-28, the reply includes desired (desired by the sender unit) sender authentication information obtained from the article. This reply information, although referred to as "sender authentication information" is actually used to authenticate the user by the sender unit, or other entity, since the reply contains information only obtainable by the holder of the authentication card.

As shown in block 2506, the method includes determining, such as by the sender unit 2402, whether the received reply to the challenge includes the desired sender authentication information that was identified by the location information sent in the challenge. As shown in block 2508, if the received sender authentication information in the reply is not the desired sender authentication information that was identified in the challenge by the location information, the sender unit 2402, in this example, then resends the same challenge containing the same location information that was previously sent, to the recipient unit 20. As shown in block 2510, the method includes repeating the steps of analyzing the received reply and if the reply does not include sender authentication information that was expected based on the location information sent in the challenge, the sender unit sends the same challenge during the same session, until the received reply includes the desired sender authentication information that is on the article or until a suitable number of tries have been attempted as set by the sender unit, for example. The challenge is repeated until the reply includes the expected desired sender authentication information.

FIG. 26 illustrates another method for providing mutual authentication between a user and a sender and may be carried out, for example, by the system 2400 of FIG. 24, or any other suitable system or devices. In this example, the repeated sending of the same challenge until a proper reply is received, is not carried out. In this embodiment, article identification information, such as a serial number located on the article, or any other suitable article identification is also sent to the user in addition to the location information in a challenge. As shown in block 2600, the method includes determining, such as by the sender unit 2402, desired sender authentication information that corresponds to sender authentication information that is embodied on the article and also determining for the same user, corresponding article identification information, such as the serial number on the article or shared secret or any other suitable identification information. As shown in block 2602, the method includes sending a challenge for the user that includes the determined location information and article identification information for authenticating the sending unit to the user.

As shown in block 2604, the method includes authenticating the user based on a reply to the challenge wherein the reply includes sender authentication information obtained from the article, based on the location information. In this example, the user does not, for example, enter or send a reply to the challenge unless the user verifies that the article identification information sent in the challenge, matches the article identification information on the article itself. As such, the user may authenticate the sending unit based on the article identification information. As such, in this example, the challenge includes article identification information in addition to the location information. The reply includes the sender authentication information located on the article, defined by the location information. If the article identifier in the challenge matches the article identifier on the article that is in the possession of the user, then the user trusts the sending unit. As shown in block 2606, the method includes authenticating the user based on the reply to the challenge. In this example, again a first level of authentication is preferably carried out that was previously described based on a user password and/or user ID. If that level of authentication is successful, then the method shown in FIG. 26 may be suitably carried out. However, the challenge and reply may also be used as a first level of authentication instead of a user name and password. As also noted, the article identification information may include a shared secret known to the user and to the sender or may be an article serial number, or any other suitable information.

FIG. 27 illustrates another method for providing mutual authentication between a user and sender which effectively combines some of the operations shown in FIGS. 25 and 26. As shown in block 2700, the method includes, performing a first authentication process such as by prompting for first level user authentication information. This may include, for example, the sending unit sending a request or providing a prompt for the user to enter a password and user ID. In response, the sending unit receives the first level user authentication information such as a password and stored user authentication information 32 (e.g. a hash of the received password) is verified to ensure that the received first level user authentication information is proper. However, it will be recognized that this second factor authentication technique can also be used as a first level authentication technique. As shown in block 2702, if the first level authentication is successful, the method includes determining for the user the desired sender authentication information that corresponds to the sender authentication information that is embodied on the article and determining, for example, article identification information that can be located on the article. As such, in this example, both location information and article identification information are sent in a challenge. The steps previously described with reference to FIGS. 25 and 26 are then carried out such that, for example, a challenge is repeatedly sent wherein the challenge is the same challenge until proper sender authentication information is received in a reply. As such, the user confirms that the display of an article identifier from the challenge matches the identifier on their card. This authenticates the sender unit or target organization as only it and the end user have knowledge of this identifier. The user inputs a suitable response to the challenge by looking at the contents of their card at the location information sent in the challenge. The sending unit can verify the reply and authenticate the user as only the end user with this card can correctly respond to the challenge. It will be recognized that the operations were described in the context of, for example, the Internet but the operations are equally applicable to other channels of communication such as interactive voice response or any other suitable communication system. For example, where interactive voice response is used, a user prompt would be provided by voice over a wireless or wire line telephony network from, for example, an automated system. A user response would be provided via touchtone keypads instead of, for example, through web form input. Any other suitable communication system may also be used.

Among other advantages, the described apparatus systems and methods provide secure authentication of both the end user and sending unit or target organization and may be relatively easy to use and relatively inexpensive to produce and distribute such as the authentication cards versus more complex technologies such as smart cards, hardware tokens or public key infrastructures. In addition, the system may be readily implemented using web clients across multiple communication channels for mobile devices, non-mobile devices, voice activated devices or any other suitable devices.

FIG. 28 diagrammatically represents the operations described above. For example, as shown by communication 2800, a user is presented with a conventional user name and password login screen and enters their user name and password and sends it as a login response 2800 to the sender unit 2402 which then performs an authentication process, as known in the art, by comparing the received password and user ID to those stored in the password database 2802, for example. If validation is successful, the sender unit 2402 sends a challenge 2414 to a recipient unit with, for example, a user's card identifier and challenge which includes location information so that the user can locate specific indicia on the card (as described here and above, the card may serve as a first or second factor authentication article or token). This challenge is, for example, displayed for the user on the recipient unit. The user confirms the received card identifier with the card identifier on the authentication card in the user's possession and answers the challenge by sending a reply 2416 back to the sender unit 2402. This reply is then validated by the sender unit to validate the user to complete mutual authentication. However, if the second level authentication is not successful, the sender unit will repeatedly send the same challenge, namely the same location information back to the recipient unit until a proper reply has been received.

The above detailed description of the invention and the examples described therein have been presented for the purposes of illustration and description and that other variations will be recognized by those in the art. For example, it will be recognized that the various operations described herein may be distributed in a network or non-network configuration. For example, different operations of the authenticator, sending units or TIDM issuers or other operations may be performed by one or more third party web server(s) or other entities or devices. Other variations will also be recognized for the sender authentication apparatus and methods.

FIGS. 29 and 31 show a system 2900 similar to 2400 (FIG. 24). The embodiment shown in FIGS. 29 and 31 has a sender unit 2902 similar to the sender unit 2402. In addition to the sender unit 2402, sender unit 2902 contains a challenge generator with usage tracking 2904, which may be implemented in any suitable manner, and in this example, is shown to be one or more processing devices executing a software module stored in memory. The sender unit 2902 is operatively coupled through one or more communication links 2906 to a recipient unit 20, as also shown in FIG. 24, among others. The communication link is used to send challenges and replies as previously described and set forth below.

The sender unit 2902 is also operatively connected through links 2908 to memory 2910, shown as a database 2910 in this particular example. It is to be understood, however, that the memory 2910 may be in any suitable form known to one of ordinary skill in the art, such as a lookup table in RAM, ROM, distributed memory in web servers, etc. The memory may be integrated into the sender unit 2902 itself. Furthermore, each piece of data (e.g. stored rule data, challenge data elements, usage data, etc.) may be in different memory locations independent of each other. In the shown embodiment, the database 2910 may store information such as rule data 2912, stored usage data (or usage data) 2914, and a stored pool of challenge data elements and corresponding sender authentication information 2916, which represents or may in fact be the same as the authentication information that is located on an article along with the article identifier as discussed above in reference to FIG. 24. In this example, the stored usage data 2914 is on a per challenge data element basis. However, it may also be on a per group of challenge data element basis.

The sender unit 2902 also includes, for example, memory that contains executable instructions that when executed by one or more processing devices can provide authentication of a user to a sender, using a challenge generator with usage tracking 2904. If desired, the sender unit 2902 determines that a user authentication operation is needed or required. For example, a sender unit, such as sender unit 2902, may carry out a first level user authentication operation. If that first level user authentication operation is successful, the sender unit 2902 may determine that another user authentication operation is needed. However, the sender unit 2902 may be the first level of user authentication. Note that determining that a user authentication operation is needed or required may be an explicit or implicit operation. For example, a user may explicitly or actively request that a user authentication operation take place. As those skilled in the art will appreciate, however, an alternative may be that "determining" is more implicit, such as when a user authentication operation is a default operation.

Referring more specifically to FIG. 29, system 2900, as shown in this particular embodiment, shows rule data 2912 and stored usage data 2914. As the method of FIG. 30 shows, starting with block 3001, a device, such as a sender unit or other device, may use this rule data 2912 and stored usage data 2914 to generate a challenge for user authentication such that the challenge has at least one challenge data element from a stored pool of challenge data elements, shown in block 3003. The sender unit 2902 may then send the challenge, as shown in block 3005. As such, usage data corresponding to potential challenge data is used to determine a next challenge, as opposed to, for example, a random selection process.

As further described below, the rule data 2912 may cause a unit to generate different types of challenges. For example, in this example, the rule data 2913 may cause a device to select at least one challenge data element not previously used or a challenge data element from a group of least-used elements. As such, a device, such as sender unit 2902, generates such a challenge and uses the rule data 2912 and stored usage data 2914, which is associated with the elements in a stored pool of challenge data elements 2916. The stored usage data 2914 may be in any form that indicates some level of uses (including non-use) of challenge data elements. As one example, the stored usage data may have a one-to-one relationship with a challenge data element and represent the number of times that particular challenge data element has been used in a successful reply as described below. As one alternative, the stored usage data may also represent the number of times the associated challenge data element has been used in any challenge, regardless of whether or not the challenge received a successful reply.

As described below, the stored pool of challenge data elements 2916 may be data representing both location information 3108 and information 3109 identified by the location information 3108 (expected data sent in an expected reply to a challenge). In the challenge/reply context, the information 3109 (even though also referred to as sender authentication information) is expected reply information that is compared to the actual reply to allow a sender to authenticate a recipient. In a sender authentication context both location info 3108 and sender authentication info 3109 are sent to a user, so that a user can authenticate the sender. In this example, it may represent second factor authentication article location information that identifies sender authentication information 3109 that can be located on an article by using the location information 3108 associated with the article. Furthermore, the location information 3108 may correspond to row and column identifiers, as described throughout.

As one skilled in the art will appreciate, other embodiments may use different rule data 2912 to generate different challenges. This rule data may correspond to different policy considerations as discussed below. There is also no limit to the number of different rules that may be used. As such, many of the features described below in conjunction with other embodiments may also apply to the above-described embodiment, as one of ordinary skill in the art will recognize and appreciate. For example, the length of a challenge may vary either independent of or in conjunction with the stored usage data or rule data. As one illustration, rule data may specify that the more often the challenge data elements have been used, the length of the challenge should increase. Another example may be to lengthen the number of challenge data elements in a given transaction based on the type of transaction, i.e., higher value transactions, such as financial transactions, have a greater number of challenge data elements in them. Yet another example, as further discussed below, may be to track a time at which a previous challenge contained a particular challenge data element and then to generate a new challenge based on that tracked time. As another example, the new challenge may not include any challenge data element that have been used within a certain time period (e.g., exclude those that were sent in a challenge within the last few hours or days). Rule data and stored usage data may also be used to invoke an operation that is not necessarily related to the generation of a challenge. For example, rule data may specify that after either a certain percentage of the challenge data elements have been used or after they have been used a certain number of times, a new second factor authentication article should be issued (re-issued) or a different method of authentication should be used when the sender authenticates the user.

Referring also to FIG. 33, the challenge generator with usage tracking 2904 may generate a challenge for user authentication, such as the example challenge 3102. In this example, the challenge 3102 contains one or more portions, such as portion a 3104 and portion n 3106. A portion refers to one or more challenge data elements 3108 that is selected based on rule data, such as first rule data 3110 (or second rule data 3112), from a stored pool of challenge data elements.

The challenge generator with usage tracking 2904 may generate a challenge having at least a first and a second portion. The first portion, such as portion a 3104, may be based on first rule data 3110 and stored usage data 2914 that corresponds to at least one of the challenge data elements. Likewise, the second and additional portions, such as portion n 3106, may be based on second rule data 3112 (and also additional rule data) and stored usage data that corresponds to at least one of the challenge data elements.

In one embodiment, the first rule data 3110 may cause the selection of at least one least-used challenge data element to be part of the first portion. For example, FIG. 33 shows a list of challenge data elements 3114 with their corresponding usage data 2914, shown in this example as a useCount 3116, which may relate to the number of times each particular challenge data element 3108 has been used in a certain event, such as any challenge, a successful challenge, or a failed challenge. The list of challenge data elements 3114 shown in FIG. 33 may include all challenge data elements in the stored pool of challenge data elements 2916, a subset thereof, or challenge data elements from another suitable location. For purposes of this illustration, let the useCount 3116 correspond to the number of times each challenge data element 3108 has been used in any challenge. As shown in FIG. 33, challenge data element B3 has been used 0 times, challenge data element C1 has been used 0 times, challenge data element A2 has been used one time, and challenge data element C4 has been used 4 times. In the embodiment illustrated in FIG. 33, the first rule data 3110 causes the selection of three (3) least-used challenge data elements to be part of the first portion a 3104. To accomplish this task, each challenge data element 3108 was grouped with other challenge data elements with the same useCounts 3116. The groups were then arranged in ascending order based on useCount 3116 and randomly shuffled as shown. According to the first rule data 3110, the first three challenge data elements 3108 were included in portion a 3104 of the challenge 3102.

Second rule data 3112 may cause the selection of at least one more-used challenge data element to be selected for the second portion. FIG. 33 shows second rule data 3112 selecting a random challenge data element 3108 for portion n 3106 of the challenge 3102 from any of the remaining data elements not yet used in that particular challenge. However, the group of "more-used" challenge data elements may be a subset of the group containing all elements not yet in the challenge. For example, the second rule data may define the most-used challenge data elements to include challenge data elements having one of the three highest useCounts. Based on FIG. 313, such a rule with this particular list of challenge data elements 3114 would mean that a most-used challenge data element could be any challenge data element having a useCount 3116 of 2, 3, or 4. As such, the most-used challenge data elements based on this specific example rule and the example challenge elements in FIG. 31 would include B1, C2, A4, B2, C3, A3, B4, and C4. Of course, as already noted, the challenge data elements do not have to be row and column identifiers as shown in FIG. 33. They may be made up of any suitable location information as already discussed above.

The sender unit 2902 may also store the pool of challenge data elements 2916 and stored usage data 2914. The stored usage data 2914 may be based on previous uses of a respective data element in previous data challenges. In one embodiment, the stored pool of challenge data elements 2916 represents second factor authentication article location information that identifies sender authentication information that can be located on an article by using the location information 3108. The location information 3108, for example, may correspond to row and column identifiers. It is also understood that location information may be in a form other than row and column identifiers. As discussed above, location information may be anything that allows a user to locate sender authentication information on the article. For example, terms such as "upper left corner," "lower left corner," "third from the right," or any other suitable information that allows a user to identify the correct sender authentication information on the article may be used.

The sender unit 2902 may also send a generated challenge for use in authentication of a user to a sender. Additionally, the sender unit 2902 may contain memory that includes executable instructions that cause the one or more processing devices to receive a reply to the challenge from a user such as a recipient unit 20, compare the reply to an expected reply, and grant second level authentication status to the user if the received reply matches with the expected reply. As discussed above, FIG. 25 shows one way in which this sent/received reply process may work.

Another aspect of the device 2900 may include the memory having executable instructions that cause the one or more processing devices to re-issue a new second factor authentication article or use a different method of authentication in response to stored usage data 2914. This aspect of the invention may contain any other suitable aspects of the invention. For example, the article may contain location information that corresponds to row and column identifiers or a visual representation thereof. As an example of a response to stored data, if a certain percentage of challenge data elements (such as 30%, 70%, 100%, etc.) have been used in a certain number of challenges (or successful challenge/reply sets) (such as 1 time, 4 times, 100 times), then the device 2900 may re-issue a new second factor authentication article. The percentage of used challenge data elements and number of uses that determine whether a second factor authentication article should be re-issued is based on policy and security needs. As one skilled in the art will appreciate, re-issuing a new card after a lower percentage of challenge data elements has been used a lower number of times (such as once) increases security of the system because a potential attacker may have observed all of the successful challenges in the past, thereby allowing him or her to know all of the challenge data elements and the corresponding sender authentication elements associated with each of those challenge data elements. By re-issuing a new second factor authentication article, any information the attacker may have observed involving the previous authentication article is now useless to him or her. As a simplification of this method, one may track only whether or not a challenge data element has been used at all, opposed to the number of uses, either in any challenge or a successful challenge. By tracking use at all, a device may generate a challenge based on a certain number of used challenge data elements and a certain number of challenged data elements not-yet-used. Also, a re-issue of a second factor authentication article may correspond to a certain number of "used up" challenge data elements as discussed above.

Another embodiment of the device 2900 may include memory with executable instructions that cause the one or more processing devices to generate a challenge having a number of least-used challenge data elements based on a threshold value. Limiting the number of least-used challenge data elements based on a threshold value may mean that the number of least-used challenge data elements must include at least the number as defined by the threshold value or no more than the number defined by the threshold value. This embodiment may also be based on policy and security concerns. As one of ordinary skill in the art will appreciate, creating a lower threshold value that represents the maximum amount of least-used challenge data elements that can be used in a challenge lowers security of each login but makes it possible to use an article longer at that security level. Conversely, creating a higher threshold value that represents the minimum amount of least-used challenge data elements that must be used in each challenge increases security but that security level will not last as long with that particular article because an attacker will see a greater number of least-used challenge data elements with each successful challenge.

The sender unit 2902 may also contain memory with executable instructions that cause the one or more processing devices to perform additional operations related to policy and security issues. FIG. 39 illustrates one example of a policy- or security-related operation. The device 2900 may group challenge data elements based on a value of stored usage data 3704, determine a number of challenge data elements in each group 3706, compare the number of challenge data elements in each group with a threshold value 3708, and move challenge data elements to other groups such that the number of challenge data elements in each group satisfies a desired condition based on comparing the number of challenge data elements in each group with the threshold value 3710. As one of ordinary skill in the art will appreciate, this operation helps ensure that the challenge data elements are not predictable. As one of ordinary skill in the art would also recognize, tracking usage of challenge data elements and grouping them based on usage leads to situations in which groups, such as a least-used group or a most-used group, contain very few challenge data elements. In such cases, it may be desirable to artificially add cells to a group to ensure that portions of a challenge are not fully predictable. For example, if rule data 2912 requires that the device use two challenge data elements based on a particular rule and the group defined by that rule limits the number of challenge data elements in the group to two, it may be predictable to an attacker that those two challenge data elements will be in the challenge, thereby decreasing security. Accordingly, the threshold value would be based on policy and security concerns based on the usage of each particular device 2900.

The device may also limit security concerns with a time-related process. For example, the device may include memory with executable instructions that cause the one or more processing devices to track a time at which a previous challenge contained a particular challenge data element and generate a new challenge based on the time of when the previous challenge last contained the particular challenge data element. For example, if the challenge data elements are randomly selected, there is a chance that the same challenge data elements may appear in successive challenges or challenges in close proximity to each other. This possibility may allow an attacker, for example, to receive data challenge elements in a challenge from a challenge that he or she just recently observed. This aspect of the invention helps reduce such a risk by not allowing the random selection of a challenge data element 3108 from a group 3114 based on rule data to be repeated in challenges in close temporal proximity to each other.

Referring now to FIG. 32, a method for providing authentication of a user to a sender will be described. This method may be carried out by a device such as the device 2900 shown in FIG. 31, but it should be understood that the following methods can be implemented on any suitable device or system or combination thereof. The method may start out, shown in block 3002, when a user authentication is needed. The start of this method, block 3002, may occur for any level of user authentication, such as a first-level user authentication, a second-level user authentication, etc. As shown in block 3004, the method includes determining that a user authentication operation is desired. This determination process, which may involve a first level or a multi-factor authentication process, is described above. See, for example, the discussion referencing FIGS. 10 and 11. At the end of the method, block 3008, the method may be repeated as necessary.

After the device determines that a user authentication operation is desired, the device generates a challenge for user authentication, having a challenge data element from a stored pool of challenge data elements and including at least a first and a second portion. This step is shown in block 3006. As described above, the stored pool of challenge data elements may represent second factor authentication article location information that identifies a user to a sender or sender authentication information that can be located on an article by using the location information. This location information may, for example, correspond to row and column identifiers. However, it should be understood that the location information need not be limited to row and column identifiers, as described above. The device can generate the first portion based on stored usage data that corresponds to at least one of the challenge data elements and first rule data. The device may also generate the second portion based on stored usage data that corresponds to at least another challenge data element and second rule data. The stored usage data may represent the number of times a challenge data element has resulted in a corresponding successful reply element. The device generates a challenge for transmission for user authentication. Such a challenge includes selected data elements for transmission that represent corresponding data elements embodied on the article that is provided to the user. The selected data elements are selected in accordance with rules and usage data for the data elements.

As one of ordinary skill in the art will appreciate, the rule data in the described method may have control over which challenge data elements are selected for a particular challenge and how the challenge data elements are chosen. For example, FIG. 37 shows a method of generating a challenge based on particular rule data. The starting point of this method, block 3502, may occur, for example before or during the generation of a challenge. As shown in block 3504, a device implementing the method may group challenge data elements based on a value of stored usage data. Next, as shown in block 3506, the device may shuffle the order of challenge data elements within a group or list of challenge data elements that have the same useCount. As shown in block 3508, the device may generate a first portion of the challenge by selecting a certain number of challenge data elements from the group or groups of least-used challenge data elements. The number chosen could be any number, such as a threshold value, as defined by rule data. As illustrated in block 3510, the device may generate a second portion of a challenge by randomly choosing a certain number of data challenge elements from the remaining data challenge elements, i.e., those that have not yet been used in this particular challenge. The device may then send the challenge, which includes the first and second portions. It should be recognized that the challenge may include more than the two portions described in the method shown in FIG. 37.

FIG. 38 illustrates how a device may implement a similar method similar to that shown in FIG. 37 while using different rule data. Accordingly, in FIG. 38, many of the steps are the same as shown in FIG. 37. Block 3610 differs from block 3510 in that block 3610 describes that a device may use the rule data in which the data challenge elements for the second portion are selected from only those challenge data elements remaining in other groups, which describes that the rule data may determine which groups to select different portions from. In this particular example, block 3610 describes that the second portion of a challenge is generated such that no challenge data element is chosen from the group or list of least-used challenge data elements.

Turning now to FIG. 34, a method is shown, which, when carried out by a device, such as device 2900, produces a sent challenge. As shown in block 3004, a device may determine that a user authentication operation is desired, as already discussed above. This may occur after block 3210 if usage data has already been stored or at any suitable time, if at all. As shown in block 3206, the device may optionally store rule data that defines what challenge data elements to use from a pool of stored challenge data elements. As an alternative, the rule data may already be stored or hard-coded in a suitable location. If desired, a system operator may select this rule data by any number of means, such as through a graphic user interface that presents different rules to choose depending upon desired security levels, transaction types or other suitable criteria. Alternatively, the rules may be preset or hard coded. Then, as shown in block 3208, the device may determine or track usage data for each authenticated challenge data element in a pool or group of challenge data elements. The device may store this usage data in memory, illustrated in block 3210. Finally, as also shown in FIG. 32 block 3006, the device may generate a portion of a challenge based on the stored usage data and first stored rule data, and also generate another portion of the challenge based on the stored usage data and at least a second stored rule data. As one skilled in the art will appreciate, a portion of a challenge may have any number of challenge data elements. Furthermore, although block 3006 only discusses two portions, any number of portions and any number of rule data may be used to generate a challenge. Finally, as shown in block 3214, the device may send the entire challenge, which may, for example, be data representing a location on a card such that a user can locate sender authentication information for a second level authentication operation. Block 3216 demonstrates that the method may, if desired, be followed by additional steps, such as those shown in FIG. 36.

Some alternative embodiments are shown in FIG. 35. As is similar in FIGS. 32 and 34, block 3004 shows, if desired, that a device may determine that a user authentication operation is needed, which may occur in any of the ways already discussed above. The device may also optionally store a pool of challenge data elements into memory and store the usage data based on previous uses of a respective challenge data element in previous challenges, as shown in blocks 3306 and 3308.

Then, one possible continuation of this method is shown in block 3310. As shown in block 3310, the device may re-issue a new second factor authentication article to a user or indicate that one needs to be re-issued in response to stored usage data. Alternatively, a new type of second factor authentication article could be required such as a finger print scan, another type of second factor authentication token other than a location based card etc. Rule data may be used to indicate that such a step should occur. As explained in an example above, if a certain percentage of challenge data elements (such as 30%, 70%, 100%, etc.) have been used in a certain number of challenges (or successful challenge/reply sets) (such as 1 time, 4 times, 100 times), then the device 2900 may re-issue a new second factor authentication article for a user. As already discussed above, the article (e.g. grid card) may contain location information that corresponds to row and column identifiers or a visual representation thereof. The percentage of used challenge data elements and number of uses that determine whether second factor authentication article should be re-issued is based on policy and security needs as set by a system operator, for example. As one skilled in the art will appreciate, re-issuing a new card after a lower percentage of challenge data elements has been used a lower number of times (such as once) increases security of the system because a potential attacker may have observed all of the successful challenges in the past, thereby allowing him or her to know all of the challenge data elements and the corresponding sender authentication elements associated with each of those challenge data elements. By re-issuing a new second factor authentication article, any information the attacker may have observed involving the previous authentication article is now useless to him or her.

After the step shown in block 3308 and before generating a challenge as shown in block 3006 and as discussed above, the device may optionally store a tracking time at which a previous challenge contained a particular challenge data element, as shown in block 3312. A device may later use this stored time to generate a new challenge based on the time of when the previous challenge last contained the particular challenge data element. For example, rule data may specify that if a challenge data element has been used within the past X hours, minutes, days, or any other suitable time period, it should not be part of a challenge. As discussed above, tracking a time and using it in this way can, among other things, increase the security of a method and apparatus for mutual authentication. Block 3006 shows that the method can generate a challenge as described throughout, and block 3214 shows that a device may send the entire challenge, which may include challenge data elements.

Referring to FIG. 36, after sending a challenge as shown, for example, in FIGS. 34 and 35, the device may receive a reply to the sent challenge from a user in the form of data, as shown in block 3406. Next, the device may compare the received reply to an expected reply (stored information corresponding sent to the location information i.e. sender authentication information 2916) and determine if there is a match, as shown in blocks 3408 and 3410. If the received reply does not match the expected reply, the device may send notification to the client that there is a problem, as shown in block 3414.

As the method shown in FIG. 36 demonstrates, if the reply does match the expected reply, a device (such as the authentication server) may grant authentication status to the user and access the target (i.e. desired) resource when authentication is successful and may also notify the client of the success, as shown in block 3416 after which time the recipient device is allowed to access the target resource. In this case, the device will update usage data for the specific challenge data elements used in the challenge, as shown in block 3418. As already discussed, this usage data may be used during the generation of later challenges based on rule data such that a more secure challenge can be generated. The method then ends at block 3420, at which point additional steps may be added or the method may be repeated.

It should be understood that the usage data may be updated at any suitable location throughout the method, as is illustrated with blocks 3404 and 3412. It may prove useful to update usage data even if the received reply did not match the expected reply, as shown in block 3412. Even though the challenge was not a success, the reply may not have matched the expected reply because one of the plurality of challenge data elements could have been wrong. Therefore, as one skilled in the art will appreciate, an attacker may still be able to observe several pieces of sender authentication information even though the entire reply was not correct. Thus, it may make sense to even track usage data for unsuccessful challenges and replies. Alternatively, the device may wish to update usage data during an unsuccessful challenge/reply set for only the sender authentication information that is correct per each individual challenge data element.

Turning now to FIG. 39, the figure shows a method that a device may carry out based on rule data to help prevent the predictability that certain data challenge elements may occur in a given challenge. As one of ordinary skill in the art may notice, there will be cases where the set of challenge data elements in a "least-used" category, group, or list will be very small. Similarly, there will be cases where almost all cells are in the "least-used" category, group, or list. In these cases, it may be desirable to artificially add cells to a category, group, or list to ensure that parts of the challenge are not fully predictable. FIG. 39 shows one method that a device may use to help diminish this possibility. The starting point, block 3702, may be at any suitable time during which rule data is used to generate a challenge. As shown in block 3704, the method begins by grouping challenge data elements based on a value of stored usage data. Shown in block 3706, the method involves determining the number of challenge data elements in each group. This number is then compared with a threshold value, as shown in block 3708. This threshold value may be defined by rule data, hard-coded into a device, or stored in any other suitable means. Finally, as shown in block 3710, the method involves moving challenge data elements to other groups such that the number of challenge data elements in one or more groups satisfies a desired condition based on the comparison between the number of challenge data elements in each group and the threshold value. At the end of these steps, block 3712, the method may be repeated if necessary. It should also be understood, as with all methods disclosed herein, the steps of this method may be performed in any suitable order, at any suitable time, and with any additional suitable steps.

As an example of the method shown in FIG. 39, the threshold value and rule data may set that any group, as defined by rule data, must have at least X number of challenge data elements in it. Using this method, a device may determine that a group has X−2 (X minus 2) elements in it. Therefore, the device may use this method to artificially add challenge data elements to the particular group having X−2 elements such that each group has at least X elements in it. It is also understood that this threshold value may not only be a lower bound, but it may also be an upper bound, meaning that it may also define the maximum number of challenge data elements allowed in each group.

In another embodiment, the rule data may cause a length of the generated challenge to change in response to whether the stored usage data is beyond a threshold. For example, if one or more challenge data elements have been used more than a threshold number (e.g., 4) then on or after the fourth use, the challenge would include one or more additional challenge data elements to increase the length of the challenge and yet another embodiment, if the usage data indicates that the authentication article has been used to such a degree that it is no longer desirable to be trusted as an authentication mechanism, either a new authentication article can be reissued or a different authentication scheme can be used instead of a challenge reply authentication article for example. By way of example, and not limitation, different authentication schemes may include, for example, a knowledge based authentication scheme. It is known in the art where an authentication server may issue questions to a user through suitable graphic user interface asking the user to answer a question that was asked and answered in a registration process so that the sender may authenticate the user where the user responds by answering the question via a suitable user interface. The questions may be, for example, "What is your mother's maiden name?" or any other suitable questions to which answers have already been provided by the user in a registration process. Another authentication technique known as a One Time Password list provides the user with a list such as on a piece of paper of one time passwords that may be used and the authentication server chooses one of the pre-assigned passwords from the list to be answered by the user. If the proper password from the list is used, then the server properly authenticates the user and grants access to the desired resource. As another authentication process, as known in the art, machine based authentication technique is known to provide validation of a user's computer in a way that secures against a variety of threats while minimizing user impact. To establish the identity of a user's computer, first a fingerprint of the user's machine is generated and securely stored. This fingerprint is based on a configurable set of machine parameters that can be transparently read from the user's computer. Once this fingerprint is obtained, a machine identity reference is generated and stored on the machine for future authentication. During subsequent log-ins, the machine identity can be transparently retrieved and authenticated. As such, the machine authentication process can be used instead of an authentication article based approach as described herein. Other authentication schemes may also be used if desired.

In another embodiment, sender authentication information and corresponding location information, such as a sender authentication message with sender authentication information and corresponding location information as described, for example, with respect to FIGS. 20-23 (and elsewhere) may also be generated based on usage data of sent data elements (that represent data elements on the card) also located on the article that a corresponding user is in possession of (e.g., the row and column information and corresponding information located at the row and column coordinate). As described above, various stored rules may be employed to provide different security levels such that the selection of which location information (such as column and row identifiers) and corresponding sender authentication information that is locatable on the article, based on the desired location information (e.g. the information on the article located at the row and column coordinates) may be generated by a server and sent to a user device. The above operations with respect to generating challenges based on usage data to provide user authentication to the server may also be applied to provide sender authentication to the user and all operations will not be repeated for purposes of brevity. By way of example however, the server keeps track of the number of times each row and column and corresponding information located at the row and column were used in the sender authentication message so that if, for example, a row and column and corresponding sender authentication information has already been sent to a user, other row and column identifiers and corresponding sender authentication information may be sent instead. This can reduce the likelihood that an unscrupulous party can piece together requisite portions of an authentication article. As noted above, the method and apparatus would store a pool of data elements that were located on an article that has already been issued and stores usage data corresponding with each of the row and column identifiers and the corresponding information located at those coordinates based on previous uses of the data elements in previously sent sender authentication information and corresponding location information (e.g., data representing the row and column identifiers and corresponding data representing the information located on the article at the location coordinates that was sent).

The sender unit, or other suitable device selects, from the stored pool of data elements, data elements that correspond to information on an authentication article to send as part of the sender authentication information and corresponding location information. The sent sender authentication information and corresponding location information is selected based on rule data and stored usage data associated with at least some of the data elements in the stored pool of data elements. The sender unit sends the selected sender authentication information and corresponding location information for use in an authentication of a sender by a user. Upon receiving the sent sender authentication information and corresponding location information, the user compares the sent sender authentication information using the sent corresponding location information to corresponding sender authentication information printed on the second factor authentication article. If they match, the recipient unit may then attempt to access a target resource.

In addition, the selection of the challenge data elements and/or the sender authentication information and corresponding location information may be made by tracking a time at which a previous challenge/reply process and/or sender authentication process (e.g., a sender authentication message with sender authentication information and corresponding location information was sent) contained a particular sent data element. The selected new sender authentication information and corresponding location information or new challenge data element is made based on the time of when the previous sender authentication process or challenge/reply process last contained the particular data element. As such, the usage data for a given data element may indicate that a particular data element was already used (e.g. sent) both in a challenge/reply process and in a sender authentication process and the rules may define how to modify a subsequent challenge/reply process or sender authentication process accordingly.

In another embodiment, it may be desirable to combine the sender authentication operation, such as that described above with respect to FIGS. 20 and 23, with challenges also generated based on the same pool of data elements from the same article while also tracking the usage data of which data elements were used in challenges. Accordingly, the rule data may define how many times a given row and column identifier (serving as location information) may be used in a challenge before it can no longer be sent as a challenge or the rule may take into account whether the same row and column identifier was already used as sender authentication information. The rule may also indicate that data that is logged for row and column identifiers for sender authentication information and corresponding location information may also be used to determine which sender authentication information and corresponding location information is to be sent in subsequent challenges. The usage data that corresponds to data elements on the article used as the sender authentication information and corresponding location information and the usage data corresponding to data elements on the article used in the sent challenges are used to determine which data element are to be used in subsequent challenges or in subsequent sender authentication messages.

Accordingly, stored usage data may track, for example, the number of times location information has been used with respect to sender authentication messages and may also be used to track the number of times that article location information for the same article has been used in challenges to facilitate mutual authentication, sender authentication or user authentication. The above structure and operations including the rules and usage data as described above with respect to challenges may also be applied to sender authentication information that is sent with corresponding location information, for example, to authenticate a sender to a user prior to the user sending any password information or other first level authentication information to the sender. If the user trusts that the sender is a legitimate sender, the user may then enter the requisite password and other information to facilitate a first level of authentication. The sender may then send the challenge based on the same article to the user so that the user may, through the user device send a corresponding reply based on the location information sent in the challenge to provide a first or second level of authentication for the sender using the authentication article (e.g., the grid card).

Among other advantages, the described devices and methods provide a way to implement security policy-features (e.g., using rules) into devices and methods to secure authentication of both an end user and/or a sending unit or target organization. Additionally, the described devices and methods can remove security concerns that, although unlikely, could potentially result from a system randomly generating a challenge/reply set. It will be recognized that although the article, challenges, and sender authentication message can be used for a second factor of authentication, that they may just as well be used as a first factor of authentication.

The above detailed description of the invention and the examples described therein have been presented for the purposes of illustration and description and other variations will be recognized by those in the art. For example, it will be recognized that the various operations described herein may be done in any suitable order or may be distributed in a network or non-network configuration. For example, different operations of the authenticator, sending units, or article issuers or other operations may be performed by one or more third party web server(s) or other entities or devices. For example, as one skilled in the art may recognize, a device may mean a single device or plurality of devices, which may include any suitable structure or plurality of structures to implement the devices and methods recognized herein. Furthermore, it should be understood that although the given examples show independent parts within one device, the parts may appear in any form, such as being physically separated and connected through a computer network or by being further integrated into one system or device. For example, the memory, shown as a database, may be located in a web server or other computer system separate from that of the sender unit. Many other variations will also be recognized for the sender authentication apparatus and methods.

It is therefore contemplated that the present invention cover any and all modifications, variations or equivalents that fall within the spirit and scope of the basic underlying principles disclosed above and claimed herein.

What is claimed is:

1. A method for providing authentication of a user to a sender comprising:
generating, by a sender unit, a challenge for user authentication, having a challenge data element from a stored pool of challenge data elements, wherein the stored pool of challenge data elements represents location information that can be located on an authentication article, the authentication challenge being based on rule data and stored usage data associated with at least some of the challenge data elements in the stored pool of challenge data elements, wherein the stored usage data comprises an indication of a level of prior authentication challenge uses of the at least some of the challenge data elements in the stored pool in previous authentication challenges, the authentication challenge being generated based on:
selecting randomly the challenge data element to be included in the authentication challenge from a group of challenge data elements,
wherein one or more of the at least some of the challenge data elements are grouped into the group of challenge data elements based on the indication of the level of prior authentication challenge uses of the at least some of the challenge data elements in previous authentication challenges; and
sending, by the sender unit, the generated authentication challenge for use in an authentication of a user to a sender.

2. The method of claim 1 including:
storing the pool of challenge data elements; and
storing the stored usage data based on previous uses of a respective challenge data element in previous authentication challenges.

3. The method of claim 1 wherein the location information corresponds to row and column identifiers.

4. The method of claim 1 including at least one of: re-issuing a new authentication article in response to stored usage data and requiring a different type of authentication article in response to stored usage data.

5. The method of claim 1 including also employing a different authentication scheme in response to stored usage data wherein the different authentication scheme is from the group of: a knowledge based question and answer scheme, a machine authentication scheme, and a one time password list scheme.

6. The method of claim 1 including:
receiving a reply to the authentication challenge;
comparing the reply to an expected reply; and
granting authentication status to the user if the received reply matches with the expected reply.

7. The method of claim 6 wherein the stored usage data represents a number of times a challenge data element has resulted in a corresponding successful reply.

8. The method of claim 6 including generating the authentication challenge by:
tracking a time at which a previous authentication challenge contained a particular challenge data element; and
generating a new authentication challenge based on the time of when the previous authentication challenge last contained the particular challenge data element.

9. The method of claim 1 including generating the authentication challenge by:

tracking a time at which a previous authentication challenge contained a particular challenge data element; and
generating a new authentication challenge based on the time of when the previous authentication challenge last contained the particular challenge data element.

10. The method of claim 9 wherein the new authentication challenge generated does not include any previous challenge data elements that have been used within a specified time period.

11. The method of claim 1 including generating the authentication challenge having a number of least-used challenge data elements based on a threshold value.

12. The method of claim 1 including generating the authentication challenge by:
grouping challenge data elements based on a value of stored usage data;
determining a number of challenge data elements in each group;
comparing the number of challenge data elements in each group with a threshold value; and
moving challenge data elements to other groups such that the number of challenge data elements in one or more groups satisfies a desired condition based on comparing the number of challenge data elements in each group with the threshold value.

13. The method of claim 8 wherein the new authentication challenge generated does not include any previous challenge data elements that have been used within a specified time period.

14. The method of claim 1 wherein the rule data causes a length of the generated authentication challenge to change in response to whether the stored usage data is beyond a threshold.

15. A device for providing authentication of a user to a sender comprising:
one or more processing devices; and
memory containing executable instructions that cause the one or more processing devices to:
generate a challenge for user authentication, having a challenge data element from a stored pool of challenge data elements, wherein the stored pool of challenge data elements represents location information that can be located on an authentication article, the authentication challenge being based on rule data and stored usage data associated with at least some of the challenge data elements in the stored pool of challenge data elements, wherein the stored usage data comprises an indication of a level of prior authentication challenge uses of the at least some of the challenge data elements in the stored pool in previous authentication challenges, wherein the memory includes executable instructions that cause the one or more processing devices to:
select randomly the challenge data element to be included in the authentication challenge from a group of challenge data elements,
wherein one or more of the at least some of the challenge data elements are grouped into the group of challenge data elements based on the indication of the level of prior authentication challenge uses of the at least some of the challenge data elements in previous authentication challenges; and
send the generated authentication challenge for use in an authentication of a user to a sender.

16. The device of claim 15 wherein the memory includes executable instructions that cause the one or more processing devices to:
store the pool of challenge data elements; and
store the stored usage data based on previous uses of a respective challenge data element in previous authentication challenges.

17. The device of claim 15 wherein the location information corresponds to row and column identifiers.

18. The device of claim 15 wherein the memory includes executable instructions that cause the one or more processing devices to: re-issue a new authentication article in response to stored usage data.

19. The device of claim 15 wherein the memory includes executable instructions that cause the one or more processing devices to also employ a different authentication scheme in response to stored usage data wherein the different authentication scheme is from the group of: a knowledge based question and answer scheme, a machine authentication scheme, and a one time password list scheme.

20. The device of claim 15 wherein the memory includes executable instructions that cause the one or more processing devices to:
receive a reply to the authentication challenge;
compare the reply to an expected reply; and
grant authentication status to the user if the received reply matches with the expected reply.

21. The device of claim 20 wherein the stored usage data represents a number of times a challenge data element has resulted in a corresponding successful reply element.

22. The device of claim 15 wherein the memory includes executable instructions that cause the one or more processing devices to:
track a time at which a previous authentication challenge contained a particular challenge data element; and
generate a new authentication challenge based on the time of when the previous authentication challenge last contained the particular challenge data element.

23. The device of claim 22 wherein the new authentication challenge generated does not include any previous challenge data elements that have been used within a specified time period.

24. The device of claim 15 wherein the rule data causes a length of the generated authentication challenge to change in response to whether the stored usage data is beyond a threshold.

25. A method for providing authentication of a user to a sender comprising:
generating, by a sender unit, a challenge for transmission for user authentication, such authentication challenge comprising selected data elements for transmission, wherein the selected data elements for transmission represent location information that can be located on an authentication article that is provided to the user and represent corresponding data elements embodied on the authentication article, wherein the selected data elements are selected in accordance with rules and usage data for the data elements and wherein the usage data comprises an indication of a level of prior authentication challenge uses of at least some of the data elements in previous authentication challenges, the authentication challenge being generated based on:
selecting randomly one or more of the data elements to be included in the authentication challenge from one or more groups of challenge data elements,
wherein one or more of the at least some of the challenge data elements are grouped into the one or more groups of challenge data elements based on the indication of the level of prior authentication challenge uses of the at least some of the challenge data elements in previous authentication challenges.

26. The method of claim 25 including:
storing a pool of challenge data elements; and
storing the stored usage data based on previous uses of a respective challenge data element in previous authentication challenges.

27. The method of claim 25 wherein the location information corresponds to row and column identifiers.

28. The method of claim 25 including at least one of: re-issuing a new authentication article in response to stored usage data and requiring a different type of authentication article in response to stored usage data.

29. The method of claim 25 including also employing a different authentication scheme in response to stored usage data wherein the different authentication scheme is from the group of: a knowledge based question and answer scheme, a machine authentication scheme, and a one time password list scheme.

30. The method of claim 25 including:
receiving a reply to the authentication challenge;
comparing the reply to an expected reply; and
granting authentication status to the user if the received reply matches with the expected reply.

31. The method of claim 25 wherein the stored usage data represents a number of times a challenge data element has resulted in a corresponding successful reply.

32. The method of claim 25 including generating the authentication challenge by:
tracking a time at which a previous authentication challenge contained a particular challenge data element; and
generating a new authentication challenge based on the time of when the previous authentication challenge last contained the particular challenge data element.

33. The method of claim 32 wherein the new authentication challenge generated does not include any previous challenge data elements that have been used within a specified time period.

* * * * *